(12) United States Patent
Xu

(10) Patent No.: US 12,486,292 B2
(45) Date of Patent: Dec. 2, 2025

(54) PRODRUG PLATFORM USEFUL TO DELIVER AMINES, AMIDES AND PHENOLS

(71) Applicant: Changchun Changcheng Pharmaceutical Technology Co., LTD, Jilin (CN)

(72) Inventor: Mingyan Xu, Jilin (CN)

(73) Assignee: Changchun Changcheng Pharmaceutical Technology Co., LTD, Jilin (CN)

( * ) Notice: Subject to any disclaimer, the term of this patent is extended or adjusted under 35 U.S.C. 154(b) by 944 days.

(21) Appl. No.: 17/636,794

(22) PCT Filed: Aug. 18, 2020

(86) PCT No.: PCT/CN2020/109698
§ 371 (c)(1),
(2) Date: Feb. 18, 2022

(87) PCT Pub. No.: WO2021/032075
PCT Pub. Date: Feb. 25, 2021

(65) Prior Publication Data
US 2022/0281904 A1     Sep. 8, 2022

(30) Foreign Application Priority Data

Aug. 21, 2019   (WO) ................ PCT/CN2019/101782

(51) Int. Cl.
*C07F 9/6574*   (2006.01)
*C07F 9/6571*   (2006.01)
*C07H 19/06*    (2006.01)

(52) U.S. Cl.
CPC .... *C07F 9/65742* (2013.01); *C07F 9/657154* (2013.01); *C07H 19/06* (2013.01)

(58) Field of Classification Search
None
See application file for complete search history.

(56) References Cited

U.S. PATENT DOCUMENTS

2004/0214798 A1   10/2004   Hu

FOREIGN PATENT DOCUMENTS

| CN | 111655710 A | 9/2020 |
|---|---|---|
| JP | 2003-508539 A | 3/2003 |
| WO | WO 99/45016 A2 | 9/1999 |
| WO | WO 01/18013 A1 | 3/2001 |
| WO | WO 2011/038207 A1 | 3/2011 |
| WO | WO 2019/120299 A1 | 6/2019 |
| WO | WO 2020/001475 A1 | 1/2020 |

OTHER PUBLICATIONS

Choi, Young H., et al. "Changes in metformin pharmacokinetics after intravenous and oral administration to rats with short-term and long-term diabetes induced by streptozotocin." Journal of pharmaceutical sciences 97.12 (2008): 5363-5375.*
Ciombor, Kristen K., et al. "Phase II trial of bortezomib plus doxorubicin in hepatocellular carcinoma (E6202): a trial of the Eastern Cooperative Oncology Group." Investigational new drugs 32.5 (2014): 1017-1027.*
Bookser et al., "High-Throughput Synthesis of HepDirect Prodrugs of Nucleoside Monophosphates", J. Comb. Chem., 2008, 10: 567-572.
Huttunen et al., "Design, Synthesis, and Evaluation of Novel Cyclic Phosphates of 5-Aminosalicylic Acid as Ctyochrome P450-Activated Prodrugs", Molecular Pharmaceutics, 2013, 10: 532-537.
Liang et al., "Phosphoramidate and phosphate prodrugs of (−)-β-$_D$-(2R,4R)-dioxolane-thymine: Synthesis, anti-HIV activity and stability studies", Bioorganic & Medicinal Chemistry, 2006, 14: 2178-2189.
Notice of Reasons for Refusal issued in Japanese Application No. 2022-512372, dated May 9, 2023.
Wang et al., "Preparation, properties and anti-tumor effect of the self-assemblies of a phosphoryl N-tetradecanoyl gemcitabine derivative", J. Int. Pharm. Res., 2014, 41(2):1-6.
Boyer et al., "Synthesis and Characterization of a Novel Liver-Targeted Prodrug of Cytosine-1-β-$_D$-arabinofuranoside Monophosphate for the Treatment of Hepatocellular Carcinoma", J. Med. Chem., 2006, 49:7711-7720.
Extended European Search Report issued in EP Application No. 20854080.7, dated Sep. 13, 2023.
Reddy et al., "Liver Targeting of Hepatitis-B Antiviral Lamivudine using the Hepdirect™ Prodrug Technology", Nucleosides, Nucleotides, and Nucleic Acids, 2006, 24(5-7): 375-381.
Office Action issued in Chinese Application No. 202080055995.5, dated Feb. 1, 2024.
Office Action issued in Australian Application No. 2020333099, dated Oct. 11, 2023.
Erion et al., "Design, Synthesis, and Characterization of a Series of Cytochrome $P_{450}$ 3A-Activated Prodrugs (HepDirect Prodrugs) Useful for Targeting Phosph(on)ate-Based Drugs to the Liver", J. Am. Chem. Soc., vol. 126, pp. 5154-5163 (2004).
Huttunen et al., "Towards Metformin Prodrugs", Synthesis, No. 22, pp. 3619-3624 (2008).
International Search Report issued in International Application No. PCT/CN2020/109698, mailed on Nov. 26, 2020.

(Continued)

*Primary Examiner* — Patrick T Lewis
(74) *Attorney, Agent, or Firm* — Knobbe, Martens, Olson & Bear, LLP

(57) ABSTRACT

A prodrug platform is useful to deliver pharmaceutically active amines, amides and phenols and their use in the diagnosis, prevention and/or treatment of various diseases. Compared with the parent drug (e.g., Gemcitabine), the prodrugs show a significant overall safety improvement (therapeutic index (TI) improvement), especially in liver. The prodrugs can treat several diseases, including, for example, cancer, metabolic disease, viral infection, immunological disease, neurologic disease, and blood disease.

20 Claims, 10 Drawing Sheets

(56) References Cited

OTHER PUBLICATIONS

Communication pursuant to Article 94(3) EPC issued in EP Application No. 20854080.7, dated Apr. 29, 2025.
Thuong et al., "New method of preparation for phosphorylcholine, phosphorylhomocholine, and their derivatives." Database CAPLUS, Jan. 1974, Database accession No. 1974:477403, 1 page.

* cited by examiner

A

| Fold dFdC:<br>po Compound 29/iv dFdC | 1.78 |
|---|---|
| Fold dFdU:<br>iv dFdC/po Compound 29 | 6.58 |
| TI improvement of the prodrug over dFdC | 11.71 |

B

A

B

A

B

PRODRUG PLATFORM USEFUL TO DELIVER AMINES, AMIDES AND PHENOLS

TECHNICAL FIELD

This invention relates to a prodrug platform useful to deliver pharmaceutically active amines, amides and phenols and their use in the diagnosis, prevention and/or treatment of various diseases. In addition, the invention relates to phosphorus-containing prodrugs of gemcitabine and their use in the treatment of cancer and viral infectious diseases.

BACKGROUND OF THE INVENTION

The oral administration of a drug (e.g., gemcitabine) may be limited by its poor oral bioavailability. Shipley L A. et. al., "Metabolism and disposition of gemcitabine, and oncolytic deoxycytidine analog, in mice, mice, and dogs". Drug Metabolism & Disposition, 1992, 20(6):849-55. In addition, when dosed orally, a drug (e.g., gemcitabine) may be implicated in causing adverse dose-limiting intestinal lesions characterized by moderate-to-marked loss of mucosal epithelium (atrophic enteropathy) throughout the entire length of the intestinal tract. Horton N D et. al., "Toxicity of single-dose oral gemcitabine in mice", American Association for Cancer Research, Poster Presentation, Orlando, FL, Mar. 27-31, 2004.

To improve therapeutic window, prodrugs are often used to address ADMET (absorption, distribution, metabolism, excretion, and toxicity) properties and risks of either preclinical drug candidates or drugs already on the market. Recent development in the drug discovery field has witnessed prodrugs being used to selectively deliver active drugs to the desired tissues where the biological targets resides, which could lead to either enhanced efficacy in the desired tissues or reduced toxicity in the undesired tissues.

As well known in the art, liver is an important target organ for many drugs and prodrugs, and there is still a need to develop liver-targeted drugs or prodrugs that could allow oral dosing, pass through the intestinal tract intact without substantial degradation and deliver a pharmaceutically active agent to the afflicted area in liver with acceptable safety and efficacy.

Gemcitabine hydrochloride (2',2'-difluoro-2'-deoxycytidine hydrochloride) is an anti-tumor agent marketed as Gemzar® for the treatment of various cancers, such as pancreatic cancer, breast cancer and non-small cell lung dancer (NSCLC) and is being evaluated for ovarian cancer. Moreover, gemcitabine may also be used in the treatment of HCV as well as a modulator of immune function (see U.S. Pat. No. 6,555,518). In another aspect, combination of gemcitabine with decitabine was shown to potently inhibit HIV-1 through a mechanism that is distinct from the mechanisms for the drugs currently used to treat HIV-1 infection (Antimicrobial Agents and Chemotherapy, 2012, 56, 1942-1948). Gemcitabine also demonstrated antiviral activities against other viruses such as polioviruses (ACS Infect. Dis., 2017, 3(1), 45-53), human rhinovirus (Antiviral Research, 2017, 145, 6-13), and influenza A viruses (J. Biol. Chem., 2012, 287(42), 35324-35332).

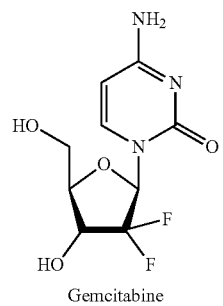 [SMILES: Nc1ccn([C@@H]2O[C@H](CO)[C@H](O)C2(F)F)c(=O)n1]

Gemcitabine

Gemzar® is currently administered by intravenous infusion at a dose of approximately 1000 to 1250 mg/m over 30 minutes, once weekly for up to 7 weeks followed by a week of rest from the treatment.

Various prodrugs and sustained released formulations of gemcitabine have been explored to find improvements. Examples of such prodrugs and sustained released formulations can be found in WO 04/0412303 "Gemcitabine Prodrugs, Pharmaceutical Compositions and Uses Thereof", Gallop et. al.; WO 98/32762 "Gemcitabine Derivatives," Myhren, Finn, et al.; WO 02/09768 "Therapeutic polyesters and polyamides," Uhrich, Kathryn E.; WO 02/76476 "Prodrugs of anticancer agents based on substituted aromatic acids," Greenwald, Richard m, et al.; WO 02/65988, "Terminally branched polymeric lilüers and polymeric conjugates as prodrug," Choe, Yun Hwang, et al.

Gemcitabine amide derivatives have been described in the art as useful intermediates in the synthesis of gemcitabine (see e.g. Britton, et al., U.S. Pat. No. 5,420,266 and Grindey, et al., U.S. Pat. No. 5,464,826) and also useful as prodrug moieties for the administration of gemcitabine. See e.g. Gallop, et al., WO 04/041203.

LY2334737, an amide prodrug of Gemcitabine, was reported as an oral dosing agent (J. Med. Chem., 2009, 52, 6958-6961). More importantly, it has shown clinical benefits in phase I human clinical trials (Invest. New Drugs, 2015, 33, 1206-1216 and references cited therein). Hepatotoxicity, however, was observed in some patients and was suggested to possibly be associated with genetic polymorphism of the cytidine deaminase gene (rs818202).

Hepatocellular Carcinoma (HCC) is a cancer difficult to treat. The combinations of gemcitabine with other anti-cancer agents (e.g. doxorubicin and oxaliplatin) have shown promising results in improving overall survival (Am. J. Clin. Oncol., 2012, 35(5), 418-423 and references cited therein) which remains as the most important endpoint for HCC. In another report, the combination of gemcitabine and doc-etaxel in late stage liver cancer patients showed significant anti-cancer activity (Cancer Research on Prevention and Treatment, 2012, 39(11), 1369-1372). Moreover, gemcitabine chemotherapy in middle to late stage liver cancer patients also showed improvement of immune functions (Journal of Hainan Medical University, 2016, 22(17), 2029-2031), which should make gemcitabine a potential partner for combination therapy with immuno-oncology products such as check point inhibitors PD-1, PD-L1, CTLA4 antibodies.

Liver-targeted prodrugs of gemcitabine will deliver gemcitabine active metabolites to the liver selectively, and thus could be used to treat liver cancers. As such, there is need to develop liver-targeted prodrugs of gemcitabine that could allow oral dosing, pass through the intestinal tract intact without substantial degradation and deliver gemcitabine to the afflicted area in liver with acceptable safety and efficacy.

The oral delivery of liver-targeted prodrugs of gemcitabine could also be used to treat other solid tumors (such as cancers of the lung, pancreas, colon, prostate, breast, etc.) either as a monotherapy or as part of a combination therapy. For example, the combination of gemcitabine with albumin-bound taxol as a first line therapy for late stage pancreatic cancer patients showed clear therapeutic benefits with DCR of 77.8%; PFS and OS of 5 and 8 months, respectively (Chinese Clinical Oncology, 2016, 21(7), 642-645).

SUMMARY OF THE INVENTION

After extensive work, we surprisingly discovered that the cyclic phosphate esters/amides according to present invention could deliver pharmaceutically active aromatic amines, amides and phenols (including gemcitabine) in vivo, which could achieve oral delivery of i.v. drugs or selectively deliver amine-, amide-, phenol-containing active drugs to the liver. Such prodrugs could protect active drugs to pass through gastrointestinal (GI) and reach the liver, and once activated inside the liver the active drugs could then reach other tissues where the biological targets reside.

These prodrugs pass through the GI tract substantially intact and are converted into active drugs inside liver, thus minimizing the formation of potentially undesired metabolites in the GI, liver, and plasma. For example, a N-phosphoramide prodrug of gemcitabine was found to deliver dFdC to the liver after oral administration but generated significantly lower levels of dFdU (in both liver and plasma) compared to gemcitabine itself (either i.v. or p.o. dosing), which should be translated into much less toxicity compared to gemcitabine while maintaining appropriate efficacy and safety profiles when administered orally or intravenously.

Thus, the present invention aims to provide a novel prodrug platform to deliver aromatic amine-, amides- or phenol-containing drugs in vivo, which are capable of being given either orally or intravenously and with potential tissue selectivity such as the liver selectivity. When the prodrugs are given orally they traverse the intestinal tract substantially intact into the portal bloodstream with less gastrointestinal toxicity and better bioavailability than with the parent drug while maintaining the efficacy of the parent drug at lower doses. Therefore, these prodrugs can not only deliver active drugs to the liver but also reach other organs since the blood leaving the liver will carry the active drugs into other organs. It is contemplated that in addition to treating liver related diseases these phosphorus-containing prodrugs could be also useful to treat diseases of other organs/tissues.

According to a first aspect of the present invention, there is provided a compound having formula (I):

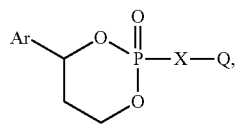

(I)

its stereoisomer, salt, hydrate, solvate, or crystalline form thereof;
wherein,
Ar is independently selected from the group consisting of optionally substituted aryl and heteroaryl;
X is independently selected from —NR'—, —O—, —S—, optionally substituted heterocyclic and optionally substituted heteroaryl, preferably provided that when X is —O—, then Q must be an aromatic or heteroaromatic group;
R' is independently selected from the group consisting of hydrogen, optionally substituted alkyl, optionally substituted aryl, and optionally substituted heteroaryl; and
Q is such a group that H—X-Q together represents a pharmaceutically active agent (drug) or prodrug thereof, and preferably the pharmaceutically active agent is a chemical compound having at least one free (aromatic) amine, amide or phenol group (H—X—) which can react to obtain the compound of formula (I), especially form the moiety X.

In a preferred embodiment of the first aspect of the invention, Ar is optionally substituted phenyl, preferably 3-chlorophenyl, or optionally substituted pyridyl, preferably 3-pyridyl and 4-pyridyl.

In another preferred embodiment of the first aspect of the invention, X is —NR'—, and R' is hydrogen, optionally substituted alkyl, or optionally substituted aryl.

In another preferred embodiment of the first aspect of the invention, X is —O— or —S—.

In another preferred embodiment of the first aspect of the invention, Q is such a group that H—X-Q together represents a pharmaceutically active agent for the diagnosis, prevention and/or treatment of a disease selected from the group consisting of cancers, metabolic diseases, viral infections, immunological diseases, neurologic diseases, and blood diseases, and preferably H—X-Q together represents gemcitabine, tenofovir disoproxil, metformin, topotecan, entacapone, nebicapone, a PARP inhibitor such as rucaparib, pamiparib, talazoparib, olaprib, veliparib, HY-14478 and HY-102035, a HIF-PHD inhibitor such as roxadustat and HY-101023, pioglitazone, sitagliptin, lenvatinib, a TLR7 agonist such as HY-103039 and GS-9620, a STING agonist such as HY-19711, HY-103665 and HY-123943, an EP4 antagonist such as HY-42794, grapiprant, HY-111539, HY-112152, HY-10413, HY-50901, HY-10797 and HY-103088 or apatinib.

In another preferred embodiment of the first aspect of the invention, the compound according to formula (I) is selected from the group consisting of:
1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2(1H)-one;
1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2(1H)-one;
4-((4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;
4-((4-(3-bromophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;
1-((2R,4R,5R)-3,3-difluoro-4-hydroxy-5-(hydroxymethyl)tetrahydrofuran-2-yl)-4-((4-(3-fluorophenyl)-2-oxido-1,3,2-dioxaphosphinan-2-yl)amino)pyrimidin-2(1H)-one;
1-((2R,4R,5R)-3,3-difluoro-4-hydroxy-5-(hydroxymethyl)tetrahydrofuran-2-yl)-4-((4-(4-methoxyphenyl)-2-oxido-1,3,2-dioxaphosphinan-2-yl)amino)pyrimidin-2(1H)-one; and
((2R,3R,5R)-5-(4-((4-(3-chloro-4-methoxyphenyl)-2-oxido-1,3,2-dioxaphosphinan-2-yl)amino)-2-oxopyrimidin-1(2H)-yl)-4,4-difluoro-3-hydroxytetrahydrofuran-2-yl)methyl pivalate (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isobutyryloxy)methyl)tetrahydrofuran-3-yl isobutyrate ((2R,3R,5R)-3-acetoxy-5-(4-((4-(3-chlorophenyl)-2-oxido-1,3,2-dioxaphosphinan-2-yl)amino)-2-oxopyrimidin-1(2H)-yl)-4,4-difluorotetrahydrofuran-2-yl)methyl acetate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((propionyloxy)methyl)tetrahydrofuran-3-yl propionate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((2-methoxyacetoxy)methyl)tetrahydrofuran-3-yl 2-methoxyacetate;

1-(4-argio-2-oxido-1,3,2-dioxaphosphinan-2-yl)-5-fluoropyrimidine-2,4(1H,3H)-dione;

4-((4-argio-2-oxido-1,3,2-dioxaphosphinan-2-yl)amino)-1-((2RS,3R,4SR,5RS)-3,4-dihydroxy-5-(hydroxymethyl)tetrahydrofuran-2-yl)pyrimidin-2(1H)-one;

((2RS,3SR,4R,5RS)-5-(4-((4-argio-2-oxido-1,3,2-dioxaphosphinan-2-yl)amino)-2-oxopyrimidin-1(2H)-yl)-3,4-dihydroxytetrahydrofuran-2-yl)methyl valinate;

(Z)-3-((1-(4-argio-2-oxido-1,3,2-dioxaphosphinan-2-yl)-5-(tert-butyl)-1H-imidazol-4-yl)methylene)-6-((Z)-benzylidene)piperazine-2,5-dione;

(Z)-1-(4-argio-2-oxido-1,3,2-dioxaphosphinan-2-yl)-3-((Z)-benzylidene)-6-((5-(tert-butyl)-1H-imidazol-4-yl)methylene)piperazine-2,5-dione;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((pivaloyloxy)methyl)tetrahydrofuran-3-yl pivalate; and (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isopropyloxycarbonyloxy)methyl)tetrahydrofuran-3-yl isopropyl carbonate, a compound selected the following:

8

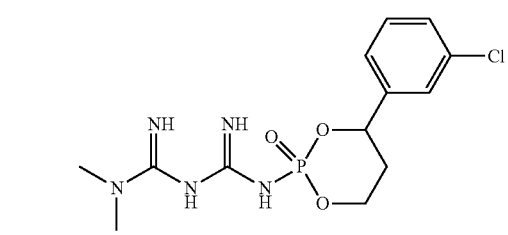

10

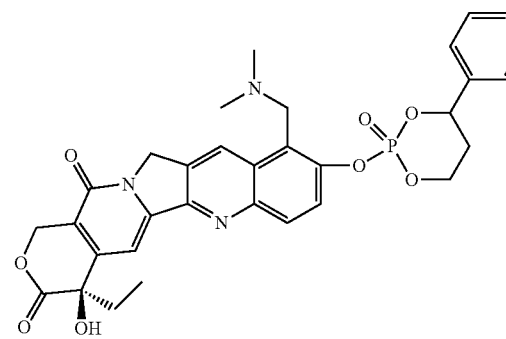

12

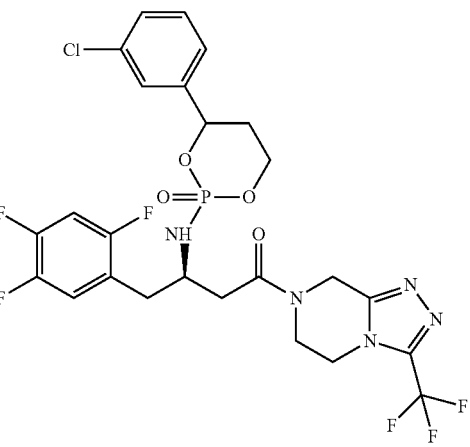

15

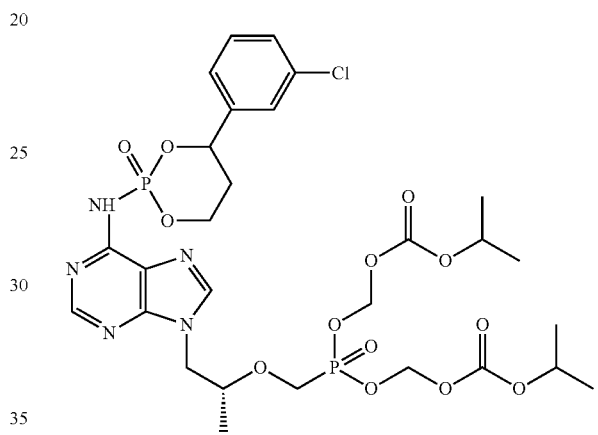

16

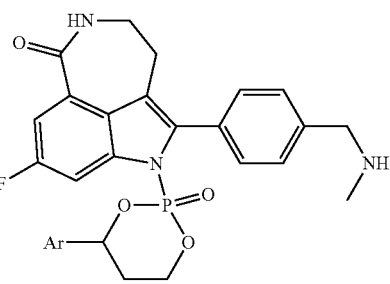

17

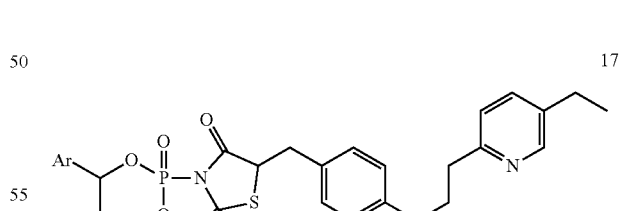

18

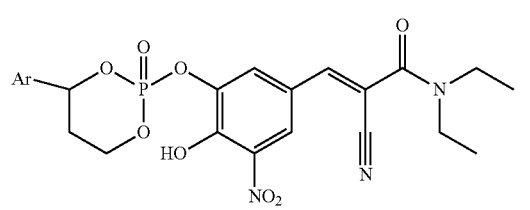

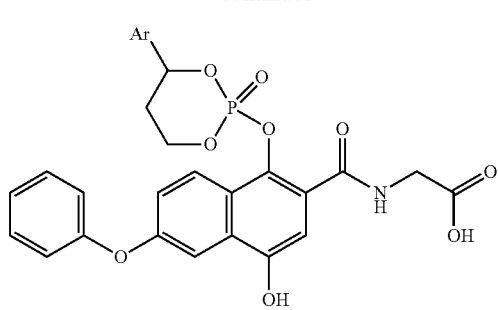
19
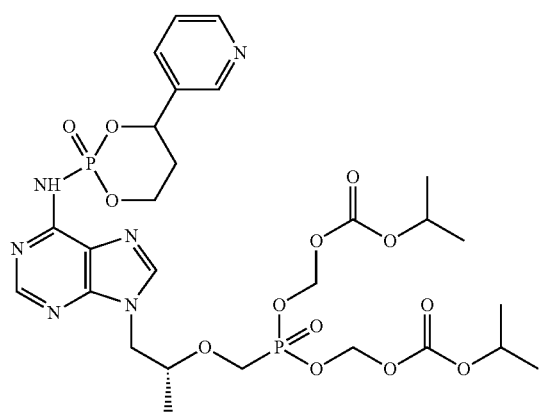
20
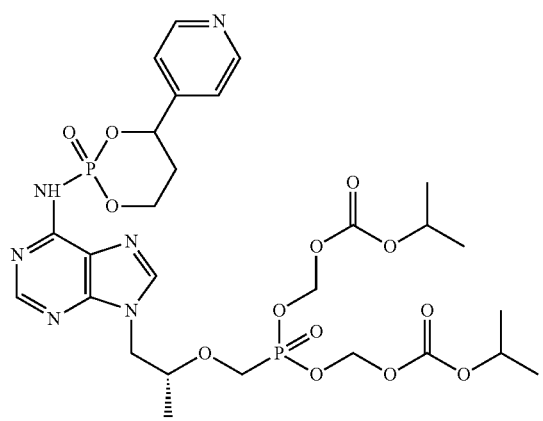
21
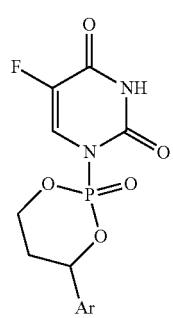
22
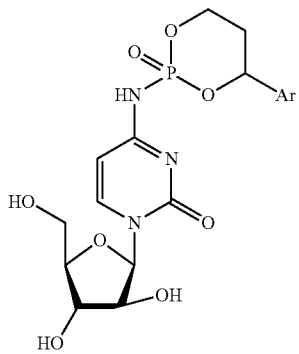
23
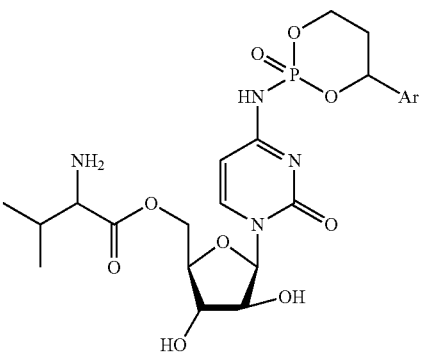
24
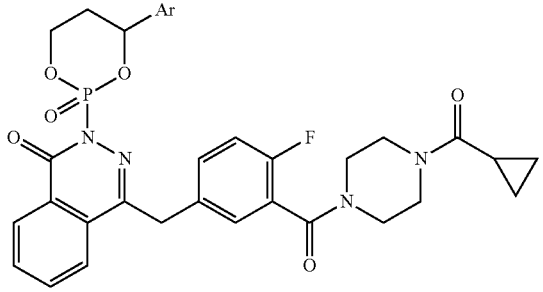
25
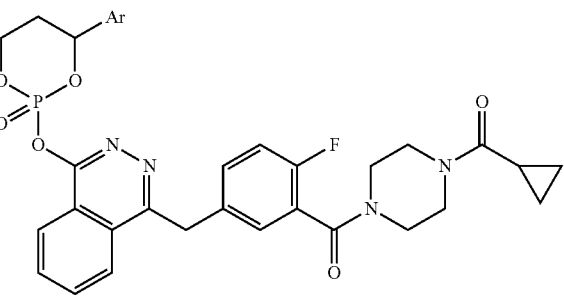
26

27
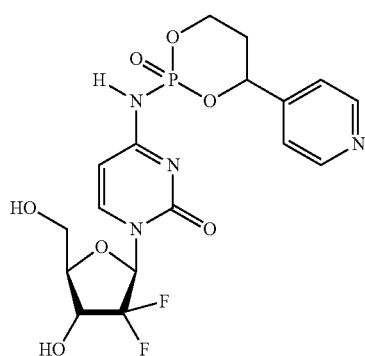
28
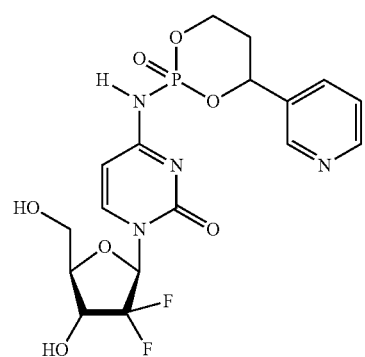
29
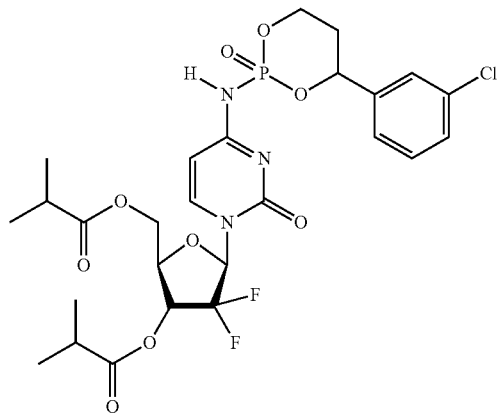
45
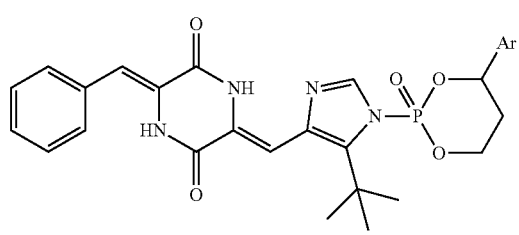
51
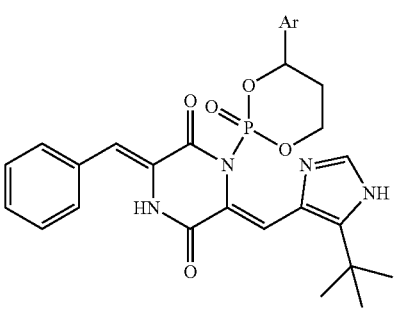
52
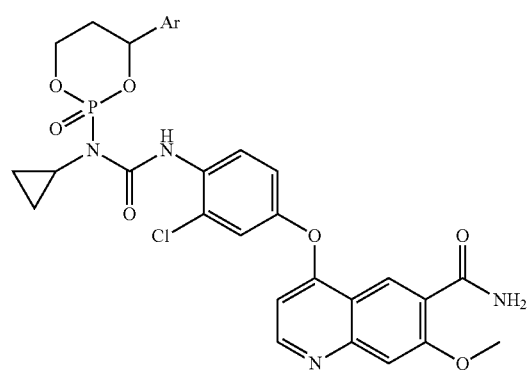
55
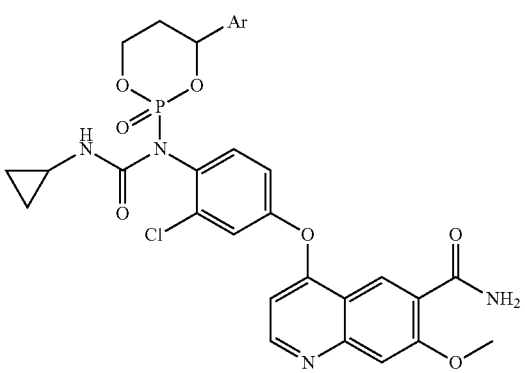
and,
56
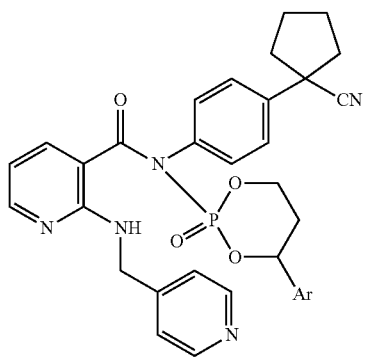

-continued
57
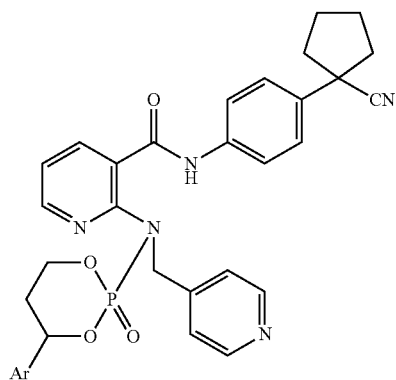
58
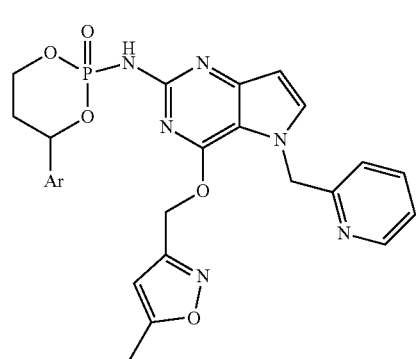
59
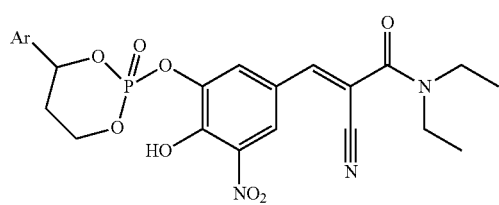
60
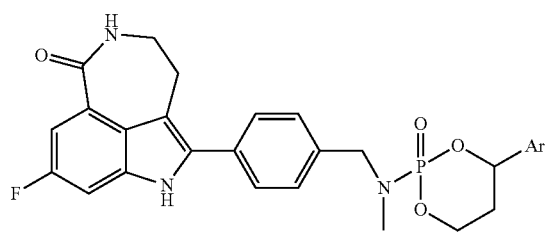
61
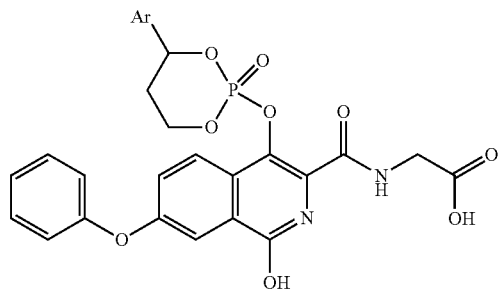
-continued
62
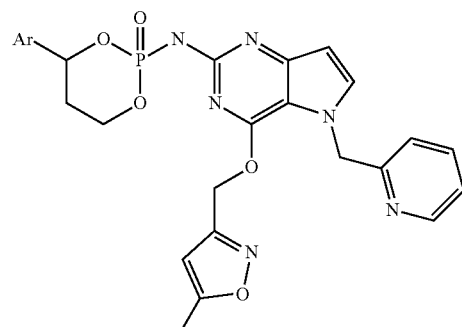
63
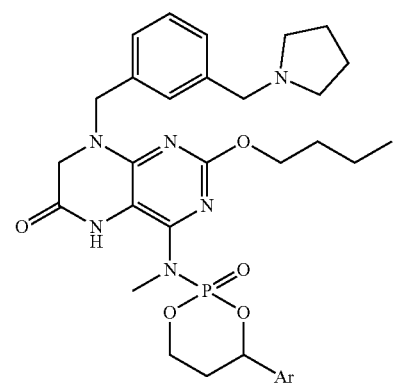
64
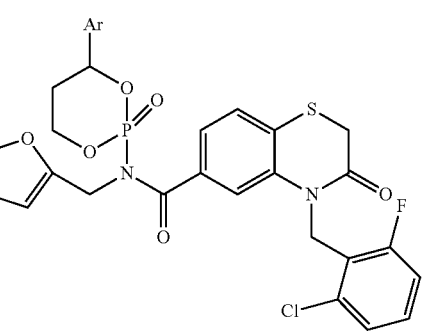
65
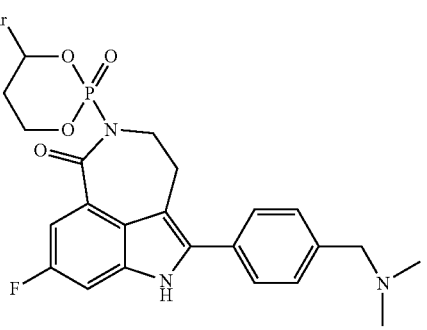

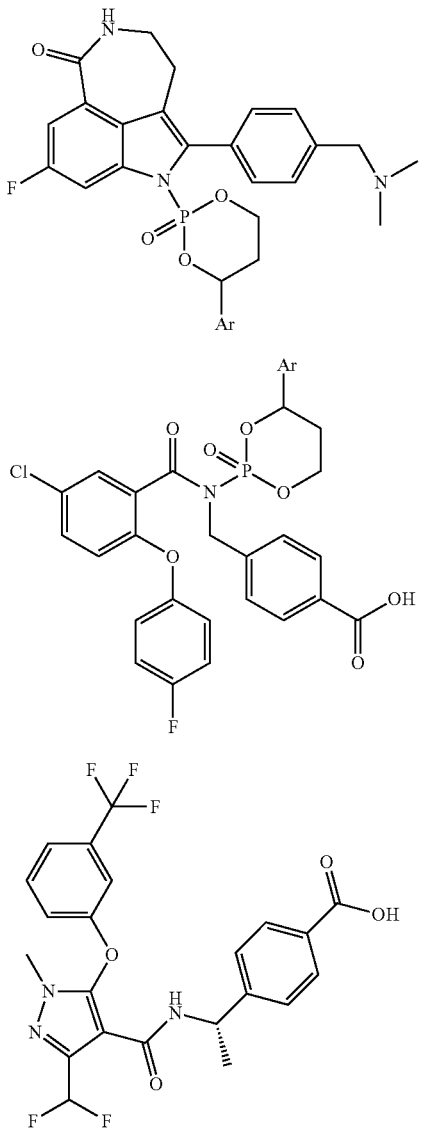

wherein Ar is as defined herein.

Another aspect of the invention provides a method for diagnosing, preventing and/or treating a disease in a mammal comprising administering to a mammal in need thereof an effective amount of a compound according to formula (I). Preferably, the disease is selected from the group consisting of cancers, metabolic diseases, viral infections, immunological diseases, neurologic diseases, and blood diseases, and the compound is administered orally or intravenously, and preferably the mammal is selected from the group consisting of human, mouse, rat, rabbit, hamster, guinea pig, monkey, dog, cat, pig, sheep, goat, cow and horse. Most preferably, the pharmaceutically active agent is gemcitabine, tenofovir disoproxil, metformin, topotecan, entacapone, nebicapone, a PARP inhibitor such as rucaparib, pamiparib, talazoparib, olaprib, veliparib, HY-14478 and HY-102035, a HIF-PHD inhibitor such as roxadustat and HY-101023, pioglitazone, sitagliptin, lenvatinib, a TLR7 agonist such as HY-103039 and GS-9620, a STING agonist such as HY-19711, HY-103665 and HY-123943, an EP4 antagonist such as HY-42794, grapiprant, HY-111539, HY-112152, HY-10413, HY-50901, HY-10797 and HY-103088 or apatinib.

The present invention also provides use of a compound according to formula (I) for the manufacture of an agent for the diagnosis, prevention and/or treatment of a disease in a mammal. Preferably, the disease is selected from the group consisting of cancers, metabolic diseases, viral infections, immunological diseases, neurologic diseases, and blood diseases, and the compound is administered orally or intravenously, and preferably the mammal is selected from the group consisting of human, mouse, rat, rabbit, hamster, guinea pig, monkey, dog, cat, pig, sheep, goat, cow and horse. Most preferably, the pharmaceutically active agent is gemcitabine, tenofovir disoproxil, metformin, topotecan, entacapone, nebicapone, a PARP inhibitor such as rucaparib, pamiparib, talazoparib, olaprib, veliparib, HY-14478 and HY-102035, a HIF-PHD inhibitor such as roxadustat and HY-101023, pioglitazone, sitagliptin, lenvatinib, a TLR7 agonist such as HY-103039 and GS-9620, a STING agonist such as HY-19711, HY-103665 and HY-123943, an EP4 antagonist such as HY-42794, grapiprant, HY-111539, HY-112152, HY-10413, HY-50901, HY-10797 and HY-103088 or apatinib.

The present invention further provides use of a compound according to formula (I) for the manufacture of an agent for the diagnosis, prevention and/or treatment of a disease in a mammal. Preferably, the disease is selected from the group consisting of cancers, metabolic diseases, viral infections, immunological diseases, neurologic diseases, and blood diseases, and the compound is administered orally or intravenously, and preferably the mammal is selected from the group consisting of human, mouse, rat, rabbit, hamster, guinea pig, monkey, dog, cat, pig, sheep, goat, cow and horse. Most preferably, the pharmaceutically active agent is gemcitabine, tenofovir disoproxil, metformin, topotecan, entacapone, nebicapone, a PARP inhibitor such as rucaparib, pamiparib, talazoparib, olaprib, veliparib, HY-14478 and HY-102035, a HIF-PHD inhibitor such as roxadustat and HY-101023, pioglitazone, sitagliptin, lenvatinib, a TLR7 agonist such as HY-103039 and GS-9620, a STING agonist such as HY-19711, HY-103665 and HY-123943, an EP4 antagonist such as HY-42794, grapiprant, HY-111539, HY-112152, HY-10413, HY-50901, HY-10797 and HY-103088 or apatinib.

The present invention further provides a compound according to formula (I) for use in the diagnosis, prevention and/or treatment of a disease in a mammal. Preferably, the disease is selected from the group consisting of cancers, metabolic diseases, viral infections, immunological diseases, neurologic diseases, and blood diseases, and the compound is administered orally or intravenously, and preferably the mammal is selected from the group consisting of human, mouse, rat, rabbit, hamster, guinea pig, monkey, dog, cat, pig, sheep, goat, cow and horse. Most preferably, the pharmaceutically active agent is gemcitabine, tenofovir disoproxil, metformin, topotecan, entacapone, nebicapone, a PARP inhibitor such as rucaparib, pamiparib, talazoparib, olaprib, veliparib, HY-14478 and HY-102035, a HIF-PHD inhibitor such as roxadustat and HY-101023, pioglitazone, sitagliptin, lenvatinib, a TLR7 agonist such as HY-103039 and GS-9620, a STING agonist such as HY-19711, HY-103665 and HY-123943, an EP4 antagonist such as HY-42794, grapiprant, HY-111539, HY-112152, HY-10413, HY-50901, HY-10797 and HY-103088 or apatinib.

The present invention further provides a pharmaceutical composition comprising a compound according to formula (I) in combination with a pharmaceutically acceptable carrier, diluent or excipient.

Another aspect of the invention provides a method of preparing a pharmaceutical composition comprising the step of combining a compound according to formula (I) with a pharmaceutically acceptable carrier, diluent or excipient.

In addition, the present invention also provides a method for preparing compounds of formula (I), comprising a coupling reaction of a compound of formula H—X-Q with a compound of formula Y in the presence of a base and a catalyst when necessary to obtain the compound of formula (I),

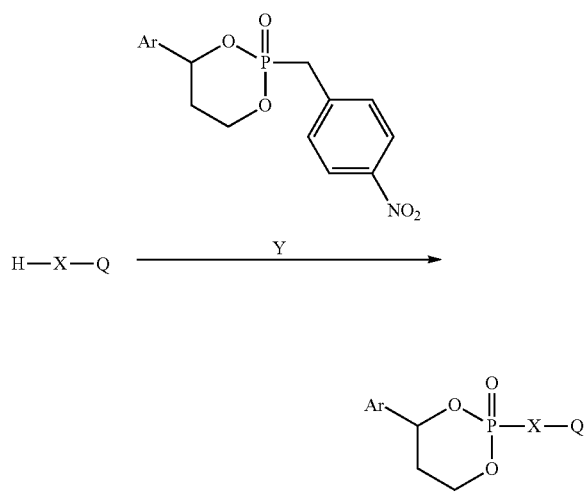

wherein Ar, X and Q are as defined herein.

Alternatively, the compounds of formula (I) may be prepared by a method comprising the reaction of a compound of formula H—X-Q with phosphoryl trichloride in a solvent (e.g., pyridine) in the presence of a base and a catalyst when necessary, followed by addition of a 1,3-propanediol derivative of formula Z to react to obtain the compound of formula (I),

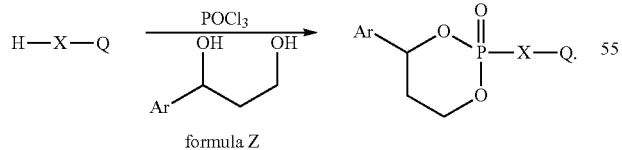

formula Z

Another aspect of the invention provides a method of delivering a pharmaceutically active agent into a mammal (preferably, the liver of the mammal), wherein the pharmaceutically active agent is as defined herein and preferably a chemical compound having at least one free (aromatic) amine, amide or phenol group; and the method comprises the following steps: preparing a compound according to formula (I) herein, and administering the compound according to any one of claims 1 to 6 to the mammal in need thereof.

Preferably, the pharmaceutically active agent as defined above is suitable for the treatment of a liver disease, directed to a liver disease or targeted to liver.

Based on the platform technology of the invention, we discovered various novel phosphoramide derivatives of gemcitabine as prodrugs. These prodrugs pass through the gastrointestinal (GI) tract substantially intact and are converted into gemcitabine inside liver, thus minimizing the formation of deoxydifluorouridine (dFdU), the predominant gemcitabine metabolite, in the GI, liver, and plasma. The significantly lower levels of dFdU (in both liver and plasma) observed with these phosphorus-containing prodrugs compared to gemcitabine itself (either i.v. or p.o. dosing) should be translated into much less toxicity compared to gemcitabine while maintaining appropriate efficacy and safety profiles when administered orally or intravenously.

Thus, the present invention aims to provide novel phosphorus-containing prodrugs of gemcitabine, which are capable of being given either orally or intravenously and delivering gemcitabine active metabolites to the liver selectively while minimizing the formation of dFdU. When the prodrugs are given orally they traverse the intestinal tract substantially intact into the portal bloodstream with less gastrointestinal toxicity and better bioavailability than with the parent drug (i.e., gemcitabine, aka dFdC) and maintaining the efficacy of the parent drug at lower doses. Therefore, these prodrugs can not only deliver gemcitabine to the liver but also reach other organs since the blood leaving the liver will carry gemcitabine into other organs. It is contemplated that in addition to treating liver cancer these phosphorus-containing gemcitabine prodrugs could be also useful to treat cancers of other organs such as pancreas, lung, prostate etc.

According to a preferred aspect of the present invention, there is provided a compound of formula (A):

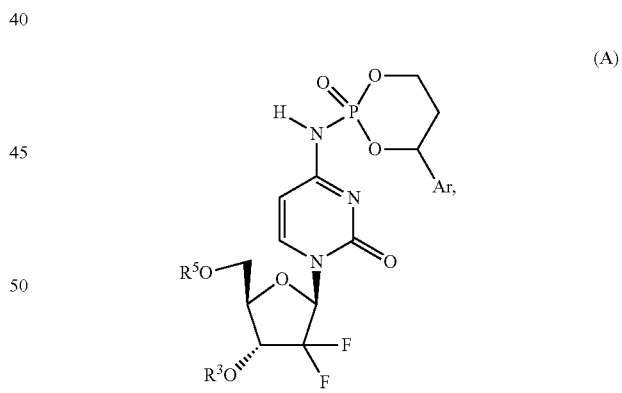

its stereoisomer, salt, hydrate, solvate, or crystalline form thereof;
wherein,
Ar is independently selected from the group consisting of optionally substituted aryl and heteroaryl;
$R^3$ is independently selected from the group consisting of hydrogen, acyl and alkoxycarbonyl;
$R^5$ is independently selected from the group consisting of hydrogen, acyl, alkoxycarbonyl and —PO(OAr') (NH—CR$^1$R$^2$—CO$_2$R$^4$),
or $R^3$ and $R^5$ together form a cyclic phosphate group as shown below:

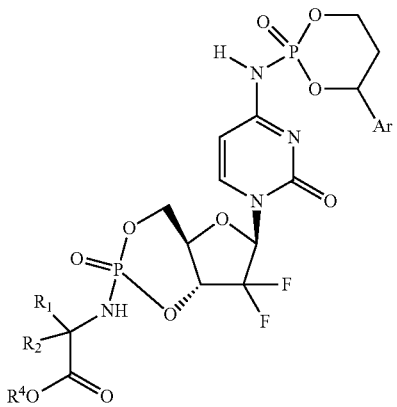
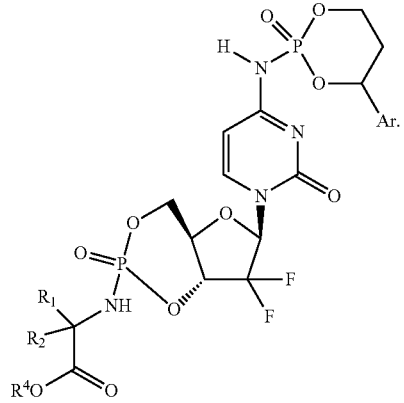

wherein
- $R^1$ and $R^2$ are independently selected from the group consisting of H, alkyl and alkylaryl, or $R^1$ and $R^2$ together form an alkylene chain so as to provide, together with the C atom to which they are attached, a cyclic system;
- $R^4$ is selected from the group consisting of alkyl, aryl and alkylaryl; and
- Ar' is a monocyclic aromatic ring moiety or a fused bicyclic aromatic ring moiety, either of which said ring moieties is carbocyclic or heterocyclic and is optionally substituted.

In a preferred embodiment of the preferred aspect of the invention, Ar is optionally substituted phenyl, or optionally substituted pyridyl, preferably 3-pyridyl and 4-pyridyl.

In another preferred embodiment of the preferred aspect of the invention, $R^3$ is hydrogen or acyl, preferably isobutyryl.

In another preferred embodiment of the preferred aspect of the invention, $R^5$ is —PO(OAr')(NH—$CR^1R^2$—$CO_2R^4$), $R^1$ and $R^2$ are independently selected from the group consisting of H, $C_{1-6}$ alkyl, $C_{1-3}$alkyl$C_{5-7}$aryl, or, when together they form an alkylene chain, they provide, together with the C atom to which they are attached, a $C_{3-8}$ carbocyclic aliphatic ring; $R^4$ is selected from the group consisting of a $C_{1-16}$ primary or secondary alkyl, a $C_{5-7}$ carbocyclic aryl and a $C_{1-6}$alkyl$C_{5-11}$ aryl, preferably methyl, ethyl or benzyl; and Ar' is an optionally substituted phenyl, preferably phenyl, $pCF_3C_6H_4$—, $pFC_6H_4$—, $pNO_2C_6H_4$—, $pClC_6H_4$— and $oClC_6H_4$—.

In another preferred embodiment of the preferred aspect of the invention, $R^1$ and $R^2$ are independently selected from the group consisting of H, methyl, benzyl and —$CH_2CH(CH_3)_2$, or $R^1$ and $R^2$ together with the C atom to which they are attached, provide a $C_{5-6}$ ring, preferably a pentyl ring.

In another preferred embodiment of the preferred aspect of the invention, $R^5$ is hydrogen, acyl (preferably isobutyryl), or —PO(OPh)(NH—$CR^1R^2$—$CO_2R^4$), wherein Ph represents phenyl, $R^1$ is H, $R^2$ is methyl, and $R^4$ is ethyl.

In another preferred embodiment of the preferred aspect of the invention, Ar is optionally substituted phenyl, or optionally substituted 3-pyridyl or 4-pyridyl, $R^3$ is hydrogen or isobutyryl, and $R^5$ is hydrogen or isobutyryl, or $R^3$ and $R^5$ together form a cyclic group as shown below:

In another preferred embodiment of the preferred aspect of the invention, Ar is 3-chlorophenyl, 3-pyridyl, or 4-pyridyl.

In another preferred embodiment of the preferred aspect of the invention, the compound according to formula (A) is selected from the group consisting of:
- 1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2(1H)-one;
- 1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2(1H)-one;
- 4-((4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;
- 4-((4-(3-bromophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;
- 1-((2R,4R,5R)-3,3-difluoro-4-hydroxy-5-(hydroxymethyl)tetrahydrofuran-2-yl)-4-((4-(3-fluorophenyl)-2-oxido-1,3,2-dioxaphosphinan-2-yl)amino)pyrimidin-2(1H)-one;
- 1-((2R,4R,5R)-3,3-difluoro-4-hydroxy-5-(hydroxymethyl)tetrahydrofuran-2-yl)-4-((4-(4-methoxyphenyl)-2-oxido-1,3,2-dioxaphosphinan-2-yl)amino)pyrimidin-2(1H)-one; and
- ((2R,3R,5R)-5-(4-((4-(3-chloro-4-methoxyphenyl)-2-oxido-1,3,2-dioxaphosphinan-2-yl)amino)-2-oxopyrimidin-1(2H)-yl)-4,4-difluoro-3-hydroxytetrahydrofuran-2-yl)methyl pivalate
- (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isobutyryloxy)methyl)tetrahydrofuran-3-yl isobutyrate
- ((2R,3R,5R)-3-acetoxy-5-(4-((4-(3-chlorophenyl)-2-oxido-1,3,2-dioxaphosphinan-2-yl)amino)-2-oxopyrimidin-1(2H)-yl)-4,4-difluorotetrahydrofuran-2-yl)methyl acetate;
- (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((propionyloxy)methyl)tetrahydrofuran-3-yl propionate;
- (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((2-methoxyacetoxy)methyl)tetrahydrofuran-3-yl 2-methoxyacetate;
- (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((pivaloyloxy)methyl)tetrahydrofuran-3-yl pivalate; and (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isopropyloxycarbonyloxy)methyl)tetrahydrofuran-3-yl isopropyl carbonate.

Another aspect of the invention provides a method of treating susceptible neoplasms in a mammal comprising administering to a mammal in need thereof a therapeutically effective amount of a compound according to formula (A). Preferably, the susceptible neoplasm is selected from the group consisting of the group consisting of T-cell lymphoma, soft tissue sarcoma, pancreatic cancer, breast cancer, Hodgkin's lymphoma, non-Hodgkin's lymphoma, non-small cell lung cancer, ovarian cancer, bladder cancer and Hepatocellular Carcinoma (HCC).

The present invention also provides use of a compound according to formula (A) for the manufacture of a medicament for the treatment of susceptible neoplasms. Preferably, the susceptible neoplasm is selected from the group consisting of the group consisting of T-cell lymphoma, soft tissue sarcoma, pancreatic cancer, breast cancer, Hodgkin's lymphoma, non-Hodgkin's lymphoma, non-small cell lung cancer, ovarian cancer, bladder cancer and Hepatocellular Carcinoma (HCC).

The present invention further provides a compound according to formula (A) for use in the treatment of susceptible neoplasms. Preferably, the susceptible neoplasm is selected from the group consisting of the group consisting of T-cell lymphoma, soft tissue sarcoma, pancreatic cancer, breast cancer, Hodgkin's lymphoma, non-Hodgkin's lymphoma, non-small cell lung cancer, ovarian cancer, bladder cancer and Hepatocellular Carcinoma (HCC).

The present invention further provides a pharmaceutical composition comprising a compound according to formula (A) in combination with a pharmaceutically acceptable carrier, diluent or excipient.

Another aspect of the invention provides a method of preparing a pharmaceutical composition comprising the step of combining a compound according to formula (A) with a pharmaceutically acceptable carrier, diluent or excipient.

In addition, the present invention also provides a method for preparing compounds of formula (A), comprising the following steps:

(i) protecting 5'-position (5'-OH) of gemcitabine with a suitable protection group to obtain a compound of formula (IV), wherein PG represents a suitable protection group for —OH group;

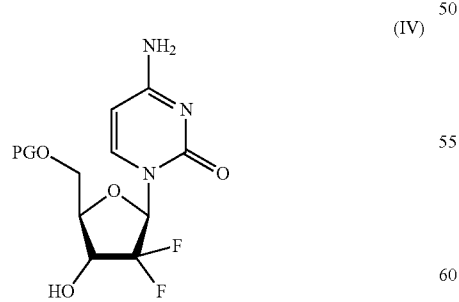

(ii) modifying the compound of formula (IV) (for example, by reacting the compound of formula (IV) with a compound of formula (V)) to obtain a compound of formula (III) (i.e., preparing N-prodrugs of gemcitabine), wherein Ar is as defined herein;

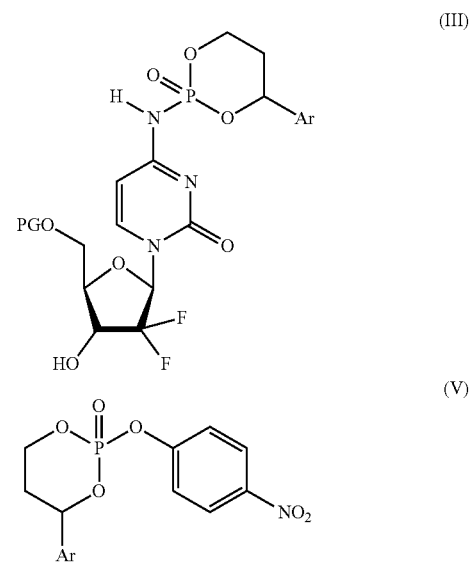

(iii) removing the protection group (PG) at 5'-position (5'-OH) of gemcitabine to obtain a compound of formula (II);

and, optionally further

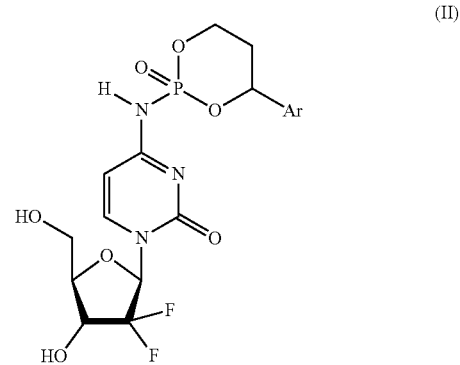

(iv) modifying the compound of formula (II) at 3'-position (3'-OH) and/or 5'-position (5'-OH) to obtain the compound of formula (A), wherein Ar, $R^3$ and $R^5$ are as defined herein

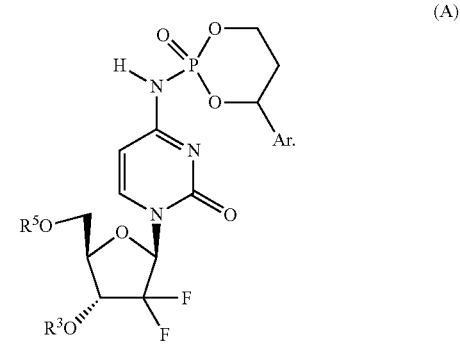

Furthermore, the present invention provides a method of treating susceptible neoplasms in a mammal comprising administering to a mammal in need thereof a therapeutically effective amount of a compound according to formula (A) in combination with at least one (preferably one or two) oncolytic agent and/or immune-oncology agent.

Preferably, the oncolytic agent is selected from the group consisting of 5-fluorouracil, chloroquine, S-1 (the combination drug tegafur/gimeracil/oteracil, Liu T W, et al. *Lancet Oncol.* 2016, 17: 12-4), vinorelbine, sorafenib, elpamotide, capecitabine, carboplatin, cisplatin, oxaliplatin, aurora kinase inhibitors (e.g. MSC1992371A, Investigational New Drugs, 2014, 32(1), 94-103), EGFR inhibitors (e.g. erlotinib, gefitinib), tyrosine kinase inhibitors (e.g. lapatinib, vandetanib), topoisomerase inhibitors (e.g. irinotecan, exatecan, Indotecan (LMP400) and Indimitecan (LMP776), nab-paclitaxel, paclitaxel, docetaxel, pemetrexed, curcumin and radiation therapy.

Preferably, the immune-oncology agent is selected from the group consisting of checkpoint inhibitors, PD-1, PD-L1, CTLA-4 and VEGF-A antibodies.

Another aspect of the invention provides a method of treating susceptible viral infections in a mammal comprising administering to a mammal in need thereof a therapeutically effective amount of a compound according to formula (A).

Another aspect of the invention provides a method for diagnosing, preventing and/or treating a disease in a mammal comprising administering to the mammal in need thereof an effective amount of a compound according to present invention combined with other therapeutic agents such as immune checkpoint inhibitors, microtubule inhibitors, PARP inhibitors, BTK inhibitors, EGFR TK inhibitors, cytotoxic platin agents. Preferably, the disease is selected from the group consisting of cancers, metabolic diseases, viral infections, immunological diseases, neurologic diseases, and blood diseases.

DETAILED DESCRIPTION OF THE INVENTION

Definitions

Figure 1:
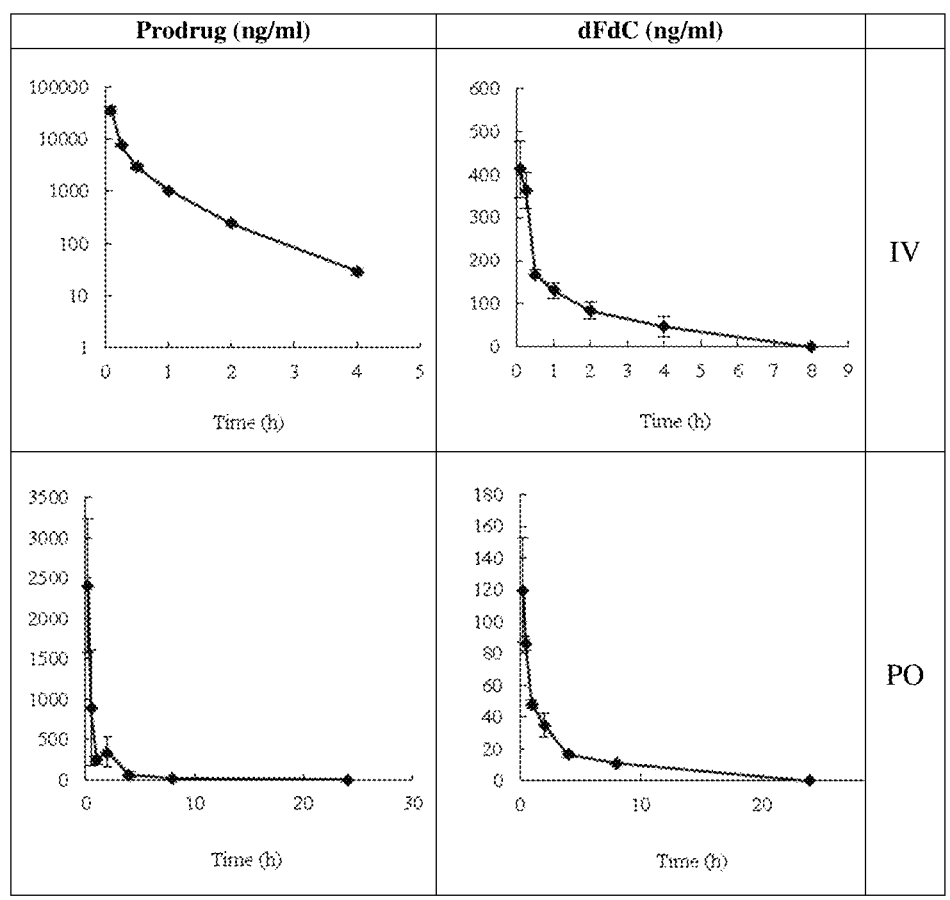
FIG. 1. Plasma exposures of Compound 4 and gemcitabine (aka dFdC) following i.v. administration (equivalent dose to 15 mg/kg of gemcitabine) or PO administration (80 mg/kg) of Compound 4.

The terms as used herein are to be construed with ordinary and typical meaning to those of ordinary skill in the art. However, the following terms are given the particular definition as defined below.

The term "alkyl" means a branched or unbranched, cyclic or acyclic, saturated or unsaturated (e.g., alkenyl or alkynyl) hydrocarbyl radical. Where cyclic, the alkylene group is preferably $C_3$ to $C_{12}$, more preferably $C_5$ to $C_{10}$, more preferably $C_5$ to $C_7$. Where acyclic, the alkyl group is preferably $C_1$ to $C_{16}$, more preferably $C_1$ to $C_6$ saturated alkyl, such as methyl, ethyl, propyl, butyl, pentyl and hexyl.

The term "aryl" or "aromatic group" refers to an aromatic group containing 5 to 14 ring atoms, for example phenyl or naphthyl.

The term "heteroaryl" or "heteroaromatic group" refers to an aryl group containing one, two, three or four, preferably one, heteroatoms independently selected from the group consisting of O, N and S. Examples of such heteroaryl include pyridyl, pyrrolyl, furanyl and thiophenyl.

The term "heterocyclic" refers to a cyclic group containing 1, 2, 3 or 4 heteroatoms selected, independently, from O, S and N, and may be selected from the group consisting of pyrrolyl, imidazolyl, pyraziolyl, thiazolyl, isothiazolyl, oxazolyl, pyrrolidinyl, pyrrolinyl, imidazolidinyl, imidazolinyl, pyrazolidinyl, tetrahydrofuranyl, pyranyl, pyronly, pyridyl, pyrazinyl, pyridazinyl, piperidyl, piperazinyl, orpholinyl, thionaphthyl, benzofuranyl, isobenzofuryl, indolyl, oxyindolyl, isoindolyl, indazolyl, indolinyl, 7-azaindolyl, isoindazolyl, benzopyranyl, coumarinyl, isocoumarinyl, quinolyl, isoquinolyl, naphthridinyl, cinnolinyl, quinazolinyl, pyridopyridyl, benzoxazinyl, quinoxadinyl, chromenyl, chromanyl, isochromanyl and carbolinyl. The ring atom number in the heterocyclic may be in the range of 3 to 20, such as 4 to 6, 5 to 10 (e.g., 3, 4, 5, 6, 7, 8, 9, 10, 11, 12, 13, 14, 15, 16, 17, 18, 19, 20).

The aryl, heteroaryl and heterocyclic groups may be substituted or unsubstituted. Where substituted, there will generally be one to three substituents present, preferably one substituent. Substituents may include halogen atoms, by which is meant F, Cl, Br and I atoms, and halomethyl groups such as $CF_3$ and $CCl_3$; oxygen containing groups such as oxo, hydroxy, carboxy, carboxy$C_{1-6}$alkyl, alkoxy, alkoyl, alkoyloxy, aryloxy, aryloyl and aryloyloxy; nitrogen containing groups such as amino, $C_{1-6}$alkylamino, cyano, azide and nitro; sulphur containing groups such as thiol, $C_{1-6}$alkylthiol, sulphonyl and sulphoxide; alkyl groups as defined above, which may themselves be substituted; and aryl groups as defined above, which may themselves be substituted, such as phenyl and substituted phenyl. Substituents on said alkyl and aryl groups are as defined immediately above.

The term "acyl" refers to a radical RCO— derived usually from an organic acid by removal of the hydroxyl from all acid groups, wherein R represents an alkyl group. Preferred examples of acyl include $C_{1-6}$acyl, such as formyl, acetyl, propionyl, butyryl (e.g., isobutyryl).

The terms "alkoxy" and "aryloxy" mean alkyl-O— (for example where alkyl is $C_1$ to $C_{16}$, preferably $C_1$ to $C_6$) and aryl-O— (for example where aryl is a 5 to 14 membered aromatic mono- or bifused ring moiety, optionally containing 1, 2, 3 or 4 heteroatoms selected, independently, from O, S and N, preferably aryl is phenyl), respectively.

The term "alkoxycarbonyl" means alkoxy-C(O)—, preferably $C_{1-16}$alkoxycarbonyl, and more preferably $C_{1-6}$alkoxycarbonyl, for example methylcarbonyl, ethylcarbonyl, propylcarbonyl, and butylcarbonyl.

The terms "alkoyl" and "aryloyl" mean alkyl-CO— (for example where alkyl is $C_1$ to $C_{16}$, preferably $C_1$ to $C_6$) and aryl-CO— (for example where aryl is a 5 to 14 membered aromatic mono or bifused ring moiety, optionally containing 1, 2, 3 or 4 heteroatoms selected, independently, from O, S and N, preferably aryl is phenyl), respectively.

The terms "alkoyloxy" and "aryloyloxy" mean alkyl-CO—O (for example where alkyl is $C_1$ to $C_{16}$, preferably $C_1$ to $C_6$) and aryl-CO—O (for example where aryl is a 5 to 14 membered mono- or bifused aromatic ring system, optionally containing 1, 2, 3 or 4 heteroatoms selected, independently, from O, S and N, preferably aryl is phenyl), respectively.

The term "free" in the expression "the pharmaceutically active agent is a chemical compound having at least one free (aromatic) amine, amide or phenol group" herein means the pharmaceutically active agent has an (aromatic) amine, amide or phenol group available to perform a suitable reaction(s) to obtain the compound of formula (I) according to present invention.

Compound of Formula (I)

An aspect of the invention is directed to a compound represented by formula (I), its stereoisomer, pharmaceutically acceptable salt, hydrate, solvate, or crystalline form thereof,

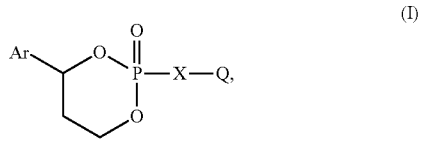

(I)

wherein,

Ar is independently selected from the group consisting of optionally substituted aryl and heteroaryl;

X is independently selected from —NR'—, —O—, —S—, optionally substituted heterocyclic and optionally substituted heteroaryl; preferably provided that when X is —O—, then Q must be an aromatic or heteroaromatic group;

R' is independently selected from the group consisting of hydrogen, optionally substituted alkyl, optionally substituted aryl, and optionally substituted heteroaryl; and Q is such a group that H—X-Q together represents a pharmaceutically active agent or prodrug thereof, and preferably the pharmaceutically active agent is a chemical compound having at least one free (aromatic) amine, amide or phenol group.

Preferably, the group Ar comprises a substituted or unsubstituted aryl group, wherein the term "aryl" and the possible substitution of said group is as defined herein. Preferably, Ar is a substituted or unsubstituted phenyl group. Particularly preferred substituents are electron withdrawing groups such as halogen (preferably chlorine or fluorine), trihalomethyl (preferably trifluoromethyl), cyano and nitro groups. For example, Ar can be phenyl, 3-chloro-phenyl, 3,5-dichloro-phenyl, p-trifluoromethyl-phenyl, p-cyano-phenyl, or p-nitro-phenyl. When Ar is a heteroaryl group, preferably it is optionally substituted pyridyl.

Suitably, Ar is a 5 to 14 membered aromatic ring moiety. The one or two rings may include 1, 2, 3 or 4 heteroatoms, preferably 1, selected, independently, from O, S and N.

Preferably, Ar is a carbo-monocyclic aromatic ring moiety. More preferably, Ar is a $C_6$ monocyclic aromatic ring moiety, i.e. is optionally substituted phenyl.

One, two, three or four substituents, which may be the same or different, may be present on Ar and are selected from the group comprising halogen, which may —F, —Cl, —Br or —I; —NO; —NH$_2$; optionally substituted —C$_{1-3}$alkyl; optionally substituted —C$_{1-3}$alkoxy, preferably methoxy (—OCH$_3$); optionally substituted —SC$_{1-3}$alkyl; —CN; optionally substituted —COC$_{1-3}$alkyl; and optionally substituted —CO$_2$C$_{1-3}$alkyl. The optional substitutents are one or more up to six, preferably three, members selected from the group comprising halogen which may be F, Cl, Br and I and NO$_2$. Preferred substituents on Ar include F, Cl, CF$_3$, and NO$_2$.

Most preferably, Ar is optionally substituted phenyl, preferably 3-chlorophenyl, or optionally substituted pyridyl, preferably 3-pyridyl and 4-pyridyl.

Preferably, the group X is —NR'—, and R' is hydrogen, optionally substituted alkyl, or optionally substituted aryl. In another preferred embodiment, X is —O— or —S—.

As long as H—X-Q together represents a pharmaceutically active agent or prodrug thereof, there is no particular limitation to the nature and identity of the chemical group Q. To form a compound of formula (I), however, it is preferred that the pharmaceutically active agent is a chemical compound having at least one free (aromatic) amine, amide or phenol group.

Most preferably, the compound of formula (I) is selected from the group consisting of:

1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2(1H)-one;

1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2(1H)-one;

4-((4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;

4-((4-(3-bromophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one;

1-((2R,4R,5R)-3,3-difluoro-4-hydroxy-5-(hydroxymethyl)tetrahydrofuran-2-yl)-4-((4-(3-fluorophenyl)-2-oxido-1,3,2-dioxaphosphinan-2-yl)amino)pyrimidin-2(1H)-one;

1-((2R,4R,5R)-3,3-difluoro-4-hydroxy-5-(hydroxymethyl)tetrahydrofuran-2-yl)-4-((4-(4-methoxyphenyl)-2-oxido-1,3,2-dioxaphosphinan-2-yl)amino)pyrimidin-2(1H)-one;

((2R,3R,5R)-5-(4-((4-(3-chloro-4-methoxyphenyl)-2-oxido-1,3,2-dioxaphosphinan-2-yl)amino)-2-oxopyrimidin-1(2H)-yl)-4,4-difluoro-3-hydroxytetrahydrofuran-2-yl)methyl pivalate (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isobutyryloxy)methyl)tetrahydrofuran-3-yl isobutyrate ((2R,3R,5R)-3-acetoxy-5-(4-((4-(3-chlorophenyl)-2-oxido-1,3,2-dioxaphosphinan-2-yl)amino)-2-oxopyrimidin-1(2H)-yl)-4,4-difluorotetrahydrofuran-2-yl)methyl acetate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((propionyloxy)methyl)tetrahydrofuran-3-yl propionate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((2-methoxyacetoxy)methyl)tetrahydrofuran-3-yl 2-methoxyacetate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((pivaloyloxy)methyl)tetrahydrofuran-3-yl pivalate; and (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isopropyloxycarbonyloxy)methyl)tetrahydrofuran-3-yl isopropyl carbonate, a compound selected the following:

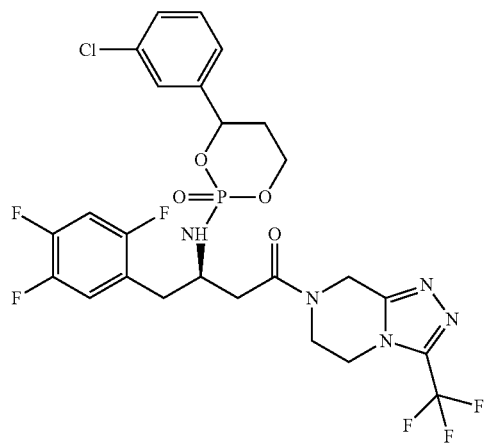

12

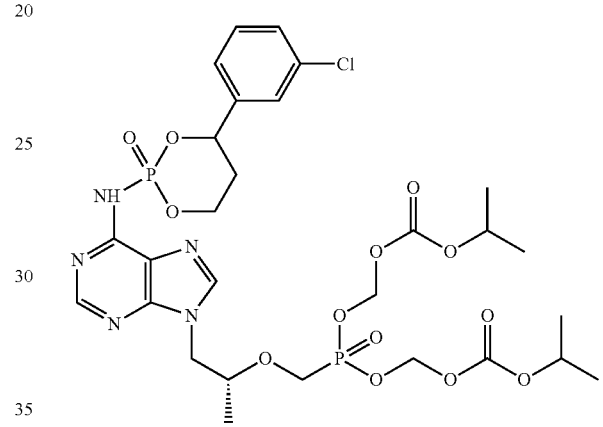

15

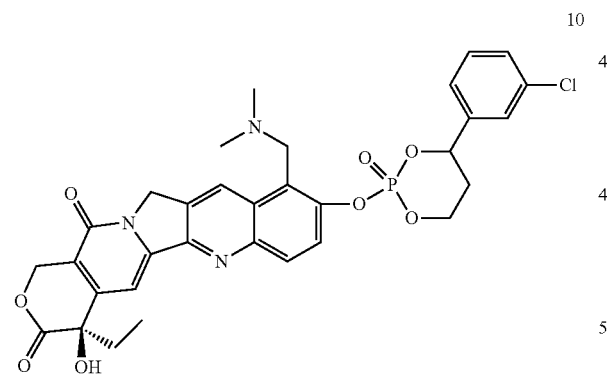

10

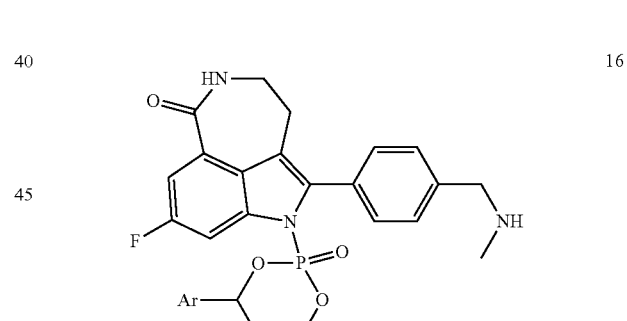

16

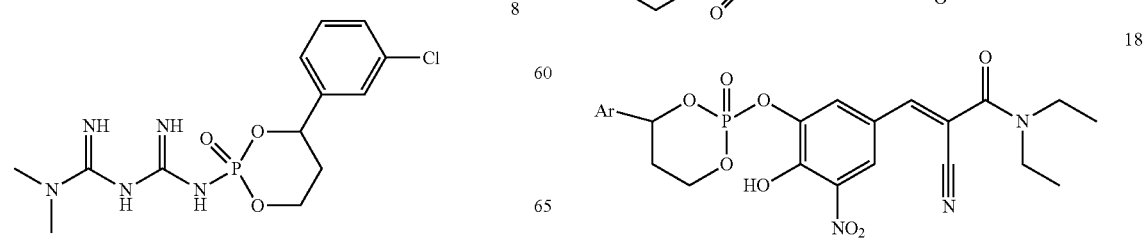

27
-continued
19
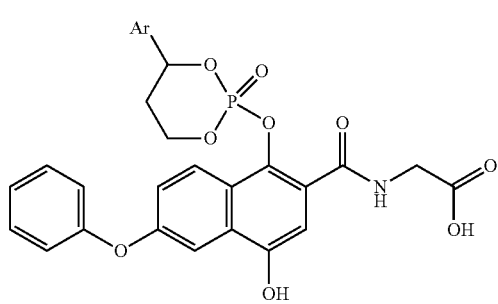
20
21
22
28
-continued
23
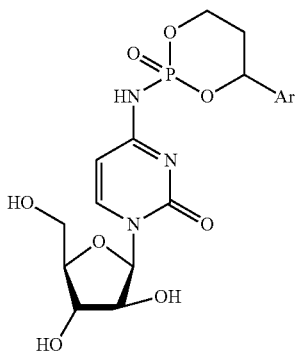
24
25
26

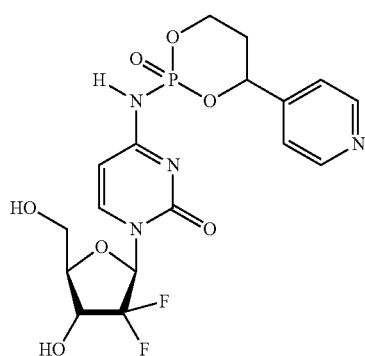
27
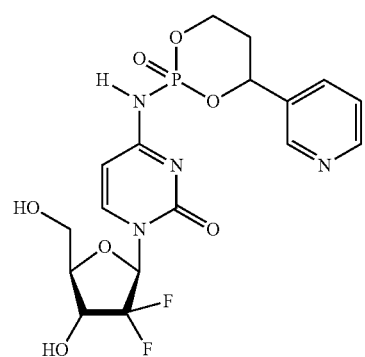
28
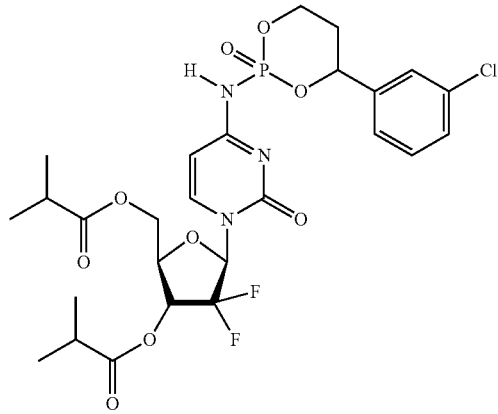
29
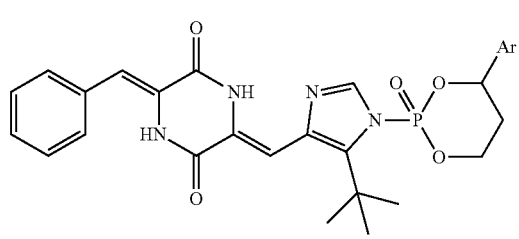
45
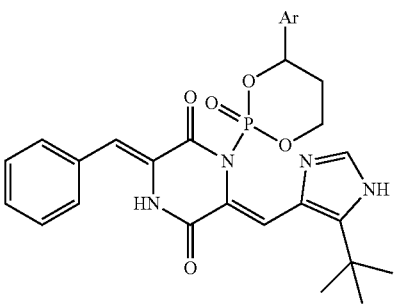
51
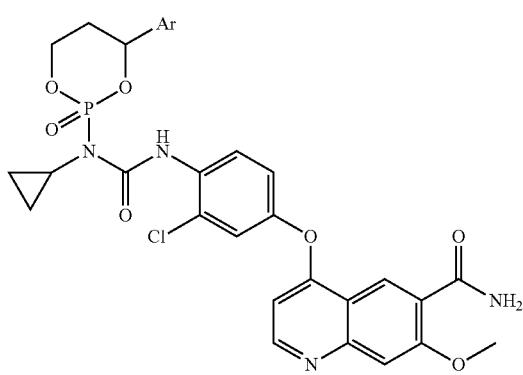
52
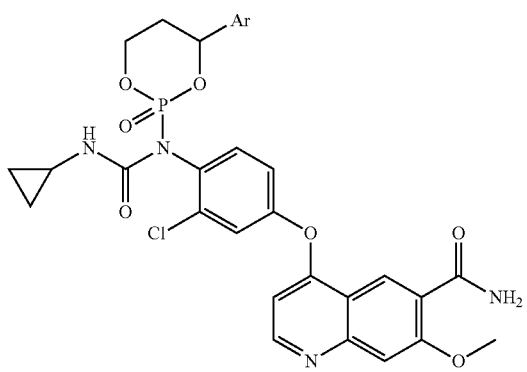
55
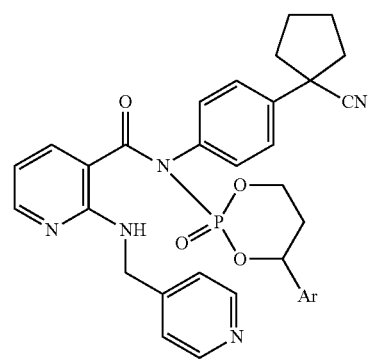
56

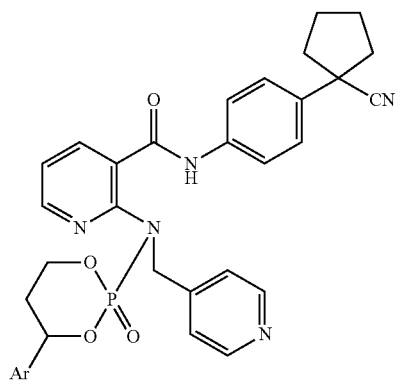
57
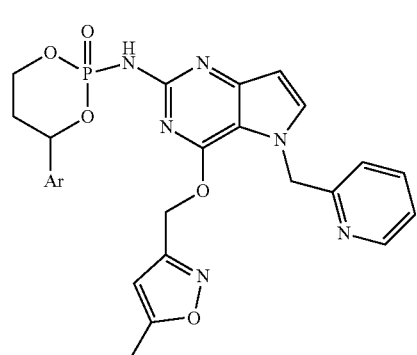
58
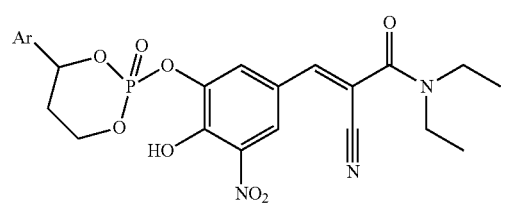
59
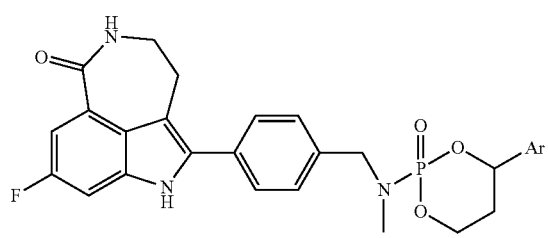
60
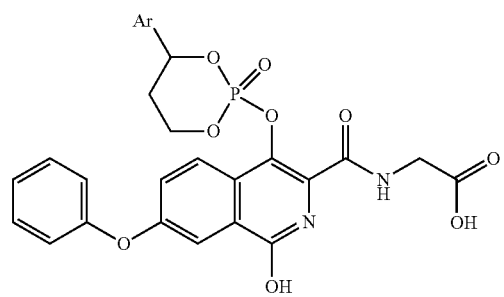
61
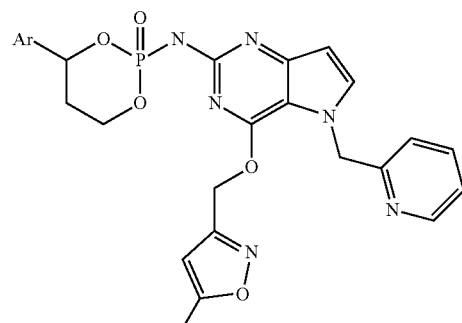
62
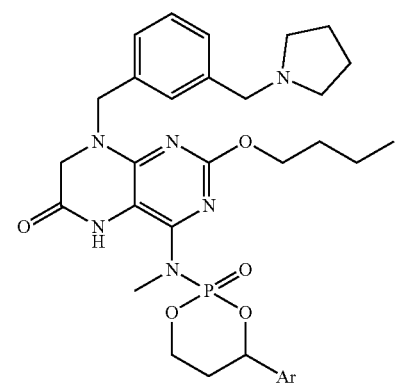
63
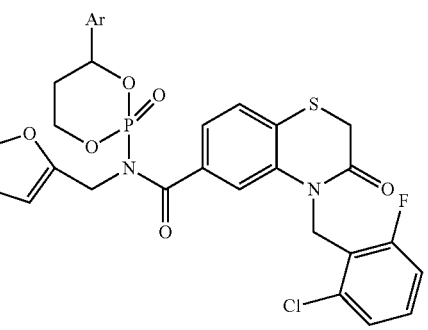
64
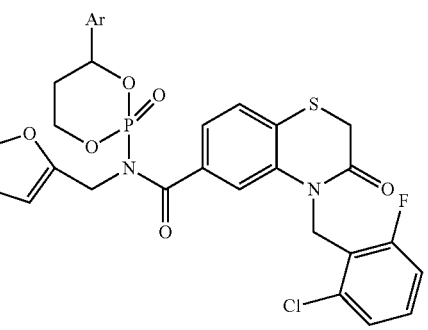
65

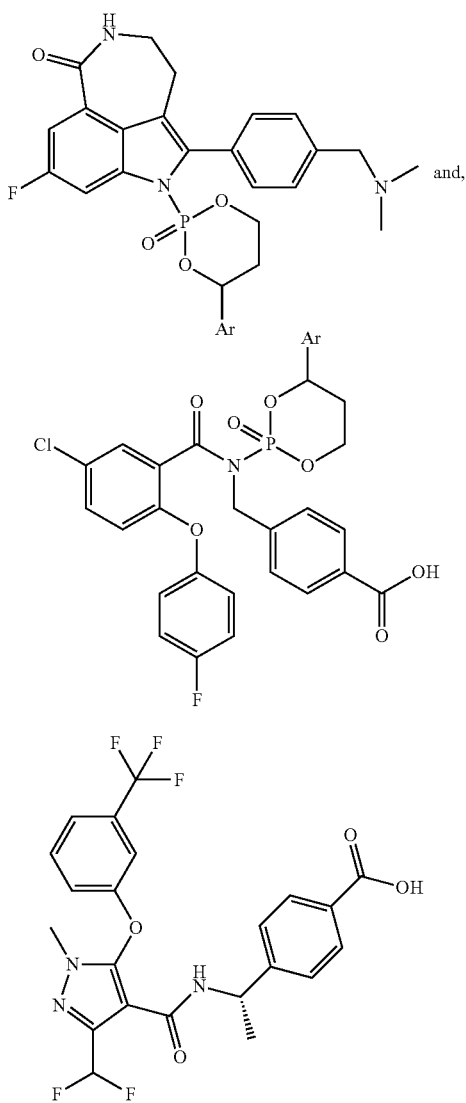

wherein Ar is as defined herein.

An aspect of the invention is directed to a compound represented by formula (A), its stereoisomer, pharmaceutically acceptable salt, hydrate, solvate, or crystalline form thereof, (A)

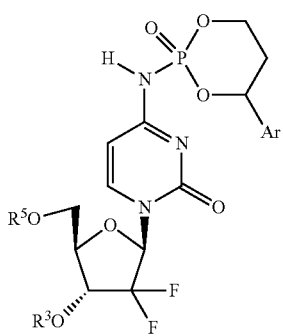

wherein,

Ar is independently selected from the group consisting of optionally substituted aryl and heteroaryl;

$R^3$ is independently selected from the group consisting of hydrogen, acyl and alkoxycarbonyl;

$R^5$ is independently selected from the group consisting of hydrogen, acyl, alkoxycarbonyl and —PO(OAr') (NH—CR$^1$R$^2$—CO$_2$R$^4$), or $R^3$ and $R^5$ together form a cyclic phosphate group as shown below:

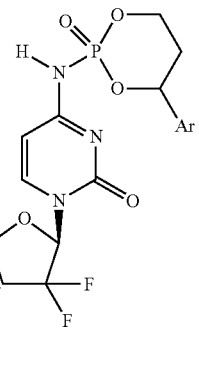

wherein $R^1$ and $R^2$ are independently selected from the group consisting of H, alkyl and alkylaryl, or $R^1$ and $R^2$ together form an alkylene chain so as to provide, together with the C atom to which they are attached, a cyclic system;

$R^4$ is selected from the group consisting of alkyl, aryl and alkylaryl; and

Ar' is a monocyclic aromatic ring moiety or a fused bicyclic aromatic ring moiety, either of which said ring moieties is carbocyclic or heterocyclic and is optionally substituted.

Preferably, the group Ar' comprises a substituted or unsubstituted aryl group, wherein the term "aryl" and the possible substitution of said group is as defined herein. Preferably, Ar' is a substituted or unsubstituted phenyl group. Particularly preferred substituents are electron withdrawing groups such as halogen (preferably chlorine or fluorine), trihalomethyl (preferably trifluoromethyl), cyano and nitro groups. For example, Ar' can be phenyl, 3-chlorophenyl, 3,5-dichloro-phenyl, p-trifluoromethyl-phenyl, p-cyano-phenyl, or p-nitro-phenyl. When Ar' is a heteroaryl group, preferably it is optionally substituted pyridyl.

Suitably, Ar' is a 5 to 14 membered aromatic ring moiety. The one or two rings may include 1, 2, 3 or 4 heteroatoms, preferably 1, selected, independently, from O, S and N.

Preferably, Ar' is a carbo-monocyclic aromatic ring moiety. More preferably, Ar' is a $C_6$ monocyclic aromatic ring moiety, i.e. is optionally substituted phenyl.

One, two, three or four substituents, which may be the same or different, may be present on Ar' and are selected from the group comprising halogen, which may —F, —Cl, —Br or —I; —NO; —NH$_2$; optionally substituted —C$_{1-3}$alkyl; optionally substituted —C$_{1-3}$alkoxy, preferably methoxy (—OCH$_3$); optionally substituted —SC$_{1-3}$alkyl; —CN; optionally substituted —COC$_{1-3}$alkyl; and optionally substituted —CO$_2$C$_{1-3}$alkyl. The optional substitutents are one or more up to six, preferably three, members selected from the group comprising halogen which may be F, Cl, Br and I and NO$_2$. Preferred substituents on Ar' include F, Cl, CF$_3$, and NO$_2$.

The substituents may be at any position on the ring moiety. Where the ring moiety is phenyl, a single substituent at the 2 (ortho) or 4 (para) position is preferred. Where Ar' is phenyl, a single substituent at the 4 position is more preferred.

Preferably, R$^4$ is a C$_{1-16}$ primary or secondary alkyl group, a C$_{5-7}$ carbocyclic aryl group or a C$_{1-6}$alkylC$_{5-11}$aryl group. More Preferably, R$^4$ is a C$_{1-10}$ alkyl group (most preferably C$_{1-6}$ alkyl group), a phenyl group or C$_{1-3}$alkylC$_{5-7}$ aryl group. Preferably R$^4$ is unsubstituted.

Preferably, R$^4$ is methyl (—CH$_3$), ethyl (—C$_2$H$_5$), n- or i-propyl (—C$_3$H$_7$), n- or i-butyl (—C$_4$H$_9$) or benzyl (—CH$_2$C$_6$H$_5$).

Suitably, R$^1$ and R$^2$ are each independently selected from the group comprising H, C$_{1-6}$ primary, secondary or tertiary alkyl, C$_{1-3}$alkylC$_{5-7}$ aryl, or, when together they form an alkylene chain, they provide, together the C atom to which they are attached, a C$_{3-8}$ carbocyclic aliphatic ring.

Alternatively, preferably, R$^1$ and R$^2$ are, independently, H, methyl (—CH$_3$), secondary butyl (—CH$_2$—CH—(CH$_3$)$_2$), benzyl (—CH$_2$C$_6$H$_5$), or, together with the C atom to which they are attached, provide a C$_{5-6}$ring.

Preferably, the group Ar comprises a substituted or unsubstituted aryl group, wherein the term "aryl" and the possible substitution of said group is as defined herein. Preferably, Ar is a substituted or unsubstituted phenyl group. Particularly preferred substituents are electron withdrawing groups such as halogen (preferably chlorine or fluorine), trihalomethyl (preferably trifluoromethyl), cyano and nitro groups. For example, Ar can be phenyl, 3-chloro-phenyl, 3,5-dichloro-phenyl, p-trifluoromethyl-phenyl, p-cyano-phenyl, or p-nitro-phenyl. When Ar is a heteroaryl group, preferably it is optionally substituted pyridyl, such as 3-pyridyl, or 4-pyridyl.

Preferably, R$^3$ is hydrogen, C$_{1-6}$alkyl, C$_{1-6}$acyl and C$_{1-6}$alkoxycarbonyl, more preferably hydrogen or isobutyryl.

Synthesis of the Compounds of the Invention

The compounds in this invention may be prepared by the processes described herein, as well as relevant published literature procedures that are used by those skilled in the art. All starting materials and reagents are well known in the art and/or readily commercially available or prepared by methods described herein. A process for preparing gemcitabine (2',2'-difluoro-2'-deoxycytidine), for example, is disclosed in U.S. Pat. No. 6,555,518. It should be understood that the following processes are provided solely for the purpose of illustration and do not limit the invention which is defined by the claims. Protection and deprotection in the Schemes may be carried out at various stages of the synthesis according to the procedures generally known in the art (e.g., "Protecting Groups in Organic Synthesis," 3rd Edition, Wiley, 1999).

Typically, the synthesis of a compound of formula (I) could be accomplished as described in the following section.

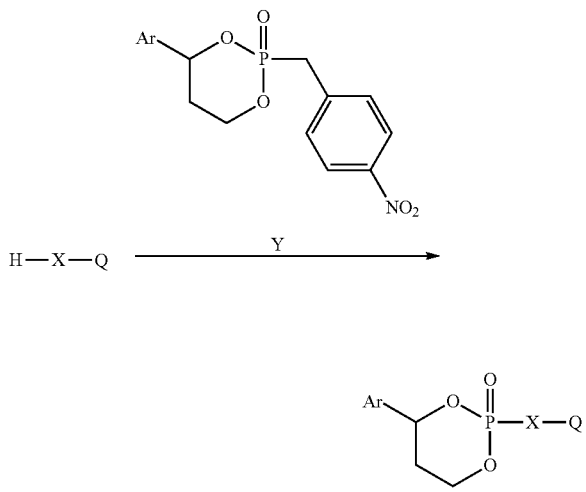

Scheme 1. Direct coupling of an active drug to the phosphorus-containing prodrug.

When possible, it is preferred that the active drug H—X-Q is directly coupled with a suitable key intermediate containing the desired phosphorus prodrug moiety in the presence of a suitable base to obtain the compound of formula (I), as described in Scheme 1. The phosphorylation agent Y is readily prepared using literature procedures and the reaction will produce the final prodrug in a single step and often be preferred to be the final step.

In particular, the synthesis of a compound of formula (I) wherein H—X-Q is gemcitabine includes the following general steps:

(1) Protection of the 5'-position of gemcitabine which could be carried out according to the procedures generally known in the art (e.g., "Protecting Groups in Organic Synthesis," 3rd Edition, Wiley, 1999). For example, selective protection of the 5'-OH could be achieved using TBDPSCl under suitable conditions;

(2) Preparation of a prodrug of the 4-amino group of gemcitabine;

(3) Removal of protecting groups; and (4) Modifications of an existing N-prodrug of gemcitabine.

The following exemplifies a method for preparing a particular compound of present invention, i.e., 4-((4-(3-chlorophenyl)-2-oxido-1,3,2-dioxaphosphinan-2-yl)amino)-1-((2R,4R,5R)-3,3-difluoro-4-hydroxy-5-(hydroxymethyl) tetrahydrofuran-2-yl)pyrimidin-2(1H)-one.

(1) Protection of the 5'-Position of Gemcitabine

Selective protection of the 3',5'-OH group of nucleosides are often achievable under suitable reaction conditions. For example, treatment of gemcitabine with tert-butyldimethylsilyl chloride (TBSCl) in the presence of a suitable base and suitable reaction conditions produces 3',5'-OTBS derivative of gemcitabine shown as follows.

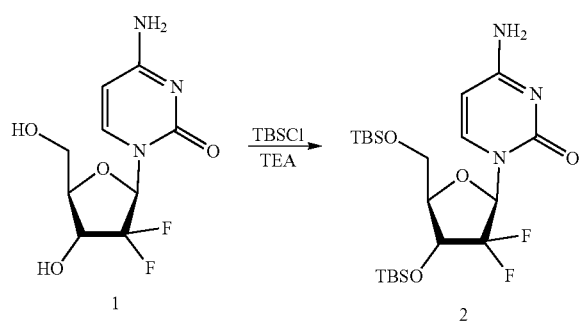

(2) Preparation of N-Prodrugs of Gemcitabine

Prodrugs can be introduced at different stages of the synthesis. Most often these prodrugs are introduced at the later stage of synthesis due to the lability of various prodrugs, while prodrugs could also be introduced at an early stage of the synthesis due to other considerations. For example, treatment of 3',5'-TBS protected gemcitabine with a para-nitrophenol 1,3-propanediol cyclic phosphate ester (Q) in the presence of a suitable base such as sodium hydride produces the N-phosphate ester prodrug derivative shown as follows. Alternatively, a racemic version of compound Q could also be used to produce compound 3 as diastereoisomers at the benzylic chiral center, and later separate out the two diastereoisomers.

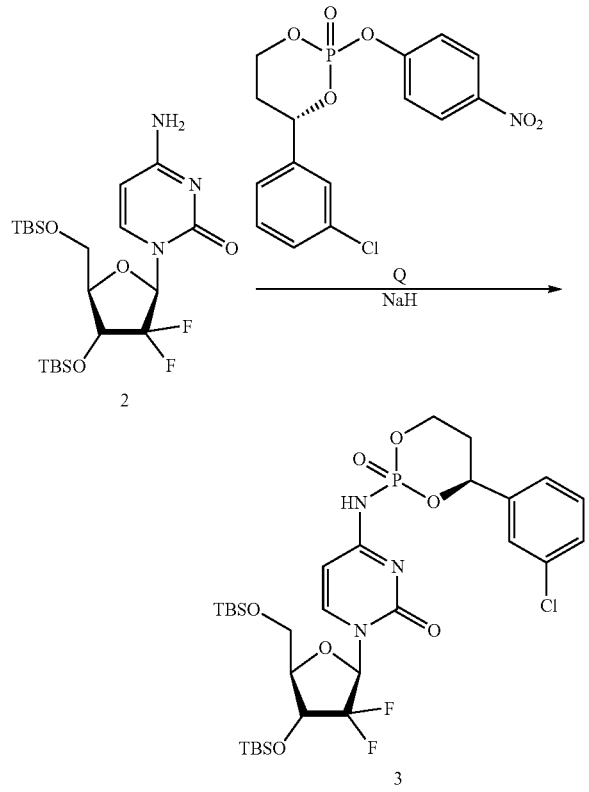

Other phosphorylation reagents and methods could also be used to attach a phosphorus-containing group to the 4-amino group of either a suitably protected form of gemcitabine or gemcitabine itself directly.

(3) Removal of Protecting Groups

Once the desired N-prodrug group is attached, the molecule could be either further modified at other positions or undergo deprotection reaction to remove protecting groups. For example, treatment of compound 5 with ammonium fluoride under suitable reaction conditions removes the 3',5'-TBS protecting groups.

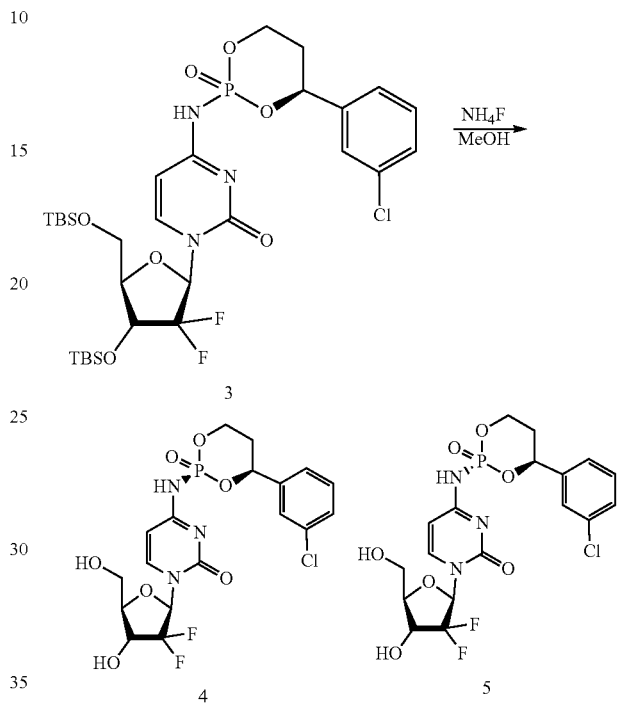

Other prodrugs of formula (I) could also be prepared and some examples are provided in the following section.

For example, the prodrug of metformin can be prepared using the following reaction scheme:

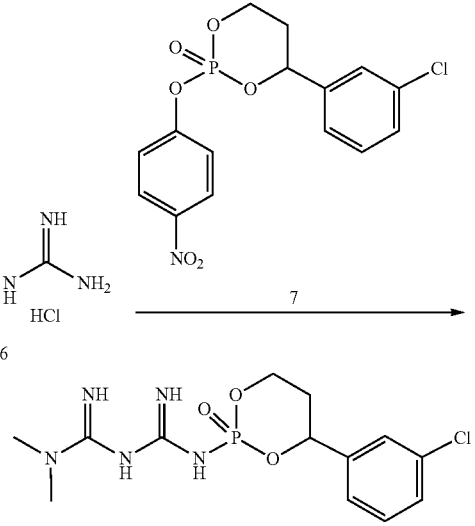

The preparation of a topotecan prodrug is exemplified as follows:

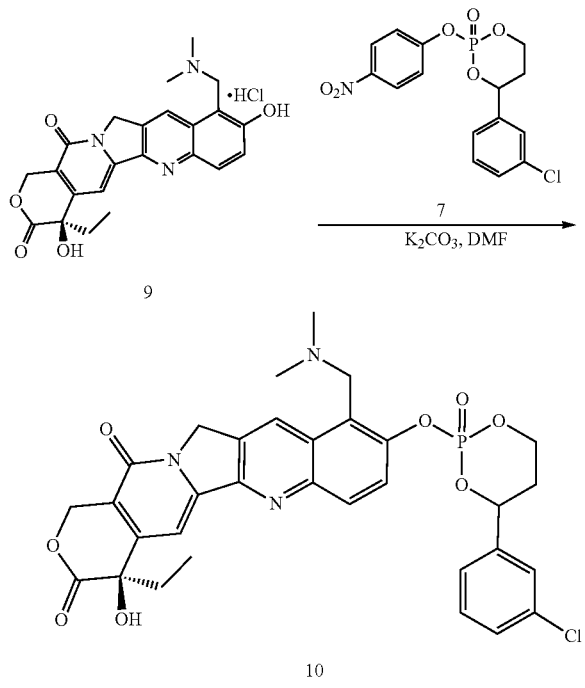

Another amine prodrug is exemplified via the preparation of sitagliptin prodrug as described below:

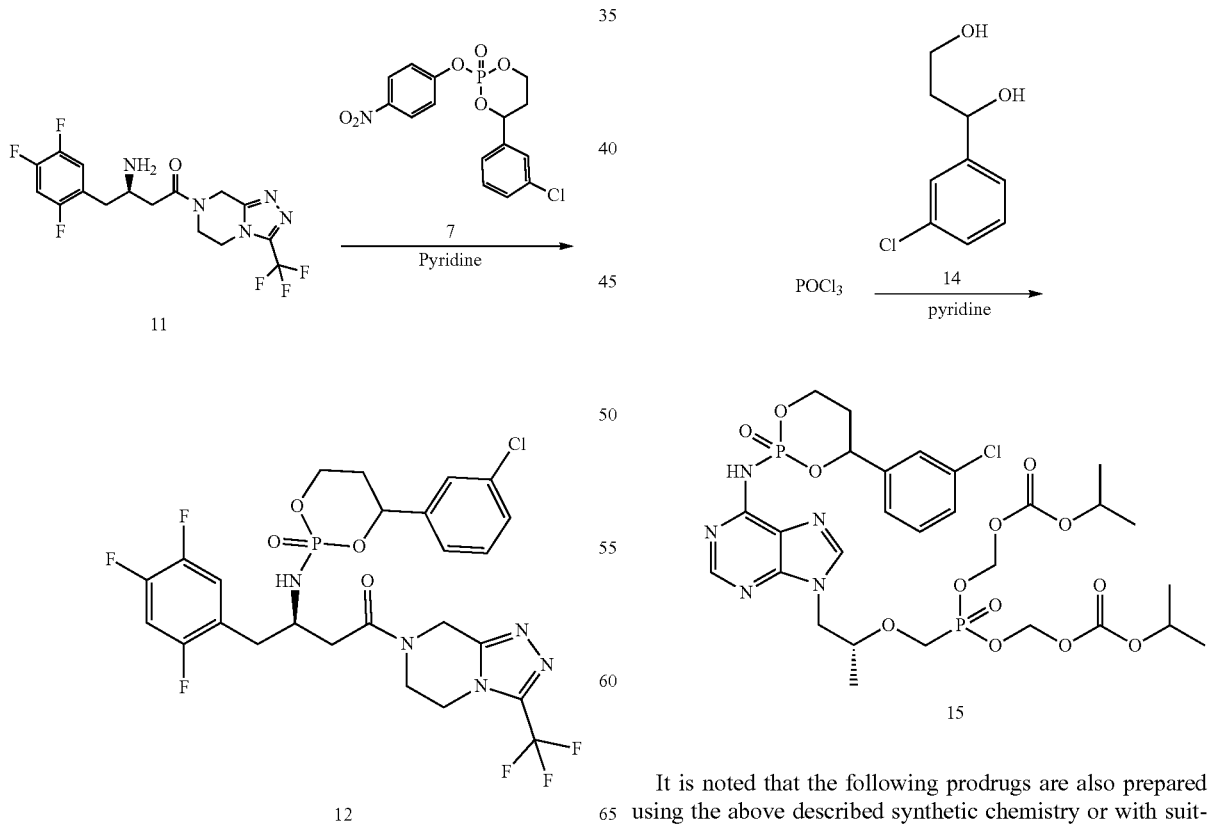

Alternatively, the coupling reaction could be carried out in a sequential fashion as described in the following Scheme 2.

Scheme 2. Sequential reactions to obtain the phosphorus-containing prodrug.

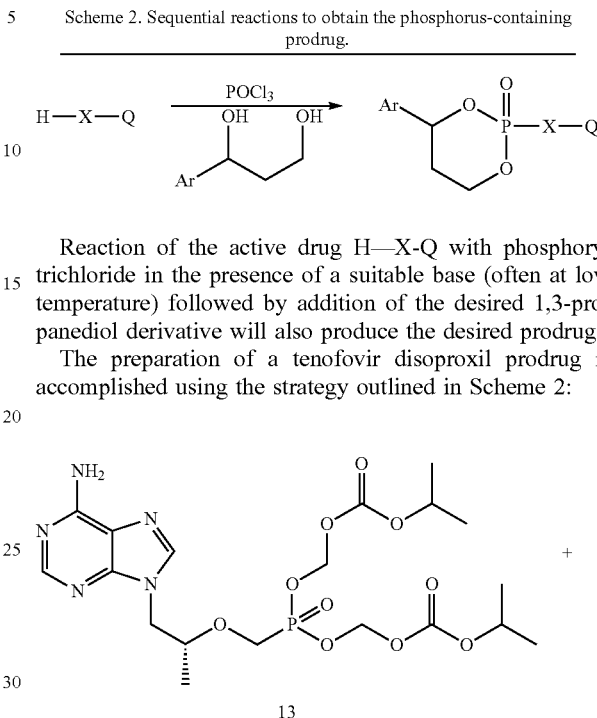

Reaction of the active drug H—X-Q with phosphoryl trichloride in the presence of a suitable base (often at low temperature) followed by addition of the desired 1,3-propanediol derivative will also produce the desired prodrugs.

The preparation of a tenofovir disoproxil prodrug is accomplished using the strategy outlined in Scheme 2:

It is noted that the following prodrugs are also prepared using the above described synthetic chemistry or with suitable modifications of the above described synthetic chemistry.

a compound selected the following:
8
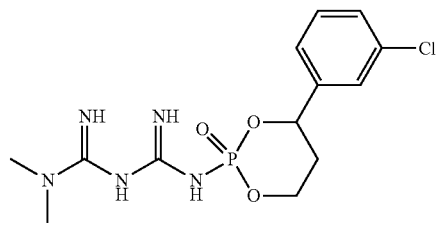
10
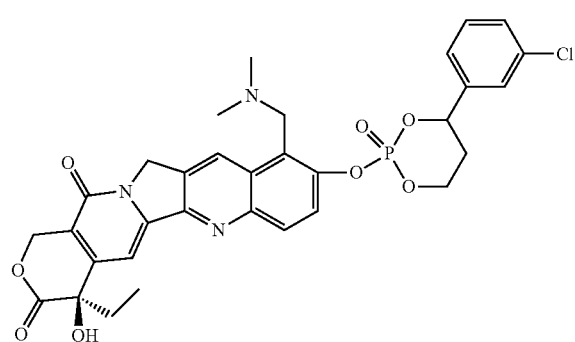
12
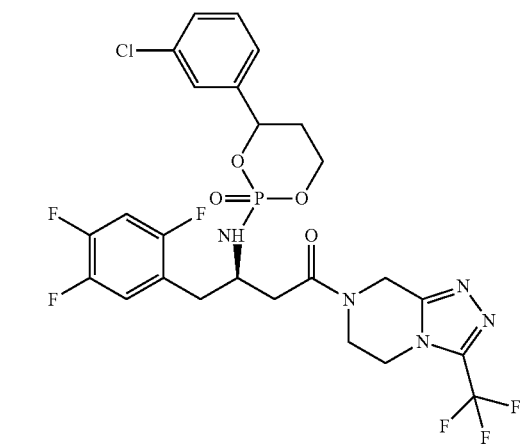
15
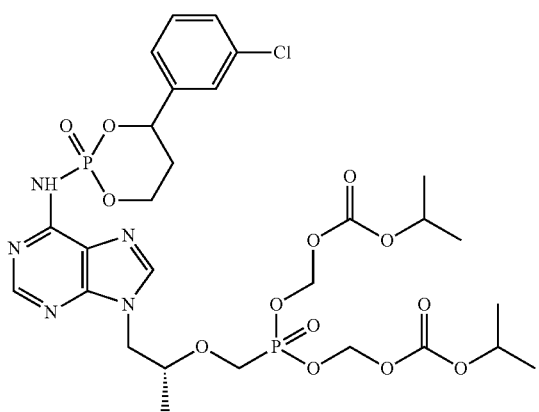
16
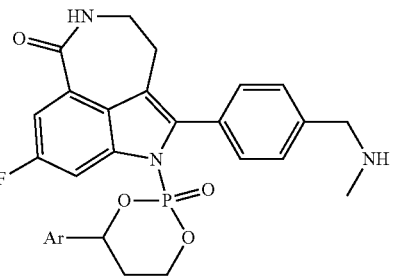
17
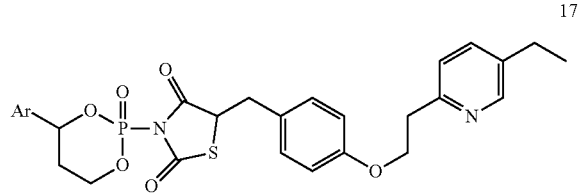
18
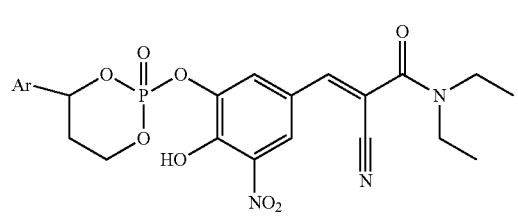
19
20
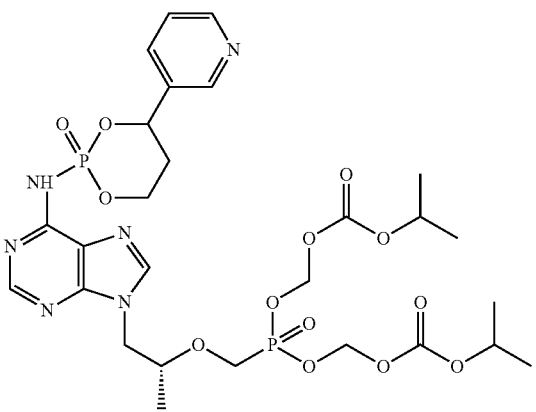

21
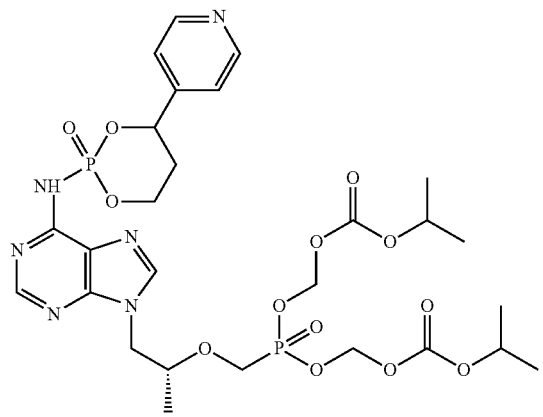
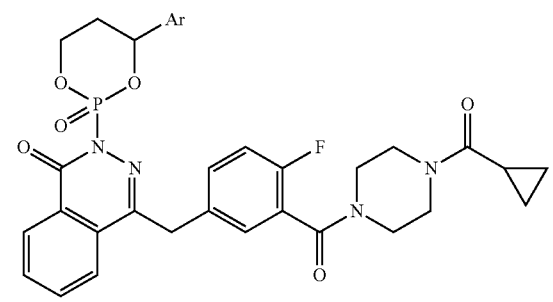
22
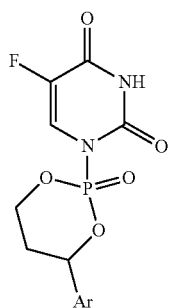
23
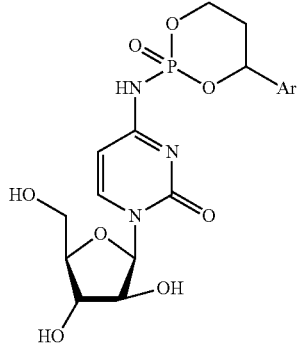
24
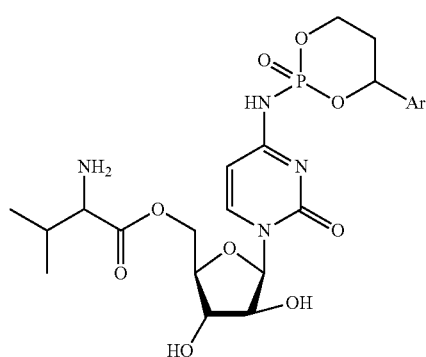
25
26
27
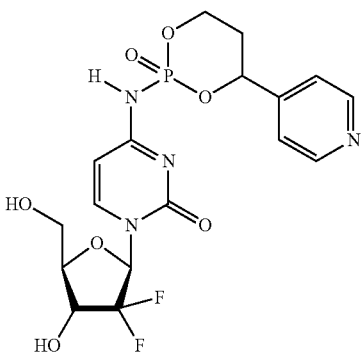
28
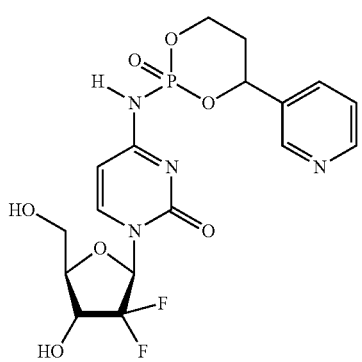

29
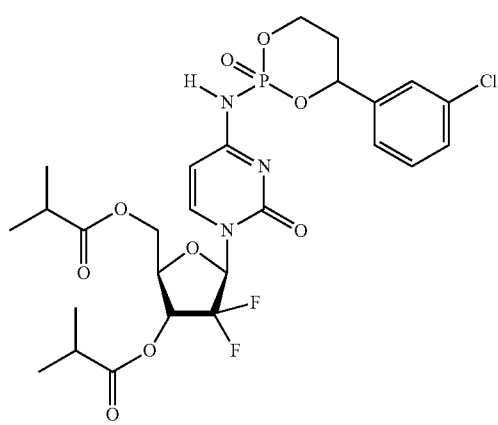
45
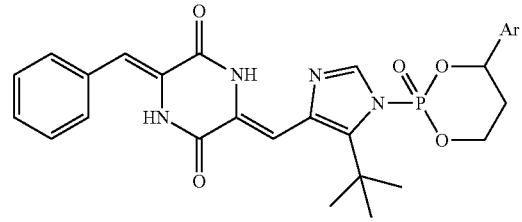
51
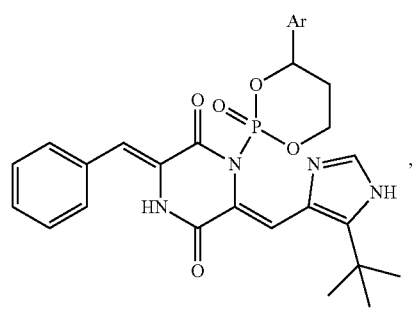
52
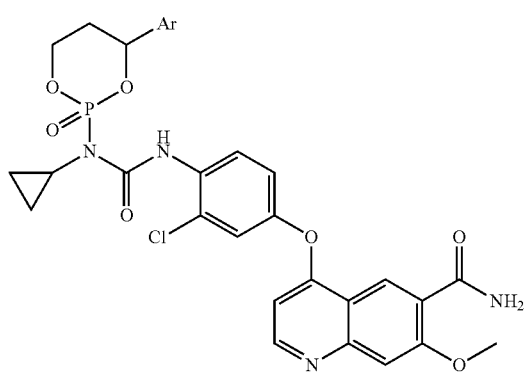
55
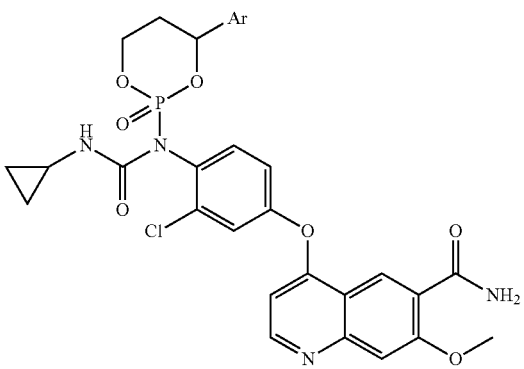
and,
56
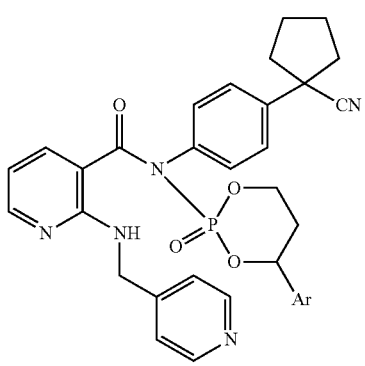
57
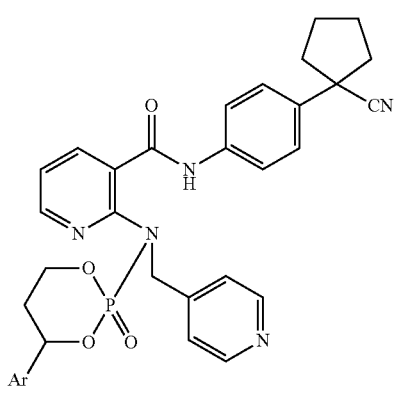
58
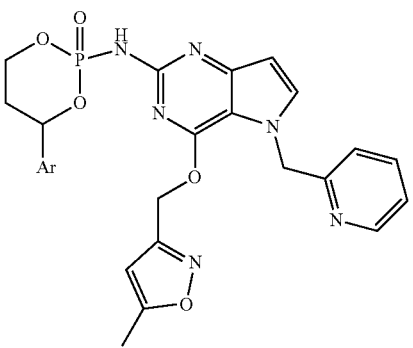

59
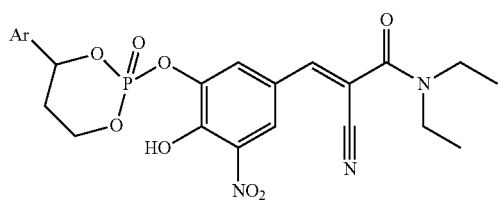
60
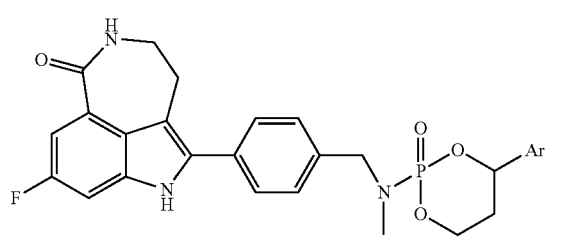
61
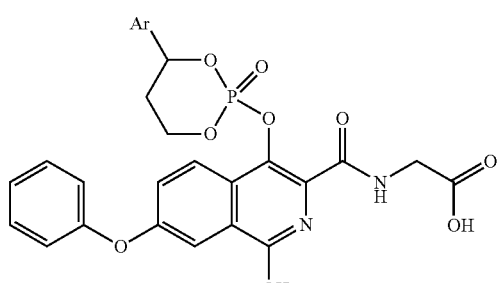
62
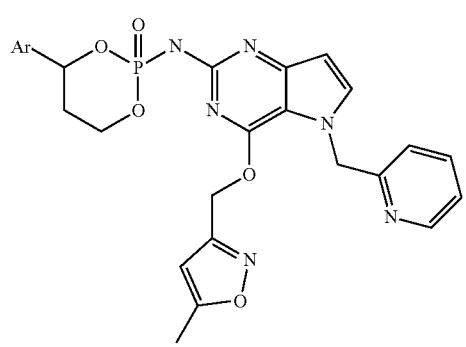
63
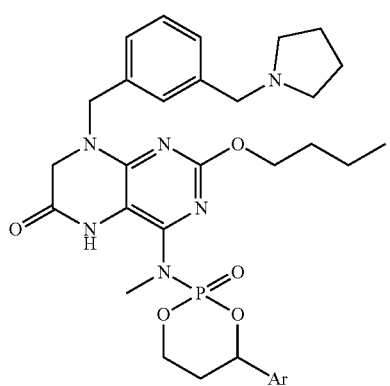
64
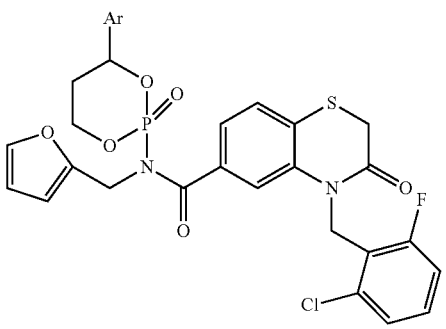
65
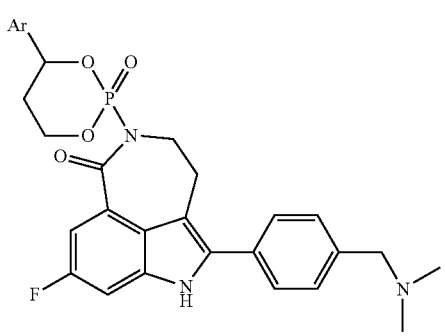
66
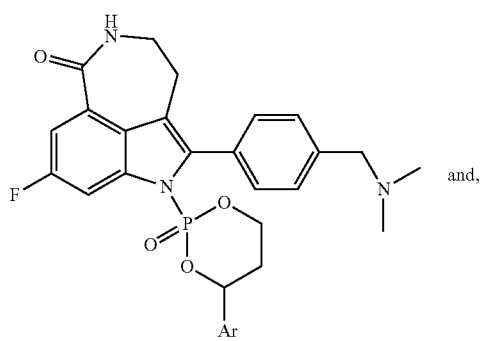
and,
67
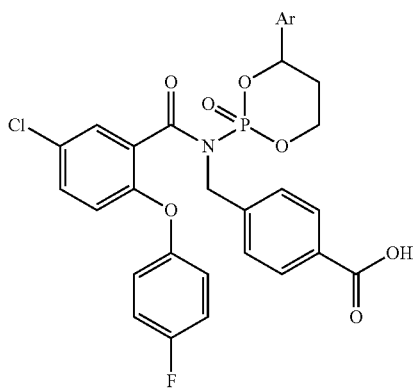

-continued

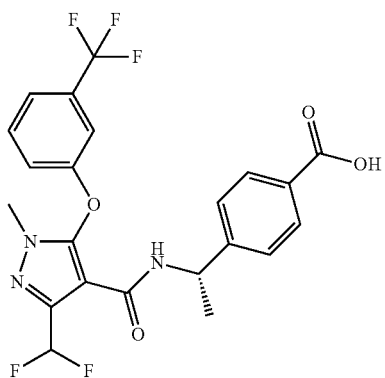

68 wherein Ar is as defined herein.

(4) Modifications of an Existing N-Prodrug of Gemcitabine

When necessary, other modifications could also be made at other positions of gemcitabine. Alternatively, another phosphate prodrug group could be attached to the 5'-position selectively. For example, treatment of compound 4a with phenyl dichlorophosphate followed by treatment with alanine ethyl ester in the presence of a suitable base under suitable reaction condition leads to compound 53 wherein both 5'- and N4-positions have phosphate prodrugs.

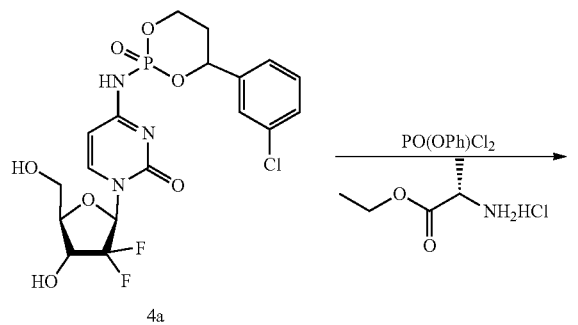

4a

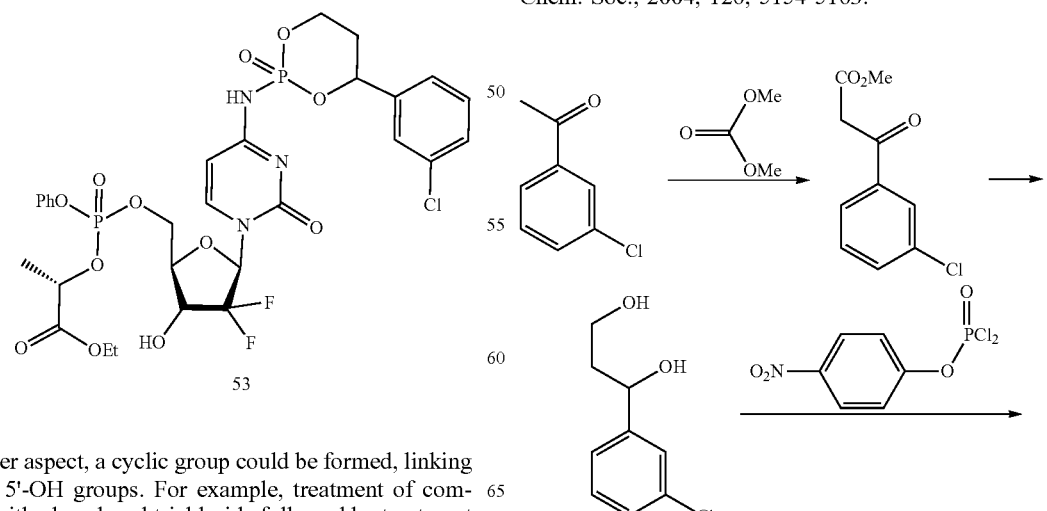

53

In another aspect, a cyclic group could be formed, linking the 3' and 5'-OH groups. For example, treatment of compound 4a with phosphoryl trichloride followed by treatment with alanine ethyl ester in the presence of a suitable base and under suitable reaction conditions generate compounds of formula (A) wherein $R^3$ and $R^5$ together formed a cyclic phosphate group.

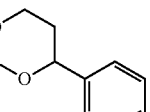

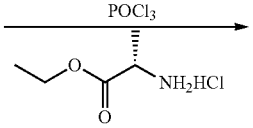

4a

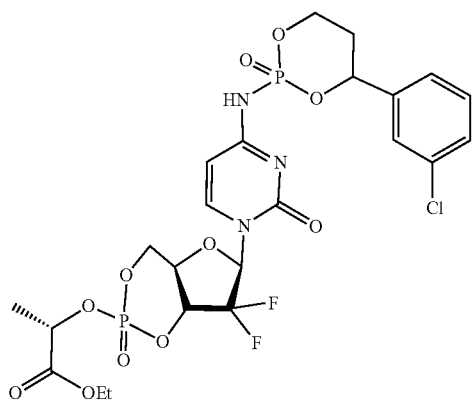

54

Preparation of Key Precursors

Various precursors could be prepared according to procedures reported by prior art documents. For example, the nitrophenyl 1,3-propane diol cyclic phosphate ester could be prepared following the procedures disclosed in J. Am. Chem. Soc., 2004, 126, 5154-5163.

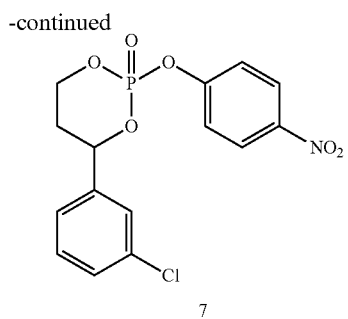

7

Alternatively, the propane-1,3-diol could be prepared stereoselectively to give a chiral compound and a chiral compound Q could be obtained after reacting with dichlorophosphoryl p-nitrophenol ester.

Other precursors of formula (V) can be prepared in a similar manner as above.

All stereoisomers of the compounds of the instant invention are contemplated, either in admixture or in pure or substantially pure form. The compounds of the present invention can have stereogenic centers at the phosphorus atom and at any of the carbons including any of the R substituents. Consequently, compounds of formula (I)/formula (A) can exist in enantiomeric or diastereomeric forms or in mixtures thereof. The processes for preparation can utilize racemates, enantiomers or diastereomers as starting materials. When enantiomeric or diastereomeric products are prepared, they can be separated by conventional methods. For example, chromatography or fractional crystallization can be used to separate diastereomeric mixtures, while derivatives of enantiomeric isomers can be separated via chromatography.

One aspect of the present invention provides a method to synthesize and isolate single isomers of compounds of formula (I)/formula (A). Because phosphorus is a stereogenic atom, formation of a prodrug with a racemic substituted 1,3-propane diol will produce a mixture of isomers. In another aspect, the use of the enantioenriched substituted 1,3-propane diol with the R configuration gives enantioenriched R cis and R trans prodrugs. These compounds can be separated by a combination of column chromatography and/or fractional crystallization.

Prodrugs often are introduced at the later stage of synthesis, while some prodrugs could also be introduced at an early stage of the synthesis due to other considerations.

Alternatively, the compounds of formula (I)/formula (A) can be prepared by using suitable protecting groups to block the 3' and 5' hydroxyl functions followed by functionalization of the N4-amino group. Typical protecting groups are well known and summarized in the art (Protecting Groups in Organic Synthesis, 3rd edition Theodora Greene, Peter Wuts (Wiley-Interscience) 1999). On the other hand, the compounds of formula (I)/formula (A) may be prepared without the use of protecting groups.

Formulations, Dosage and Use

Compounds of the invention are administered in a total daily dose of 0.01 to 2500 mg. In one aspect the range is about 5 mg to about 500 mg. The dose may be administered in as many divided doses as is convenient.

Compounds of this invention when used in combination with other agents may be administered as a daily dose or an appropriate fraction of the daily dose (e.g., bid). The compounds of this invention may be used in a multidrug regimen, also known as combination or 'cocktail' therapy, wherein, multiple agents may be administered together, may be administered separately at the same time or at different intervals, or administered sequentially. The compounds of this invention may be administered after a course of treatment by another agent, during a course of therapy with another agent, administered as part of a therapeutic regimen, or may be administered prior to therapy by another agent in a treatment program.

For the purposes of this invention, the compounds may be administered by a variety of means including orally, parenterally, by inhalation spray, topically, or rectally in formulations containing pharmaceutically acceptable carriers, adjuvants and vehicles. The term parenteral as used here includes subcutaneous, intravenous, intramuscular, and intraarterial injections with a variety of infusion techniques. Intraarterial and intravenous injection as used herein includes administration through catheters. Intravenous administration is generally preferred.

Pharmaceutically acceptable salts include acetate, adipate, besylate, bromide, camsylate, chloride, citrate, edisylate, estolate, fumarate, gluceptate, gluconate, glucoranate, hippurate, hyclate, hydrobromide, hydrochloride, iodide, isethionate, lactate, lactobionate, maleate, mesylate, methylbromide, methylsulfate, napsylate, nitrate, oleate, palmoate, phosphate, polygalacturonate, stearate, succinate, sulfate, sulfosalicylate, tannate, tartrate, terphthalate, tosylate, and triethiodide.

Pharmaceutical compositions containing the active ingredient may be in any form suitable for the intended method of administration. When used for oral use for example, tablets, troches, lozenges, aqueous or oil suspensions, dispersible powders or granules, emulsions, hard or soft capsules, syrups or elixirs may be prepared. Compositions intended for oral use may be prepared according to any method known in the art for the manufacture of pharmaceutical compositions and such compositions may contain one or more agents including sweetening agents, flavoring agents, coloring agents and preserving agents, in order to provide a palatable preparation. Tablets containing the active ingredient in admixture with non-toxic pharmaceutically acceptable excipient which are suitable for manufacture of tablets are acceptable. These excipients may be, for example, inert diluents, such as calcium or sodium carbonate, lactose, calcium or sodium phosphate; granulating and disintegrating agents, such as maize starch, or alginic acid; binding agents, such as starch, gelatin or acacia; and lubricating agents, such as magnesium stearate, stearic acid or talc. Tablets may be uncoated or may be coated by known techniques including microencapsulation to delay disintegration and adsorption in the gastrointestinal tract and thereby provide a sustained action over a longer period. For example, a time delay material such as glyceryl monostearate or glyceryl distearate alone or with a wax may be employed.

Formulations for oral use may be also presented as hard gelatin capsules where the active ingredient is mixed with an inert solid diluent, for example calcium phosphate or kaolin, or as soft gelatin capsules wherein the active ingredient is mixed with water or an oil medium, such as peanut oil, liquid paraffin or olive oil.

Aqueous suspensions of the invention contain the active materials in admixture with excipients suitable for the manufacture of aqueous suspensions. Such excipients include a suspending agent, such as sodium carboxymethylcellulose, methylcellulose, ethylcellulose, hydroxypropylcellulo se, hydroxypropyl methylcellulose, sodium alginate, polyvinylpyrrolidone, gum tragacanth and gum acacia, and dispersing or wetting agents such as a naturally occurring phosphatide (e.g., lecithin), a condensation product of an alkylene oxide with a fatty acid (e.g., polyoxyethylene stearate), a condensation product of ethylene oxide with a long chain aliphatic alcohol (e.g., heptadecaethyleneoxycetanol), a condensation product of ethylene oxide with a partial ester derived from a fatty acid and a hexitol anhydride (e.g., polyoxyethylene sorbitan monooleate). The aqueous suspension may also contain one or more preservatives such as ethyl or n propyl p hydroxy benzoate, one or more coloring agents, one or more flavoring agents and one or more sweetening agents, such as sucrose or saccharin.

Oil suspensions may be formulated by suspending the active ingredient in a vegetable oil, such as arachid oil, olive oil, sesame oil or coconut oil, or in a mineral oil such as liquid paraffin. The oral suspensions may contain a thickening agent, such as beeswax, hard paraffin or acetyl alcohol. Sweetening agents, such as those set forth above, and flavoring agents may be added to provide a palatable oral preparation. These compositions may be preserved by the addition of an antioxidant such as ascorbic acid.

Dispersible powders and granules of the invention suitable for preparation of an aqueous suspension by the addition of water provide the active ingredient in admixture with a dispersing or wetting agent, a suspending agent, and one or more preservatives. Suitable dispersing or wetting agents and suspending agents are exemplified by those disclosed above. Additional excipients, for example sweetening, flavoring and coloring agents, may also be present.

The pharmaceutical compositions of the invention may also be in the form of oil in water emulsions. The oily phase may be a vegetable oil, such as olive oil or arachid oil, a mineral oil, such as liquid paraffin, or a mixture of these. Suitable emulsifying agents include naturally occurring gums, such as gum acacia and gum tragacanth, naturally occurring phosphatides, such as soybean lecithin, esters or partial esters derived from fatty acids and hexitol anhydrides, such as sorbitan monooleate, and condensation products of these partial esters with ethylene oxide, such as polyoxyethylene sorbitan monooleate. The emulsion may also contain sweetening and flavoring agents.

Syrups and elixirs may be formulated with sweetening agents, such as glycerol, sorbitol or sucrose. Such formulations may also contain a demulcent, a preservative, a flavoring or a coloring agent.

The pharmaceutical compositions of the invention may be in the form of a sterile injectable preparation, such as a sterile injectable aqueous or oleaginous suspension. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, such as a solution in 1,3-butanediol or prepared as a lyophilized powder. Among the acceptable vehicles and solvents that may be employed are water, Ringer's solution and isotonic sodium chloride solution. In addition, sterile fixed oils may conventionally be employed as a solvent or suspending medium. For this purpose, any bland fixed oil may be employed including synthetic mono or diglycerides. In addition, fatty acids such as oleic acid may likewise be used in the preparation of injectables.

The amount of active ingredient that may be combined with the carrier material to produce a single dosage form will vary depending upon the host treated and the particular mode of administration. For example, a time release formulation intended for oral administration to humans may contain 20 to 2000 µmol (approximately 10 to 1000 mg) of active material compounded with an appropriate and convenient amount of carrier material which may vary from about 5 to about 95% of the total compositions. It is preferred that the pharmaceutical composition be prepared which provides easily measurable amounts for administration. For example, an aqueous solution intended for intravenous infusion should contain from about 0.05 to about 50 µmol (approximately 0.025 to 25 mg) of the active ingredient per milliliter of solution in order that infusion of a suitable volume at a rate of about 30 mL/hr can occur.

As noted above, formulations of the present invention suitable for oral administration may be presented as discrete units such as capsules, cachets or tablets each containing a predetermined amount of the active ingredient; as a powder or granules; as a solution or a suspension in an aqueous or non-aqueous liquid; or as an oil in water liquid emulsion or a water in oil liquid emulsion. The active ingredient may also be administered as a bolus, electuary or paste.

As noted above, formulations of the present invention suitable for oral administration may be presented as discrete units such as capsules, cachets or tablets each containing a predetermined amount of the active ingredient; as a powder or granules; as a solution or a suspension in an aqueous or non-aqueous liquid; or as an oil in water liquid emulsion or a water in oil liquid emulsion. The active ingredient may also be administered as a bolus, electuary or paste.

A tablet may be made by compression or molding, optionally with one or more accessory ingredients. Compressed tablets may be prepared by compressing in a suitable machine the active ingredient in a free-flowing form such as a powder or granules, optionally mixed with a binder (e.g., povidone, gelatin, hydroxypropylmethyl cellulose), lubricant, inert diluent, preservative, disintegrant (e.g., sodium starch glycolate, cross linked povidone, cross linked sodium carboxymethyl cellulose) surface active or dispersing agent. Molded tablets may be made by molding in a suitable machine a mixture of the powdered compound moistened with an inert liquid diluent. The tablets may optionally be coated or scored and may be formulated so as to provide slow or controlled release of the active ingredient therein using, for example, hydroxypropyl methylcellulose in varying proportions to provide the desired release profile. Tablets may optionally be provided with an enteric coating, to provide release in parts of the gut other than the stomach. This is particularly advantageous with the compounds of formula (I)/formula (A) when such compounds are susceptible to acid hydrolysis.

Formulations suitable for topical administration in the mouth include lozenges comprising the active ingredient in a flavored base, usually sucrose and acacia or tragacanth; pastilles comprising the active ingredient in an inert base such as gelatin and glycerin, or sucrose and acacia; and mouthwashes comprising the active ingredient in a suitable liquid carrier.

Formulations for rectal administration may be presented as a suppository with a suitable base comprising for example cocoa butter or a salicylate.

Formulations suitable for vaginal administration may be presented as pessaries, tampons, creams, gels, pastes, foams or spray formulations containing in addition to the active ingredient such carriers as are known in the art to be appropriate.

Formulations suitable for parenteral administration include aqueous and non-aqueous isotonic sterile injection solutions which may contain antioxidants, buffers, bacteriostats and solutes which render the formulation isotonic with the blood of the intended recipient; and aqueous and non-aqueous sterile suspensions which may include suspending agents and thickening agents. The formulations may be presented in unit dose or multi dose sealed containers, for example, ampoules and vials, and may be stored in a freeze dried (lyophilized) condition requiring only the addition of the sterile liquid carrier, for example water for injections, immediately prior to use. Injection solutions and suspensions may be prepared from sterile powders, granules and tablets of the kind previously described.

Formulations suitable for parenteral administration may be administered in a continuous infusion manner via an indwelling pump or via a hospital bag. Continuous infusion includes the infusion by an external pump. The infusions may be done through a Hickman or PICC or any other suitable means of administering a formulation either parenterally or i.v.

Preferred unit dosage formulations are those containing a daily dose or unit, daily sub dose, or an appropriate fraction thereof, of a drug.

It will be understood, however, that the specific dose level for any particular patient will depend on a variety of factors including the activity of the specific compound employed; the age, body weight, general health, sex and diet of the individual being treated; the time and route of administration; the rate of excretion; other drugs which have previously been administered; and the severity of the particular disease undergoing therapy, as is well understood by those skilled in the art.

The phosphorus-containing prodrugs of formula (I) according to present invention could be converted into the corresponding pharmaceutical active agent H—X-Q in vivo and thus can be used for the treatment of various diseases, including but not limited to cancers, metabolic diseases, viral infections, immunological diseases, neurologic diseases, and blood diseases, for example, T-cell lymphoma, soft tissue sarcoma, pancreatic cancer, breast cancer, Hodgkin's lymphoma, non-Hodgkin's lymphoma, non-small cell lung cancer, ovarian cancer, bladder cancer and Hepatocellular Carcinoma (HCC). In this regard, the prodrugs of present invention could also be used in combination with one or more other active agents/methods for the treatment of cancers, such as antiproliferative/antineoplastic drugs, cytostatic agents, anti-invasion agents, growth factor inhibitors, antiangiogenic agents, gene therapy approaches, immunotherapy approaches, cytotoxic agents, and target therapies (for example PI3Kd inhibitors).

EXAMPLES

The compounds used in this invention and their preparation can be understood further by the Examples, which illustrate some of the processes by which these compounds are prepared. These Examples should not however be construed as specifically limiting the invention, and variations of the compounds, now known or later developed, are considered to fall within the scope of the present invention as hereinafter claimed. Unless otherwise indicated, the starting materials and reagents used in Examples were commercially available (such as from Aldrich) or prepared according to known methods described in prior art documents.

The following abbreviations are used in this specification:

DMAP—dimethylaminopyridine

DMF—dimethylformamide

DIEA—diisopropylethylamine

TEA—triethylamine

TBSCl—tert-butyldimethylsilyl chloride

EtOAc—ethyl acetate

THF—tetrahydrofuran

TBAF—tetra-butylammonium fluoride

NMR—nuclear magnetic resonance

LC-MS—liquid chromatography mass spectrometry

TMS—tetramethylsilane

RT—room temperature i.v.—intravenous administration

PO—oral administration

THU—tetrahydrouridine

PK—Pharmacokinetics $MRT_{0-t}$—Mean residence time from time zero to time observed $MRT_{0-inf}$—Mean residence time from time zero to infinity $AUC_{0-t}$—Area under the curve from time zero to time observed $AUC_{0-inf}$—Area under the curve from time zero to infinity TI—Therapeutic Index General Experimental Methods $^1$H NMR spectra were recorded on Bruker Avance III and Bruker Avance Neo, 400 MHz and TMS was used as an internal standard.

LC-MS was taken on a quadrupole Mass Spectrometer on Agilent LC/MSD 1200 Series (Column: Ultimate XB-C18 (50×4.6 mm, 5 μm) operating in ES (+) or (−) ionization mode; T=30° C.; flow rate=1.5 mL/min; detection wavelength: 214 nm.

Example 1
Preparation of 4-(((2R,4S)-4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one (Compound 4) & 4-(((2S,4S)-4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one (Compound 5)
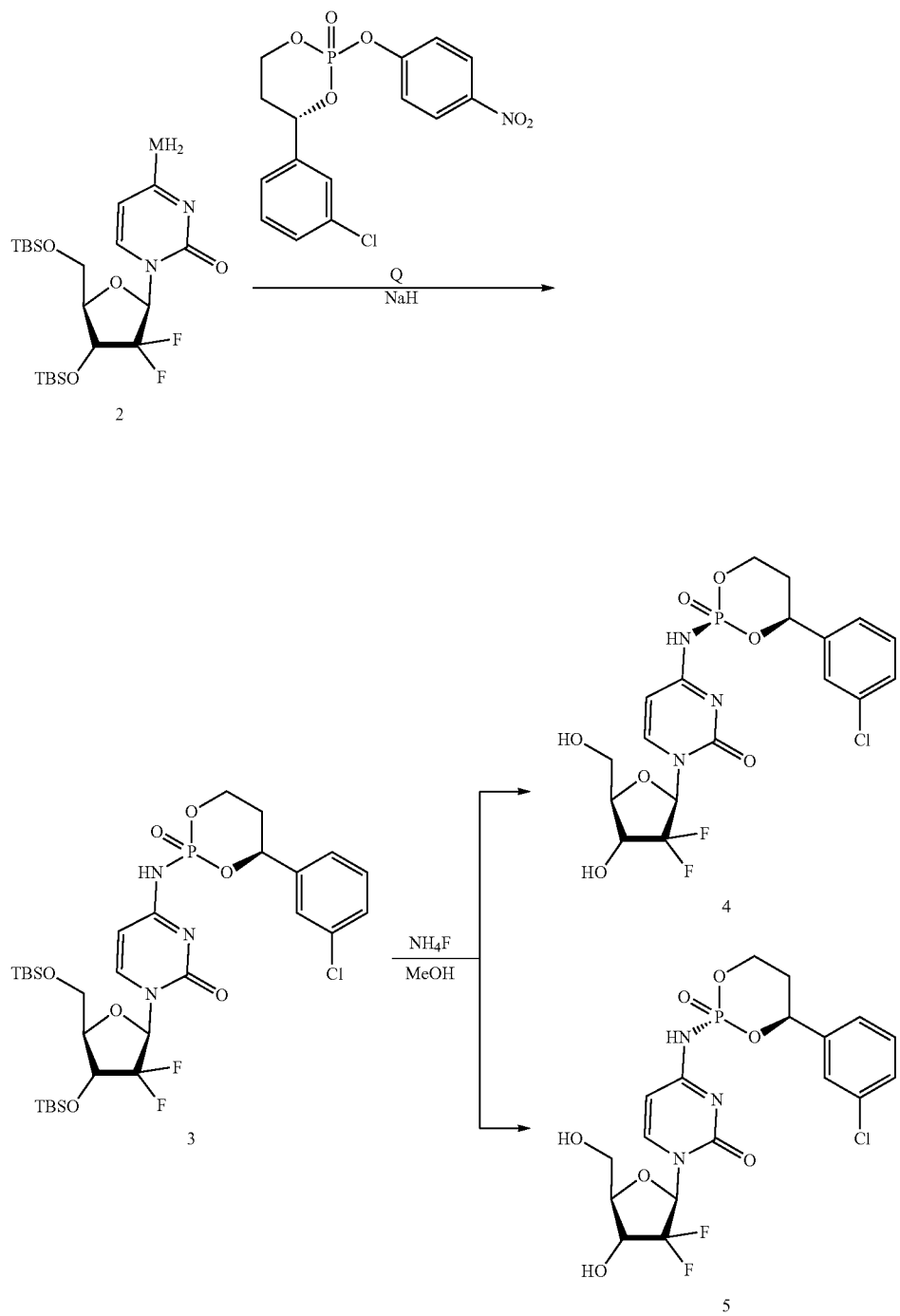

(i) Preparation of 1-((2R,4R,5R)-4-((tert-butyldim-ethylsilyl)oxy)-5-(((tert-butyldimethylsilyl)oxy)methyl)-3,3-difluorotetrahydrofuran-2-yl)-4-(((4S)-4-(3-chlorophenyl)-2-oxido-1,3,2-dioxaphosphinan-2-yl)amino)pyrimidin-2(1H)-one (Compound 3)

To a solution of 4-amino-1-((2R,4R,5R)-4-((tert-butyldimethylsilyl)oxy)-5-(((tert-butyldimethylsilyl)-oxy)methyl)-3,3-difluorotetrahydrofuran-2-yl)pyrimidin-2(1H)-one (compound 2, 1.0 g, 2.04 mmol) in THF (15.0 mL) was added NaH (122 mg, 3.18 mmol, 60% in mineral oil) portion wisely at 0° C. After addition, the mixture was stirred at the same temperature for 1 hour. Then (4S)-4-(3-chlorophenyl)-2-(4-nitrophenoxy)-1,3,2-dioxaphosphinane 2-oxide (Q, 752 mg, 2.04 mmol; prepared according to the procedures of Journal of Medicinal Chemistry, 2018, vol 61, page 4904) in THF (5.0 mL) was added dropwise into above mixture at 0° C. Then the reaction mixture was stirred at 0° C. for another 2 hours. The reaction was quenched with H$_2$O (30 mL), then extracted with EtOAc (50 mL*2). The combined organic layers were washed with brine (50 mL), dried over Na$_2$SO$_4$, filtered and concentrated. The residue was purified by column chromatography on silica gel (DCM/CH$_3$OH=80/1) to give the desired product (compound 3, 620 mg, 42%) as a yellow solid.

LC-MS: Rt=1.93 min, [M+H]$^+$=722.

(ii) Preparation of 4-(((2R,4S)-4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one (Compound 4) & 4-(((2S,4S)-4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2(1H)-one (Compound 5)

To a solution of 1-((2R,4R,5R)-4-((tert-butyldimethylsilyl)oxy)-5-(((tert-butyldimethylsilyl)-oxy)methyl)-3,3-difluorotetrahydrofuran-2-yl)-4-(((4S)-4-(3-chlorophenyl)-2-oxido-1,3,2-dioxaphosphinan-2-yl)amino)pyrimidin-2(1H)-one (compound 3, 620 mg, 0.86 mol, 5) in CH$_3$OH (10 mL) was added NH$_4$F (318 mg, 8.6 mmol) and the mixture was stirred at 25° C. for 24 hrs. The mixture was purified by Prep-HPLC to afford the product compound 4 (112 mg) and compound 5 (33 mg) as white solids.

Compound 4: 1H NMR (400 MHz, DMSO-d6): δ 11.0 (brs, 1H), 7.91 (d, J=8.8 Hz, 1H), 7.50 (s, 1H), 7.43-7.38 (m, 3H), 6.33-6.27 (m, 2H), 6.12 (t, J=7.6 Hz, 1H), 5.65 (d, J=10.8 Hz, 1H), 5.25 (s, 1H), 4.56-4.50 (m, 1H), 4.40-4.35 (m, 1H), 4.19-4.15 (m, 1H), 3.88-3.84 (m, 1H), 3.78 (d, J=12.4 Hz, 1H), 3.63 (d, J=12.4 Hz, 1H), 2.48-2.31 (m, 1H), 2.08-2.03 (m, 1H).

LC-MS: Rt=2.863 min, [M+H]$^+$=494.

Compound 5: 1H NMR (400 MHz, DMSO-d6): δ 11.7 (brs, 1H), 7.89 (d, J=7.6 Hz, 1H), 7.46-7.36 (m, 4H), 6.31 (d, J=5.6 Hz, 1H), 6.24 (d, J=7.6 Hz, 1H), 6.10 (t, J=8.0 Hz, 1H), 5.56 (brs, 1H), 5.24 (s, 1H), 4.48-4.33 (m, 2H), 4.19-4.15 (m, 1H), 3.87-3.84 (m, 1H), 3.77 (d, J=12.0 Hz, 1H), 3.63 (d, J=12.0 Hz, 1H), 2.10-2.00 (m, 2H).

LC-MS: Rt=2.954 min, [M+H]$^+$=494.

Alternatively, when the racemic reagent compound 7 was used, the following racemic prodrugs were also prepared in a similar fashion:

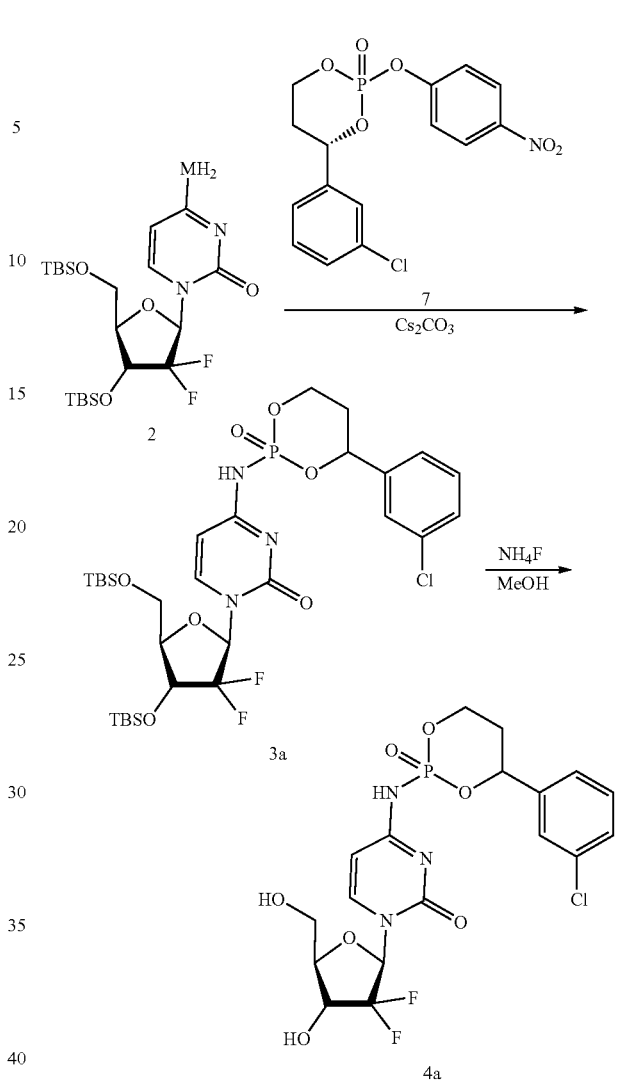

Example 2

Synthesis of 2-[({[(dimethylamino)iminomethyl]amino}iminomethyl)amino]-4-(3-chlorophenyl)-1,3,2-dioxaphosphan-2-one (8)

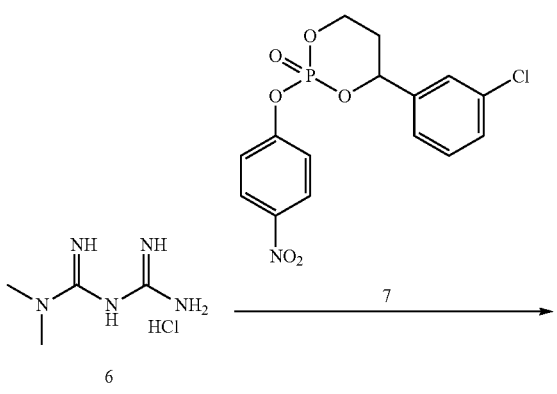

-continued

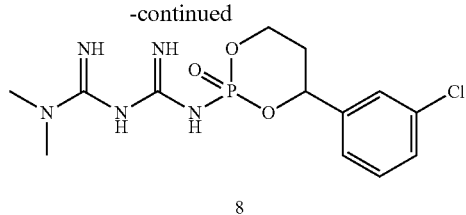

8

A mixture of amino[(dimethylamino)iminomethyl]carboxamidine hydrogen chloride (6, 676 mg, 4.08 mmol), 4-(3-chlorophenyl)-2-(4-nitrophenoxy)-1,3,2-dioxaphosphinane-2-oxide (7, 500 mg, 1.36 mmol, prepared according to the procedures described in J. Am. Chem. Soc., 2004, 126, 5154-5163 with minor modifications when needed) and Cs$_2$CO$_3$ (2.7 g, 8.16 mmol) in DMF (10 mL) was stirred at RT for 5 hours. The reaction mixture was filtered. The filtrate was concentrated. The residue was purified by Prep-HPLC to give the product (8, 111.7 mg, 23%) as a white solid.

$^1$HNMR (400 MHz, CD$_3$OD): δ 7.44-7.27 (m, 4H), 5.56-5.51 (m, 1H), 4.62-4.55 (m, 1H), 4.36-4.26 (m, 1H), 3.10-3.01 (m, 6H), 2.20-2.11 (m, 1H), 2.05-1.93 (m, 1H).

LC-MS: column: waters Xbridge C18 5 um, 50*4.6 mm; mobile phase: B (ACN): A (0.02% NH$_4$Ac); gradient (B %) in 6 min. Rt$_1$=3.392, Rt$_2$=3.536, Rt$_3$=3.572, Rt=4.055; MS Calcd.: 359, MS Found: 360 [M+H]$^+$.

Example 3

Synthesis of (4R)-9-((4-(3-chlorophenyl)-2-oxido-1,3,2-dioxaphosphinan-2-yl)oxy)-10-((dimethylamino)methyl)-4-ethyl-4-hydroxy-1H-pyrano[3',4':6,7]indolizino[1,2-b]quinoline-3,14(4H,12H)-dione (10)

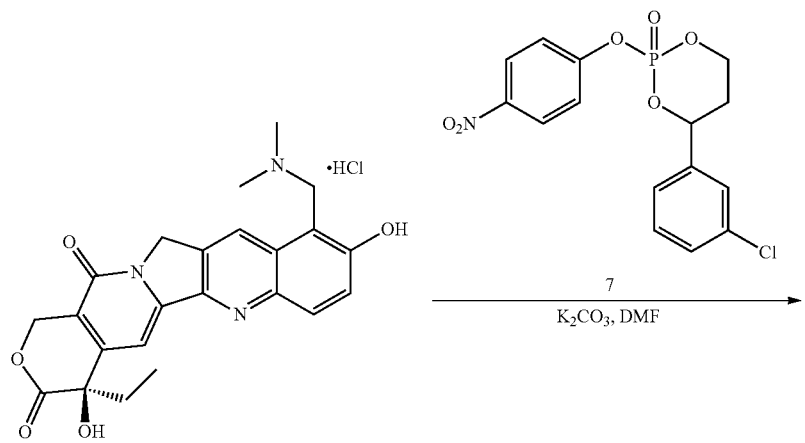

9

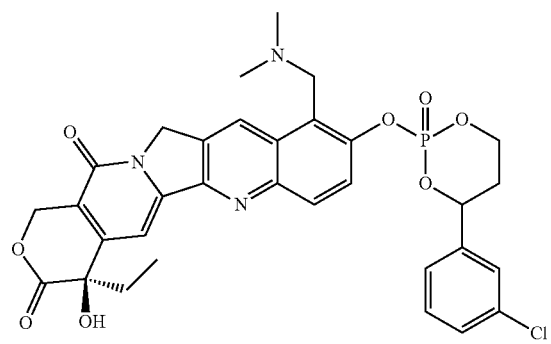

10

To a mixture of (R)-10-((dimethylamino)methyl)-4-ethyl-4,9-dihydroxy-1H-pyrano[3',4':6,7]indolizino[1,2-b]quinoline-3,14(4H,12H)-dione hydrochloride (9, 300 mg, 0.655 mmol) and K$_2$CO$_3$ (271 mg, 1.965 mmol) in DMF (3.0 mL) was added 4-(3-chlorophenyl)-2-(4-nitrophenoxy)-1,3,2-dioxaphosphinane 2-oxide (7, 242 mg, 0.655 mmol, prepared according to the procedures described in J. Am. Chem. Soc., 2004, 126, 5154-5163 with minor modifications when needed) at room temperature. After addition, the reaction mixture was stirred at room temperature for 16 hours. The reaction mixture was filtered. The filtrate was diluted with water (30 mL), extracted with EtOAc (60 mL*2). The combined organic phase was washed with brine (30 mL*2), dried over Na$_2$SO$_4$, filtered and concentrated in vacuo. The residue was purified by Prep-TLC (DCM/MeOH=10/1) to give the title compound 10 (94 mg, 22%) as a yellow solid.

$^1$H NMR (400 MHz, DMSO-d$_6$): δ 8.99 (s, 1H), 8.20-8.17 (m, 1H), 7.83-7.78 (m, 1H), 7.59 (s, 1H), 7.53-7.42 (m, 3H), 7.26 (s, 1H), 6.54 (brs, 1H), 5.94-5.91 (m, 1H), 5.42 (s, 2H), 5.31 (s, 2H), 4.79-4.66 (m, 2H), 3.94 (s, 2H), 2.51-2.40 (m, 2H), 2.35 (s, 6H), 1.92-1.82 (m, 2H), 0.88 (t, J=7.2 Hz, 3H).

LC-MS: column: waters Xbridge C18 5 um, 50*4.6 mm; mobile phase: B (ACN): A (0.02% NH$_4$Ac); gradient (B %) in 6 min. Rt$_1$=2.865, Rt$_2$=2.946, Rt$_3$=3.104; MS Calcd.: 651, MS Found: 652 [M+H]$^+$.

Example 4

Synthesis of (3R)-3-((4-(3-chlorophenyl)-2-oxido-1,3,2-dioxaphosphinan-2-yl)amino)-1-(3-(trifluoromethyl)-5,6-dihydro-[1,2,4]triazolo[4,3-a]pyrazin-7(8H)-yl)-4-(2,4,5-trifluorophenyl)butan-1-one (12)

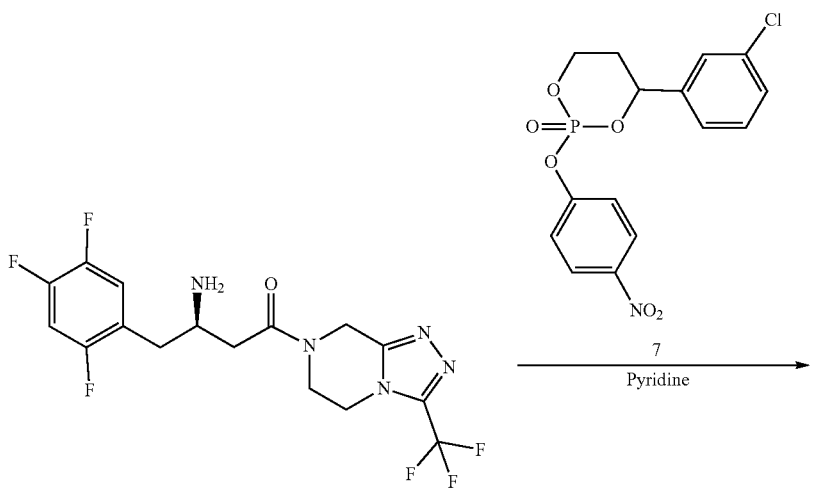

11

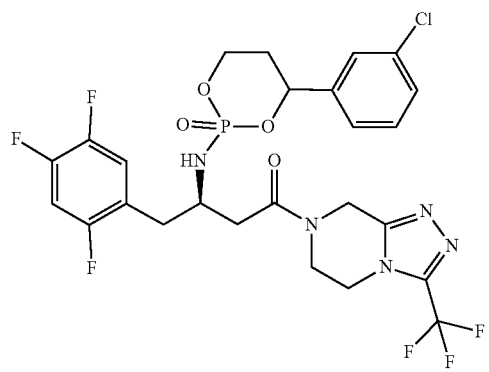

12

To a mixture of (R)-3-amino-1-(3-(trifluoromethyl)-5,6-dihydro-[1,2,4]triazolo[4,3-a]pyrazin-7(8H)-yl)-4-(2,4,5-trifluorophenyl)butan-1-one (11, 250 mg, 0.61 mmol) and KOH (35 mg, 0.61 mmol) in 5 mL of DMF was added a solution of 4-(3-chlorophenyl)-2-(4-nitrophenoxy)-1,3,2-dioxaphosphinane 2-oxide (44, 490 mg, 1.84 mmol, prepared according to the procedures described in J. Am. Chem. Soc., 2004, 126, 5154-5163 with minor modifications when needed) in 2 mL of DMF. After stirring at room temperature overnight, the reaction mixture was diluted with 20 mL of water and extracted with DCM (20 mL*3). The separated organic layer was concentrated and the residue was purified by prep-HPLC twice to afford compound 12 (20 mg, yield 5%) as white solid.

$^1$HNMR (400 MHz, CD$_3$OD): δ 7.48-7.19 (m, 5H), 6.94-6.89 (m, 1H), 5.45-4.42 (m, 1H), 5.13-4.91 (m, 2H), 4.51-4.12 (m, 6H), 3.97-3.83 (m, 1H), 2.98-2.67 (m, 4H), 2.15-1.94 (m, 2H).

LC-MS: column: waters Xbridge C18 5 um, 50*4.6 mm; mobile phase: B (ACN): A (0.02% NH$_4$Ac); gradient (B %) in 6 min. Rt$_1$=3.349, Rt=4.055; MS Calcd.: 637, MS Found: 638 [M+H]$^+$.

Example 5

Synthesis of ((((((2R)-1-(6-((4-(3-chlorophenyl)-2-oxido-1,3,2-dioxaphosphinan-2-yl)amino)-9H-purin-9-yl)propan-2-yl)oxy)methyl)phosphoryl)bis(oxy))bis(methylene) diisopropyl dicarbonate (15)

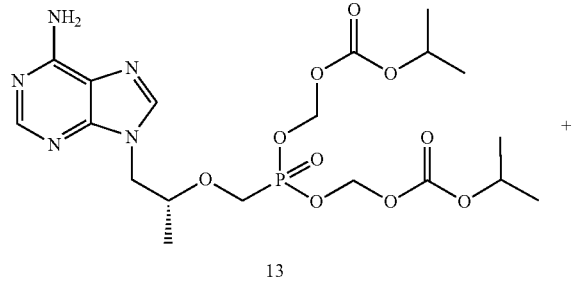

13

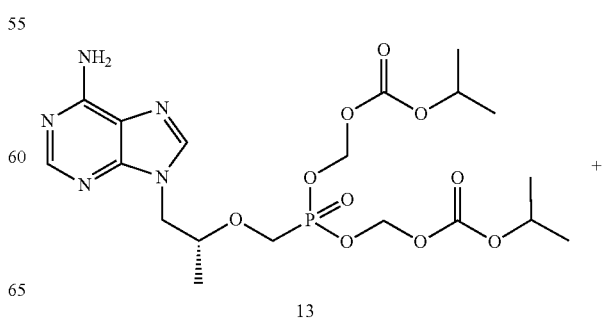

14

POCl$_3$ / pyridine

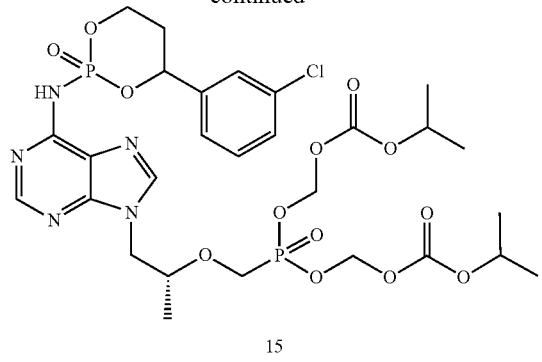

15

To a mixture of (R)-(((((1-(6-amino-9H-purin-9-yl)propan-2-yl)oxy)methyl)phosphoryl)bis(oxy))bis(methylene) diisopropyl dicarbonate (13, 688 mg, 1.33 mmol) in dry pyridine (33 mL) was added POCl$_3$ (610 mg, 3.99 mmol) at 0° C. under N$_2$. After addition, the mixture was stirred at room temperature for 2 hours. Then, 1-(3-chlorophenyl)propane-1,3-diol (14, 742 mg, 3.99 mmol, prepared according to the procedures described in J. Am. Chem. Soc., 2004, 126, 5154-5163 with minor modifications when needed) in dry pyridine (5 mL) was added to the mixture at 0° C. After addition, the reaction mixture was warmed slowly to room temperature and stirred for 16 hours. The reaction mixture was diluted with DCM (200 mL), washed with sat. NH$_4$Cl (100 mL*2). The organic phase was concentrated in vacuo. The residue was purified by Prep-HPLC (eluted with water/acetonitrile=1% to 60%) to give a crude white solid. The solid was then purified by Prep-HPLC again to give the title compound ((((((2R)-1-(6-((4-(3-chlorophenyl)-2-oxido-1,3,2-dioxaphosphinan-2-yl)amino)-9H-purin-9-yl)propan-2-yl)oxy)methyl)phosphoryl)bis(oxy))bis(methylene) diisopropyl dicarbonate (15, 104 mg, 10%) as a white solid.

$^1$H NMR (400 MHz, DMSO-d$_6$): δ 8.61-8.28 (m, 1H), 8.20-8.15 (m, 1H), 7.60-7.45 (m, 1H), 7.33-7.29 (m, 3H), 6.14-5.70 (m, 1H), 5.67-5.58 (m, 4H), 5.10-4.39 (m, 5H), 4.23-4.21 (m, 1H), 3.97-3.91 (m, 2H), 3.93-3.73 (m, 1H), 2.95-2.35 (m, 1H), 2.19-2.05 (m, 1H), 1.32-1.28 (m, 12H), 1.25-1.21 (m, 3H).

LC-MS: column: waters Xbridge C18 5 um, 50*4.6 mm; mobile phase: B (ACN): A (0.02% NH$_4$Ac); gradient (B %) in 6 min. Rt$_1$=3.439, Rt$_2$=3.650; MS Calcd.: 749, MS Found: 750 [M+H]$^+$.

Example 6

Synthesis of diisopropyl (((((((2R)-1-(6-((2-oxido-4-(pyridin-3-yl)-1,3,2-dioxaphosphinan-2-yl)amino)-9H-purin-9-yl)propan-2-yl)oxy)methyl)phosphoryl)bis(oxy))bis(methylene)) dicarbonate (20)

13

67

-continued

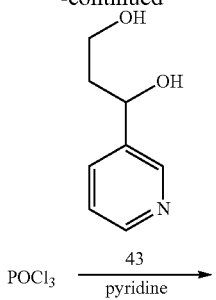

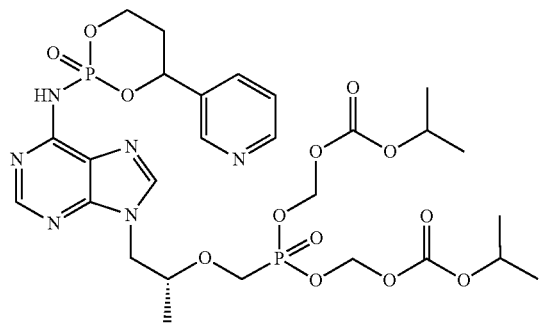

To a mixture of (R)-(((((1-(6-amino-9H-purin-9-yl)propan-2-yl)oxy)methyl)phosphoryl)-bis(oxy))bis(methylene) diisopropyl dicarbonate (13, 800 mg, 1.54 mmol) in pyridine (40 mL) was added POCl₃ (707 mg, 4.62 mmol) at 0° C. under N₂. After addition, the mixture was stirred at room temperature for 2 hours. Then, 1-(pyridine-3-yl)propane-1,3-diol (43, 707 mg, 4.62 mmol, prepared according to the procedures described in J. Am. Chem. Soc., 2004, 126, 5154-5163 with minor modifications when needed) in pyridine (5 mL) was added to the mixture at 0° C. After addition, the reaction mixture was warmed slowly to room temperature and stirred for 16 hours. The reaction mixture was concentrated in vacuo. The residue was purified by C18 (eluted with water/acetonitrile=1% to 70%) to give a yellow solid. The solid was then purified by Prep-TLC (DCM/MeOH=13/1) again to give the title compound diisopropyl (((((((2R)-1-(6-((2-oxido-4-(pyridin-3-yl)-1,3,2-dioxaphosphinan-2-yl)amino)-9H-purin-9-yl)propan-2-yl)oxy)methyl)phosphoryl)bis(oxy))bis(methylene)) dicarbonate (20, 25.4 mg, 2%) as a white solid.

¹H NMR (400 MHz, DMSO-d₆): δ 8.71-8.20 (m, 3H), 8.16 (s, 1H), 7.86-7.82 (m, 1H), 7.37-7.29 (m, 1H), 5.84-5.82 (m, 1H), 5.84-5.64 (m, 4H), 4.94-4.90 (m, 2H), 4.87-4.76 (m, 1H), 4.67-4.64 (m, 1H), 4.43-4.38 (m, 1H), 4.23-4.21 (m, 1H), 3.97-3.77 (m, 2H), 3.73-3.69 (m, 1H), 3.06-2.99 (m, 1H), 2.40-2.10 (m, 1H), 1.32 (s, 12H), 1.29-1.25 (m, 3H).

LC-MS: column: waters Xbridge C18 5 um, 50*4.6 mm; mobile phase: B (ACN): A (0.02% NH₄Ac); gradient (B %) in 6 min. Rt=3.324; MS Calcd.: 716, MS Found: 717 [M+H]⁺.

68

Example 7

Synthesis of diisopropyl (((((((2R)-1-(6-((2-oxido-4-(pyridin-4-yl)-1,3,2-dioxaphosphinan-2-yl)amino)-9H-purin-9-yl)propan-2-yl)oxy)methyl)phosphoryl)bis(oxy))bis(methylene)) dicarbonate (21)

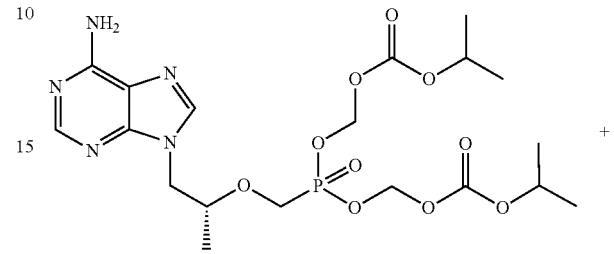

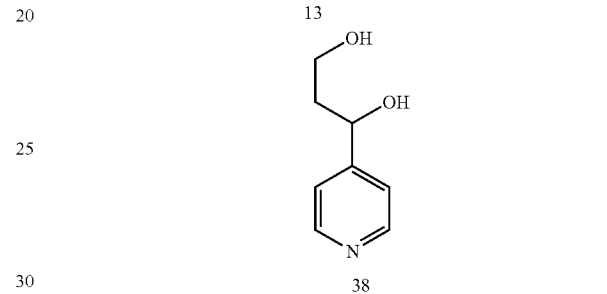

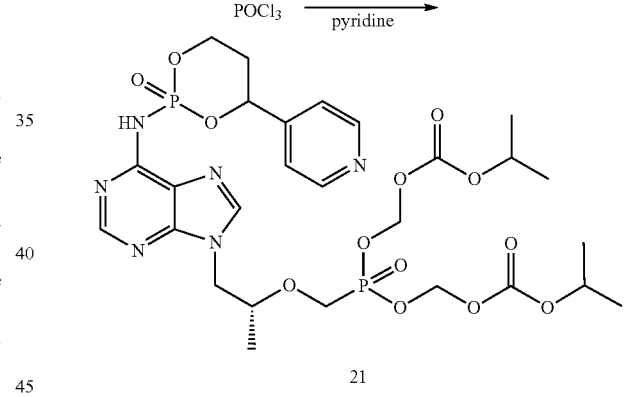

To a mixture of (R)-(((((1-(6-amino-9H-purin-9-yl)propan-2-yl)oxy)methyl)phosphoryl)-bis(oxy))bis(methylene) diisopropyl dicarbonate (13, 519 mg, 1.0 mmol) in pyridine (30 mL) was added POCl₃ (459 mg, 3.0 mmol) at 0° C. under N₂. After addition, the mixture was stirred at room temperature for 2 hours. Then, 1-(pyridine-4-yl)propane-1,3-diol (38, 459 mg, 3.0 mmol, prepared according to the procedures described in J. Am. Chem. Soc., 2004, 126, 5154-5163 with minor modifications when needed) in dry pyridine (5 mL) was added to the mixture at 0° C. After addition, the reaction mixture was warmed slowly to room temperature and stirred for 16 hours. The reaction mixture was concentrated in vacuo. The residue was purified by C18 (eluted with water/acetonitrile=1% to 70%) to give a yellow solid. The solid was then purified by Prep-TLC (DCM/MeOH=13/1) again to give the title compound diisopropyl (((((((2R)-1-(6-((2-oxido-4-(pyridin-4-yl)-1,3,2-dioxaphosphinan-2-yl)amino)-9H-purin-9-yl)propan-2-yl)oxy)methyl)phosphoryl)bis(oxy))bis(methylene)) dicarbonate (21, 35.8 mg, 5%) as a white solid.

¹H NMR (400 MHz, DMSO-d₆): δ 8.68-8.44 (m, 3H), 8.16 (s, 1H), 7.43-7.38 (m, 2H), 6.18-6.08 (m, 1H), 5.77-5.52 (m, 4H), 5.17-5.08 (m, 1H), 5.02-4.85 (m, 2H), 4.77-4.61 (m, 1H), 4.61-4.56 (m, 1H), 4.47-4.43 (m, 1H), 4.34-4.15 (m, 2H), 3.99-3.91 (m, 1H), 2.42-2.34 (m, 1H), 2.28-2.20 (m, 1H), 1.20 (s, 12H), 1.29-1.22 (m, 3H).

LC-MS: column: waters Xbridge C18 5 um, 50*4.6 mm; mobile phase: B (ACN): A (0.02% NH₄Ac); gradient (B %) in 6 min. Rt=3.279; MS Calcd.: 716, MS Found: 717 [M+H]⁺.

Example 8

Synthesis of 1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2(1H)-one (27)

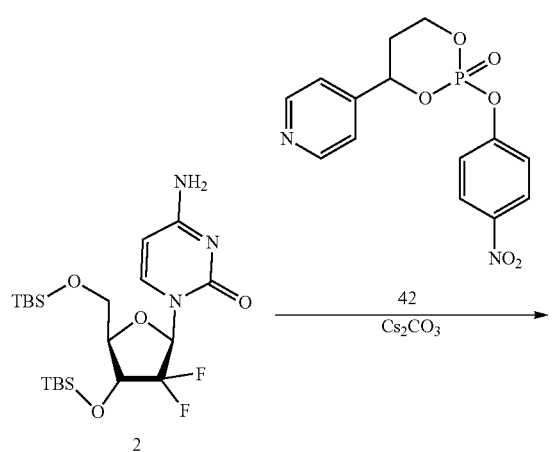

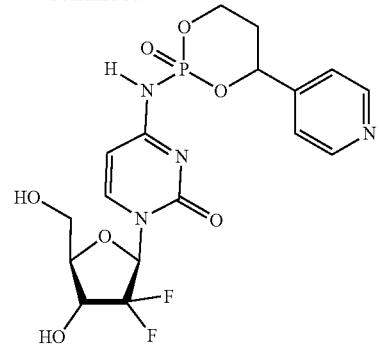

Synthesis of 1-((2R,4R,5R)-4-((tert-butyldimethylsilyl)oxy)-5-(((tert-butyldimethylsilyl)oxy)methyl)-3,3-difluorotetrahydrofuran-2-yl)-4-((2-oxido-4-(pyridin-4-yl)-1,3,2-dioxaphosphinan-2-yl)amino)pyrimidin-2(1H)-one (41)

To a mixture of 4-amino-1-((2R,4R,5R)-4-((tert-butyldimethylsilyl)oxy)-5-(((tert-butyldimethylsilyl)oxy)methyl)-3,3-difluorotetrahydrofuran-2-yl)pyrimidin-2(1H)-one (1.22 g, 2.5 mmol) and Cs₂CO₃ (1.63 g, 5.0 mmol) in THF (20 mL) was added 2-(4-nitrophenoxy)-4-(pyridin-4-yl)-1,3,2-dioxaphosphinane 2-oxide (840 mg, 2.5 mmol, 42, prepared according to the procedures described in J. Am. Chem. Soc., 2004, 126, 5154-5163 with minor modifications when needed). The reaction mixture was stirred at room temperature for 2 hours. The reaction mixture was quenched with water (50 mL), extracted with EtOAc (50 mL*3). The combined organic phase was concentrated in vacuo. The residue was purified by Prep-HPLC (water/acetonitrile=30% to 100%) to give the title compound (500 mg, 29%, 41) as a yellow solid.

LC-MS: Rt=1.837 min, [M+H]⁺=689.

Synthesis of 1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2(1H)-one (27)

To a solution of 1-((2R,4R,5R)-4-((tert-butyldimethylsilyl)oxy)-5-(((tert-butyldimethylsilyl)oxy)methyl)-3,3-difluorotetrahydrofuran-2-yl)-4-((2-oxido-4-(pyridin-4-yl)-1,3,2-dioxaphosphinan-2-yl)amino)pyrimidin-2(1H)-one (500 mg, 0.73 mmol, 41) in THF (5.0 mL) was added TBAF (1.46 mL, 1.46 mmol, 1M in THF) dropwise at 0° C. After addition, the reaction mixture was stirred at the same temperature for 30 minutes. The reaction mixture was purified by Prep-HPLC (water/acetonitrile=10% to 70%) to give compound 27 (120 mg, 36%) as a white solid.

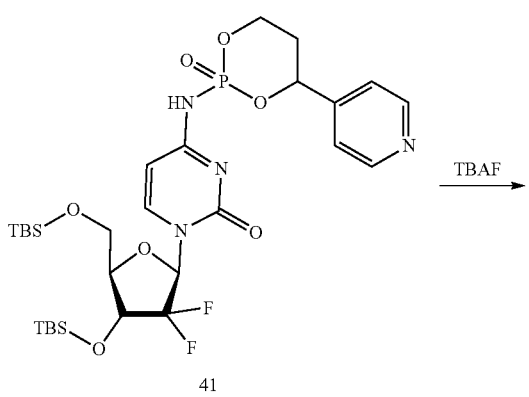

¹H NMR (400 MHz, DMSO-d₆): δ 8.58-8.57 (m, 2H), 7.95 (brs, 1H), 7.43 (s, 2H), 7.34-7.32 (m, 2H), 6.10-6.09 (m, 1H), 5.71-5.66 (m, 1H), 5.27-5.25 (m, 1H), 4.56-4.53 (m, 1H), 4.47-4.43 (m, 1H), 4.20-4.15 (m, 1H), 3.88-3.83 (m, 1H), 3.80-3.76 (m, 1H), 3.66-3.60 (m, 1H), 2.49-2.48 (m, 1H), 2.15-2.11 (m, 1H).

LC-MS: Rt₁=2.800, [M+H]⁺=461.

Example 9

Synthesis of 1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2(1H)-one (28)

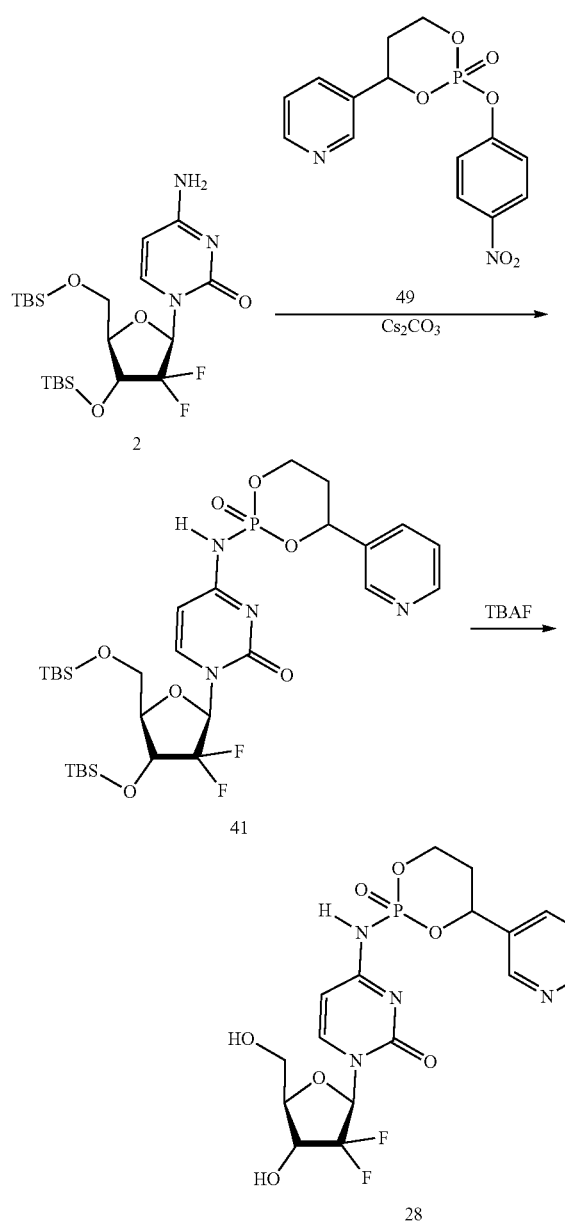

Synthesis of 1-((2R,4R,5R)-4-((tert-butyldimethylsilyl)oxy)-5-(((tert-butyldimethylsilyl)oxy)methyl)-3,3-difluorotetrahydrofuran-2-yl)-4-((2-oxido-4-(pyridin-3-yl)-1,3,2-dioxaphosphinan-2-yl)amino)pyrimidin-2(1H)-one (50)

To a mixture of 4-amino-1-((2R,4R,5R)-4-((tert-butyldimethylsilyl)oxy)-5-(((tert-butyldimethylsilyl)oxy)methyl)-3,3-difluorotetrahydrofuran-2-yl)pyrimidin-2(1H)-one (982 mg, 2.0 mmol) and Cs$_2$CO$_3$ (1.3 g, 4.0 mmol) in THF (10 mL) was added 2-(4-nitrophenoxy)-4-(pyridin-3-yl)-1,3,2-dioxaphosphinane 2-oxide (672 mg, 2.0 mmol, 49, prepared according to the procedures described in J. Am. Chem. Soc., 2004, 126, 5154-5163 with minor modifications when needed) at room temperature. After addition, the reaction mixture was stirred at 30° C. for 2 hours. Then the reaction mixture was quenched with water (50 mL), extracted with EtOAc (50 mL*3). The combined organic phase was concentrated in vacuo. The residue was purified by Prep-HPLC (water/acetonitrile=40% to 100%) to give title compound (500 mg, 36%, 50) as a yellow solid.

LC-MS: Rt=1.99 min, [M+H]$^+$=689.

Synthesis of 1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2(1H)-one (28)

To a solution of 1-((2R,4R,5R)-4-((tert-butyldimethylsilyl)oxy)-5-(((tert-butyldimethylsilyl)oxy)methyl)-3,3-difluorotetrahydrofuran-2-yl)-4-((2-oxido-4-(pyridin-3-yl)-1,3,2-dioxaphosphinan-2-yl)amino)pyrimidin-2(1H)-one (500 mg, 0.73 mmol) in THF (5.0 mL) was added TBAF (1.46 mL, 1.46 mmol, 1M in THF) dropwise at 0° C. After addition, the reaction mixture was stirred at room temperature for 1 hour. The reaction mixture was purified by Prep-HPLC to give compound 28 (110 mg, 33%) as a white solid.

$^1$H NMR (400 MHz, DMSO-d$_6$): δ 8.65 (s, 1H), 8.55 (d, J=4.0 Hz, 1H), 7.91-7.89 (m, 2H), 7.43-7.38 (m, 1H), 6.31-6.29 (m, 2H), 6.12-6.08 (m, 1H), 5.72-5.69 (m, 1H), 5.26-5.23 (m, 1H), 4.58-4.52 (m, 1H), 4.41-4.39 (m, 1H), 4.20-4.15 (m, 1H), 3.87-3.76 (m, 2H), 3.66-3.60 (m, 1H), 2.49-2.47 (m, 1H), 2.08-2.04 (m, 1H).

LC-MS: Rt=2.811, [M+H]$^+$=461.

Example 10

Synthesis of (2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isobutyryloxy)methyl)tetrahydrofuran-3-yl isobutyrate (Compound 29)

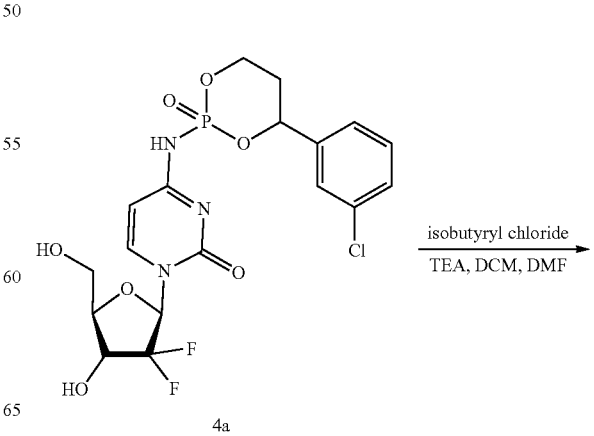

-continued

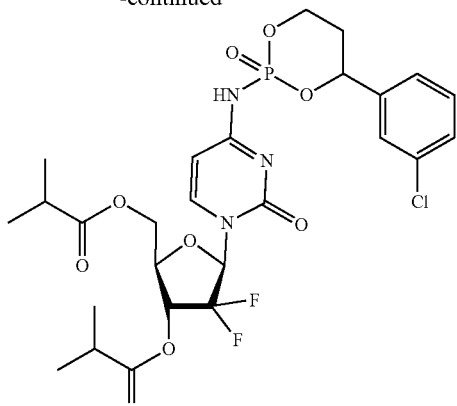

29

To a mixture 4-((4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2 (1H)-one (150 mg, 0.304 mmol, Compound 4a, prepared according to Example 1) in DCM/DMF (3 mL/0.3 mL) was added TEA (154 mg, 1.52 mmol), followed by the addition of isobutyryl chloride (324 mg, 3.04 mmol) dropwise at RT. After addition, the reaction mixture was stirred at RT for 16 hours. The mixture was quenched with water (50 mL), extracted with EtOAc (20 mL*2). The combined organic phase was concentrated. The residue was purified by C18 (water/acetonitrile=10% to 60%) to give the title compound (41 mg, Compound 29) as a white solid. The white solid (Y1430-12483-022 (49 mg) and Y1430-12483-034 (41 mg)) was combined (90 mg, total yield 21%, Compound 29 as a mixture of diastereo-isomers).

$^1$H NMR (400 MHz, DMSO-d$_6$): δ 8.01-7.98 (m, 1H), 7.54-7.34 (m, 5H), 6.36-6.34 (m, 1H), 5.73-5.64 (m, 1H), 5.19-5.15 (m, 1H), 4.72-4.46 (m, 5H), 2.72-2.57 (m, 2H), 2.36-2.16 (m, 2H), 1.23-1.09 (m, 12H).

LC-MS: R$_{t1}$=2.976 min, R$_{t2}$=3.165 min, R$_{t3}$=3.322 min, [M+H]$^+$=634.

In a similar manner the following compounds are prepared:

((2R,3R,5R)-3-acetoxy-5-(4-((4-(3-chlorophenyl)-2-oxido-1,3,2-dioxaphosphinan-2-yl)amino)-2-oxopyrimidin-1 (2H)-yl)-4,4-difluorotetrahydrofuran-2-yl)methyl acetate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((propionyloxy)methyl)tetrahydrofuran-3-yl propionate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((2-methoxyacetoxy)methyl)tetrahydrofuran-3-yl 2-methoxyacetate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((pivaloyloxy)methyl)tetrahydrofuran-3-yl pivalate;

(2R,3R,5R)-5-(4-((4-(3-chlorophenyl)-2-oxido-1,3,2-dioxaphosphinan-2-yl)amino)-2-oxopyrimidin-1(2H)-yl)-4,4-difluoro-2-((isopropyloxycarbonyloxy)methyl)tetrahydrofuran-3-yl isopropyl carbonate.

Mouse Pharmacokinetic Study 1

1. Design of Experiment 1.1 Experimental Animal

C57BL/6 mice used in this experiment were purchased from Beijing Vital River Laboratory Animal Technology Co., Ltd., and male mice with a body weight in the range of 16-19 g were tested for administration. The animals were housed with appropriate air conditions (temperature: 20-25° C.; humidity: 40%-70%; light/dark cycle: 12 hours), and were provided with the food and water ad lib.

1.2 Formulations 1.2.1 Administration by Intravenous Injection

The solution media for IV administration were DMSO: 30% solutol HS-15:saline=10:10:80 (v/v/v). Test substances were dissolved in the media to obtain a clear solution, and filtered through PTFE to get a colorless clear solution for IV administration.

1.2.2 Oral Administration

The solution media for oral administration were DMSO: 30% solutol HS-15:saline=10:10:80 (v/v/v). Test substances were dissolved in the media to obtain a clear solution.

1.3 Administration

The animals were randomly divided into groups. All animals were fasted overnight (12-15 hours) before administration (but provided with water ad lib) and provided with foods 4 hours after the administration. As to IV administration of gemcitabine, the mice were administered with the formulations by vena caudalis injection (at dose of 15 mg/kg).

The pharmacokinetic (PK) profile of liver-targeted gemcitabine (dFdC) prodrug according to formula (I)/formula (A) (i.e., Compound 4) was evaluated in male C57BL/C mice following intravenous administration (i.v.) at an equivalent dose to 15 mg/kg of Gemcitabine or following oral administration (PO or i.g.) at a dose of 80 mg/kg.

1.4 Sample Collection, Processing and Analysis

Blood samples of designated animals (n=3/time point/compound) were taken at 0.083, 0.25, 0.5, 1, 2, 4, and 8 hours following i.v. administration, and at 0.25, 0.5, 1, 2, 4, 8 and 24 hours following PO administration, respectively. Systemic blood samples were collected into EDTA-K$_2$-treated tubes containing tetrahydrouridine (THU, 0.5 mM) to inhibit further metabolism of gemcitabine (dFdC) to dFdU. In addition, at 2 hours following either i.v. or PO administration, 3 animals were sacrificed for collection of liver tissues. Plasma was isolated by centrifugation and frozen prior to analysis. Liver tissue was processed by homogenization in x5 volume of 20% methanol, and the homogenate was subject to centrifugation for collection of the supernatant. Both plasma and tissue concentrations of prodrugs, parent drug (i.e., gemcitabine, aka dFdC) and dFdU (a major metabolite of dFdC) were determined by LC/MS/MS analysis (Instrument: Agilent 6470. MS: Positive Ion, AJS ESI, MRM Detection; HPLC condition: Column: Agilent ZORBAX XDB-C18, 5 µm, 2.1×50 mm (Column No.: 50-241), Flow rate: 0.30 mL Pharmacokinetic parameters were calculated using WinNonlin software (Pharsight Corp., Mountain View, CA).

2. Results

As can be seen in FIG. 1, i.v. or PO administration of the prodrug compound according to formula (I)/formula (A) (e.g. Compound 4) led to significant exposure of the prodrug in the systemic circulation, suggesting the prodrug was well absorbed in the intestine. Moreover, detection of gemcitabine (aka dFdC) in the circulation further proved that the prodrug approach is viable: dFdC was released from the prodrug in vivo (FIG. 1).

The prodrug compound according to present invention can enhance dFdC's exposure either by i.v. or oral administration of the prodrug, based on the comparison of the half-life ($T_{1/2}$): $T_{1/2}$=1.1 h, 2.1 h, and 3.3 h for i.v. administration of Gemcitabine, i.v. administration of Compound 4, and PO administration of Compound 4, respectively. Other dFdC PK parameters following i.v. administration of Gemcitabine at 15 mg/kg, or i.v. administration (equivalent dose to 15 mg/kg of gemcitabine) of Compound 4, or PO administration (80 mg/kg) of Compound 4 were shown in Table 1, which demonstrated half-life extension by Compound 4 as compared to Gemcitabine.

TABLE 1

Plasma PK parameters of dFdC following iv administration of 15 mg/kg Gemcitabine or iv dose of Compound 4 (equivalent dose to 15 mg/kg of gemcitabine), or PO dose of Compound 4 (80 mg/kg)

| | | PK study | | |
|---|---|---|---|---|
| PK Parameters | | Gemcitabine, i.v. | Compound 4, i.v. | Compound 4, PO |
| $T_{1/2}$ | h | 1.10 | 2.08 | 3.32 |
| $MRT_{0-t}$ | h | 0.46 | 1.29 | 2.42 |
| $MRT_{0-inf}$ | h | 0.51 | 2.62 | 4.40 |
| $AUC_{0-t}$ | ng · h · mL$^{-1}$ | 3270 | 463 | 223 |
| $AUC_{0-inf}$ | ng · h · mL$^{-1}$ | 3290 | 605 | 276 |

Figure 2:
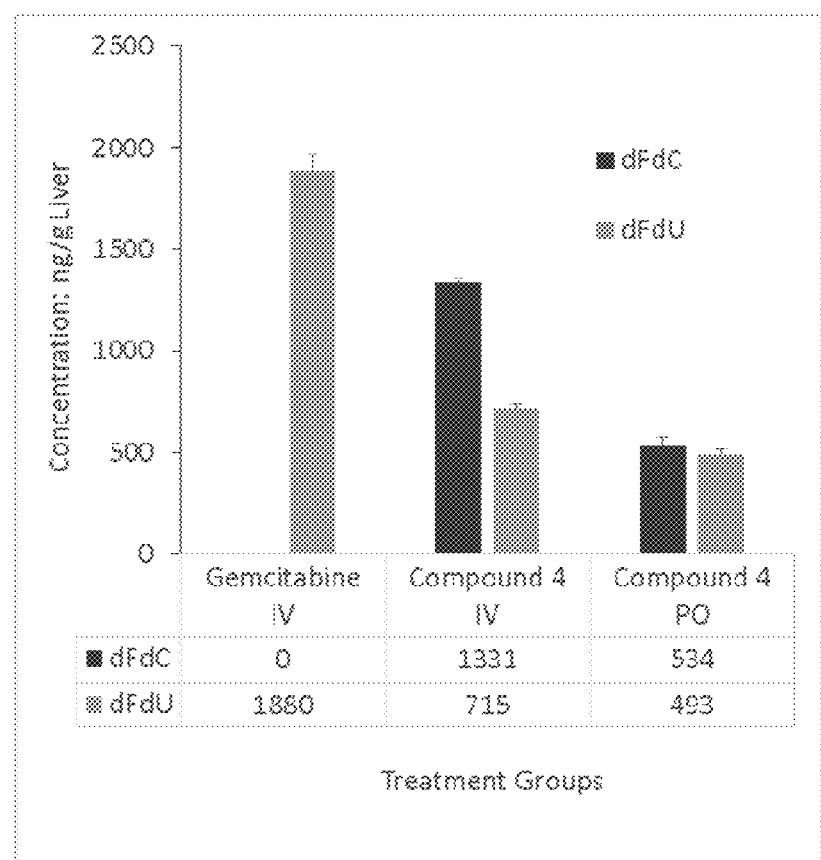
FIG. 2. Liver concentrations of dFdC and dFdU at 2 h following administration of Compound 4 (iv, equivalent dose to 15 mg/kg of gemcitabine; PO, 80 mg/kg) and Gemcitabine (iv, 15 mg/kg)
Figure 3:
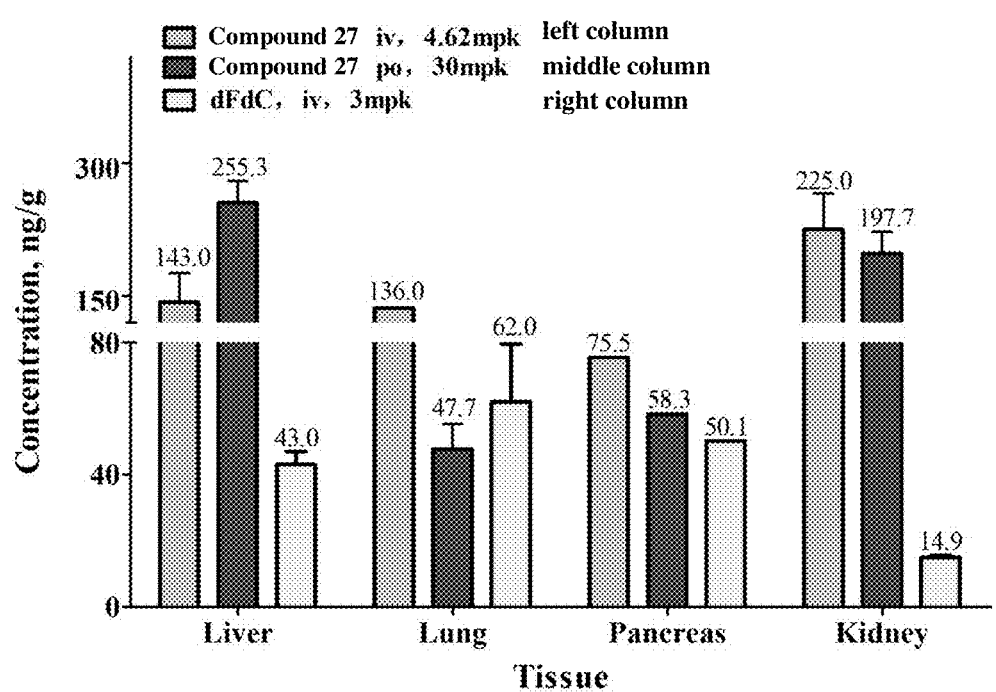
FIG. 3. Tissue distribution of Compound 27 vs dFdC following administration of Compound 27 and dFdC ("mpk" in Figures means mg/kg)
Figure 4:
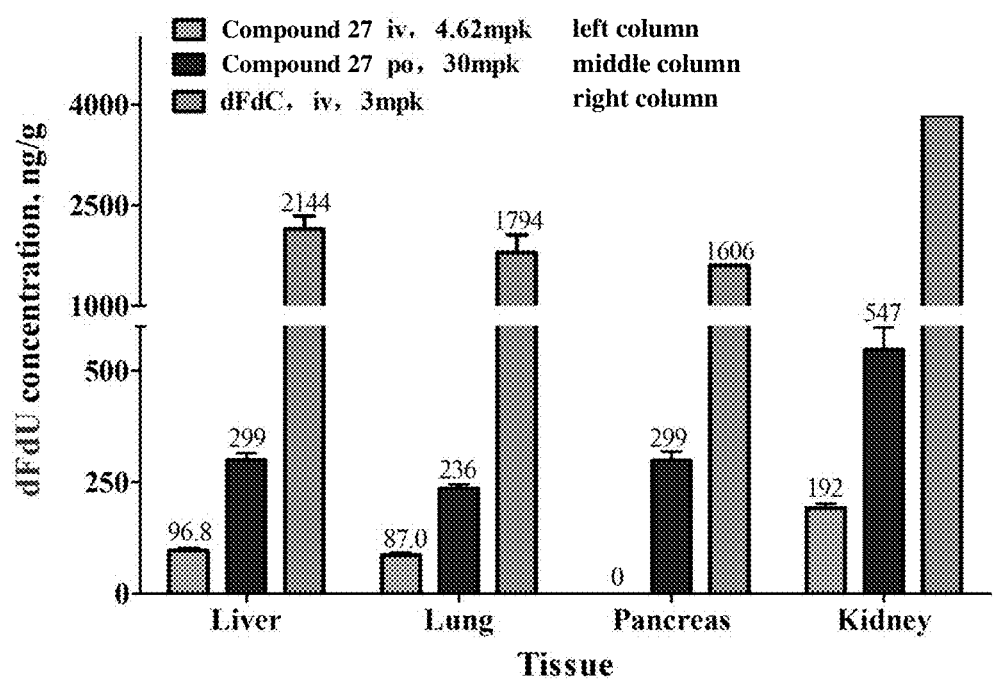
FIG. 4. Tissue distribution of metabolite dFdU following administration of Compound 27 and dFdC.
Figure 5:
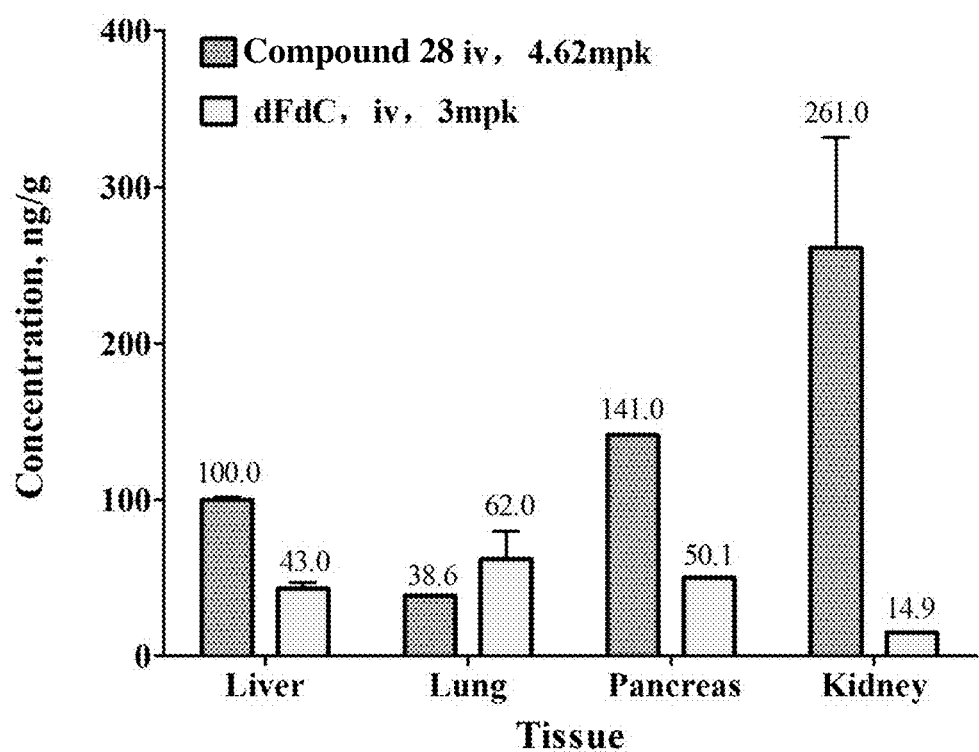
FIG. 5. Tissue distribution of Compound 28 vs dFdC following administration of Compound 28 and dFdC.
Figure 6:
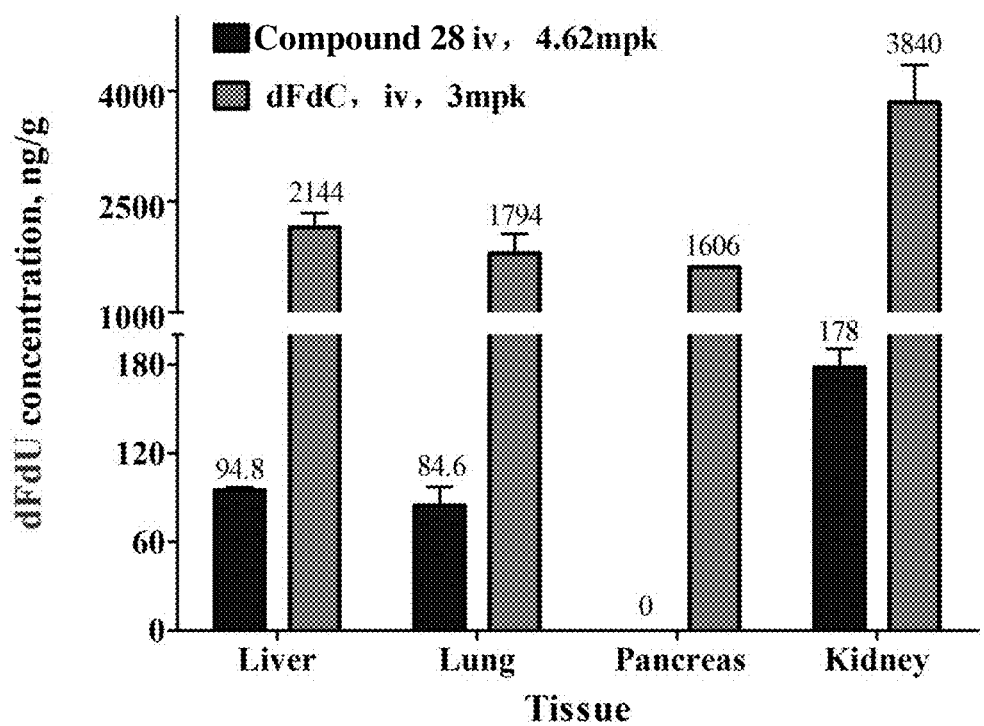
FIG. 6. Tissue distribution of metabolite dFdU following administration of Compound 28 and dFdC.
Figure 7:
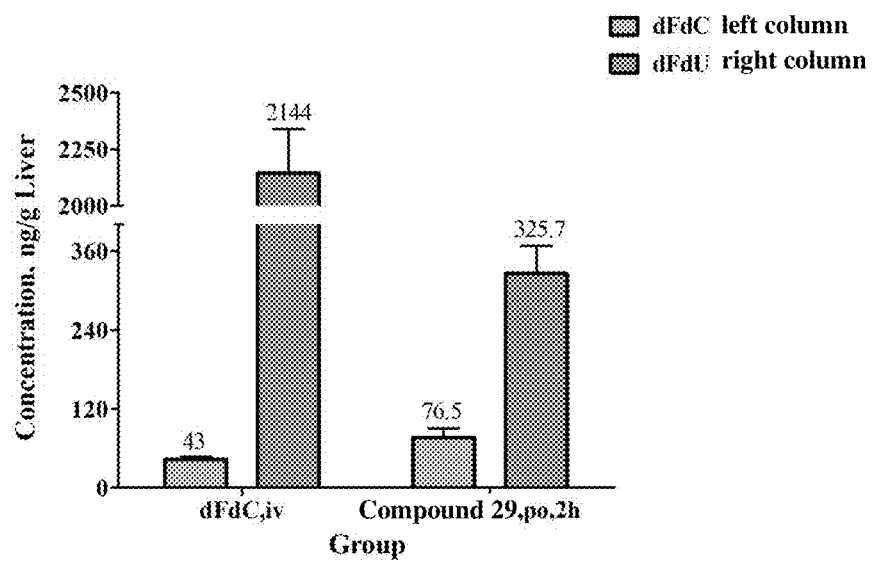
FIG. 7. Liver levels of dFdC and dFdU in mice following i.v. dosing of dFdC (3 mg/kg), or oral dosing of compound 29 at 30 mg/kg (A: Liver dFdC and dFdU levels at 2 h following iv dFdC (3 mg/kg), or oral compound 29 (30 mg/kg) administration in mice (n=3); B: Therapeutic Index (TI) concerning liver dFdC levels as regard to liver dFdU levels)
Figure 8:
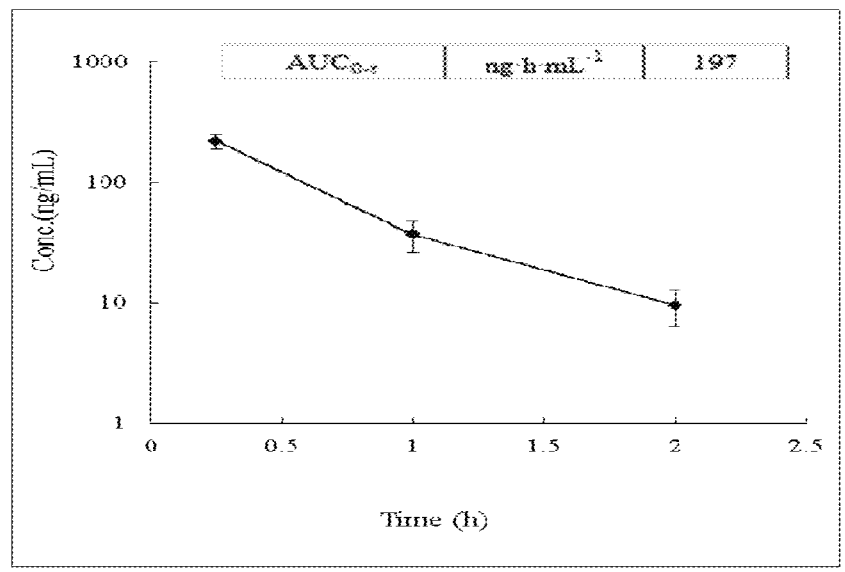
FIG. 8. Plasma concentration of Topotecan in mice: i.v. dosing of Topotecan at 2 mg/kg vs. i.v. dosing of compound 10 at 3 mg/kg in mice (A: Plasma Topotecan exposure following 2 mg/kg of Topotecan i.v. administration to mice (n=3); B: Plasma compound 10 exposure following 3 mg/kg of compound 10 (equivalent 1 mol of Topotecan) i.v. administration to mice (n=3))
Figure 8:
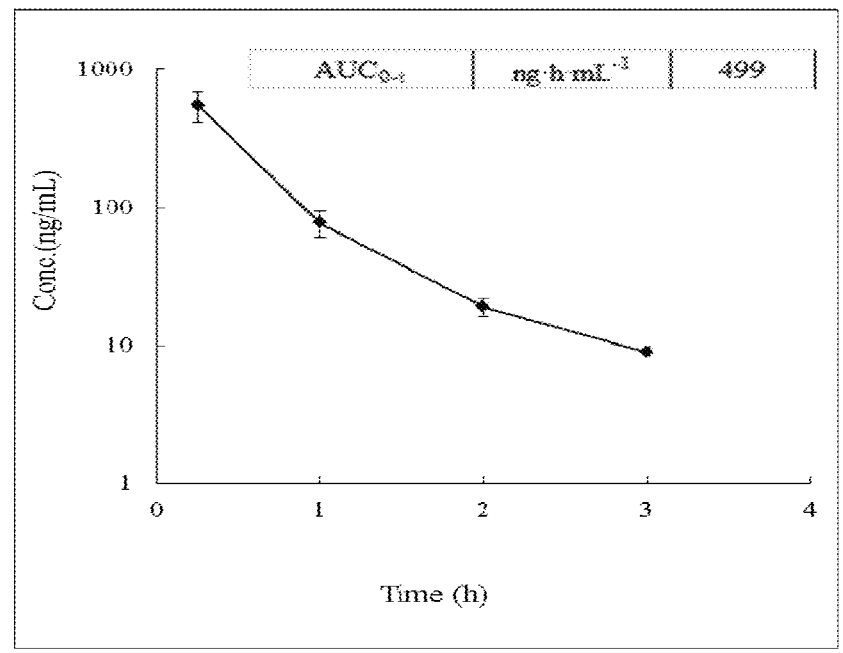
Figure 9:
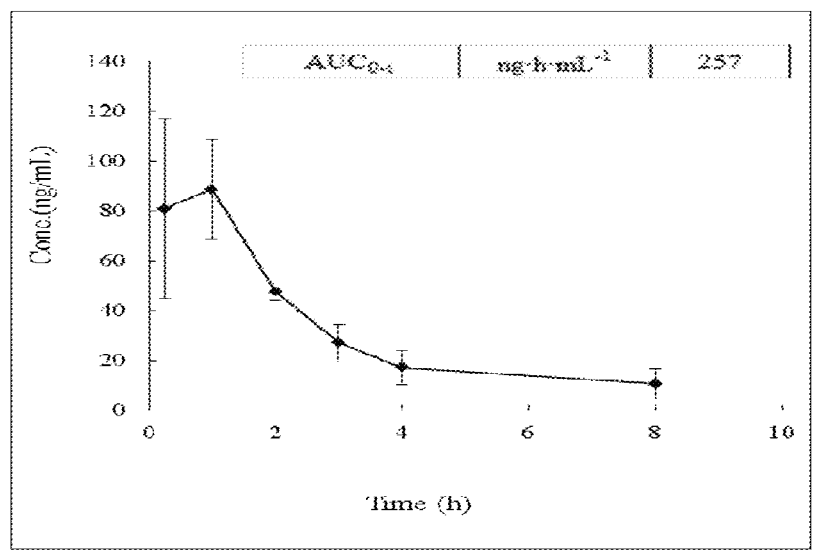
FIG. 9. Plasma concentration of Topotecan in mice: oral dosing of Topotecan at 10 mg/kg vs. i.v. dosing of compound 10 at 3 mg/kg in mice (A: Plasma Topotecan exposure following 10 mg/kg of Topotecan po administration to mice (n=3); B: Plasma compound 10 exposure following 3 mg/kg of compound 10 (equivalent 1 mol of Topotecan) i.v. administration to mice (n=3))
Figure 9:
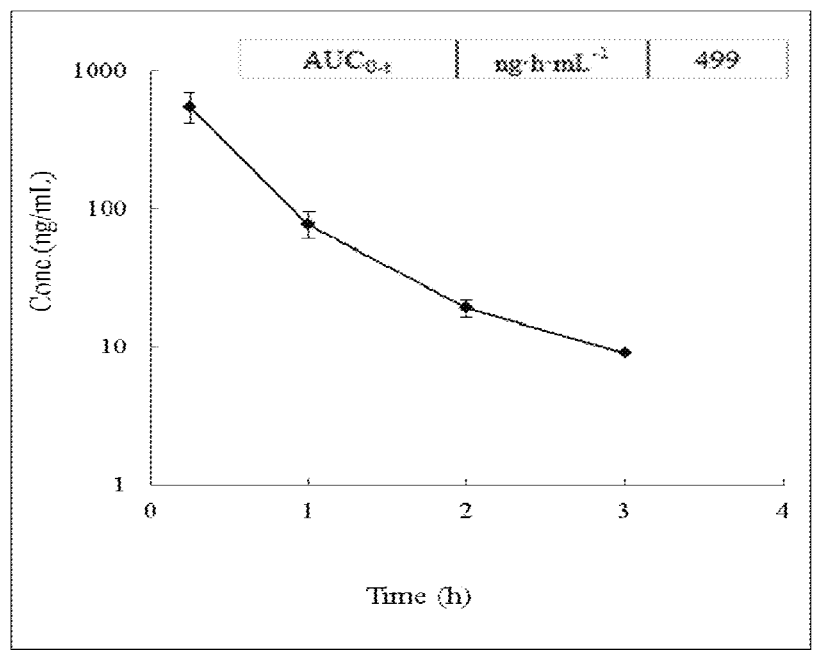
Figure 10:
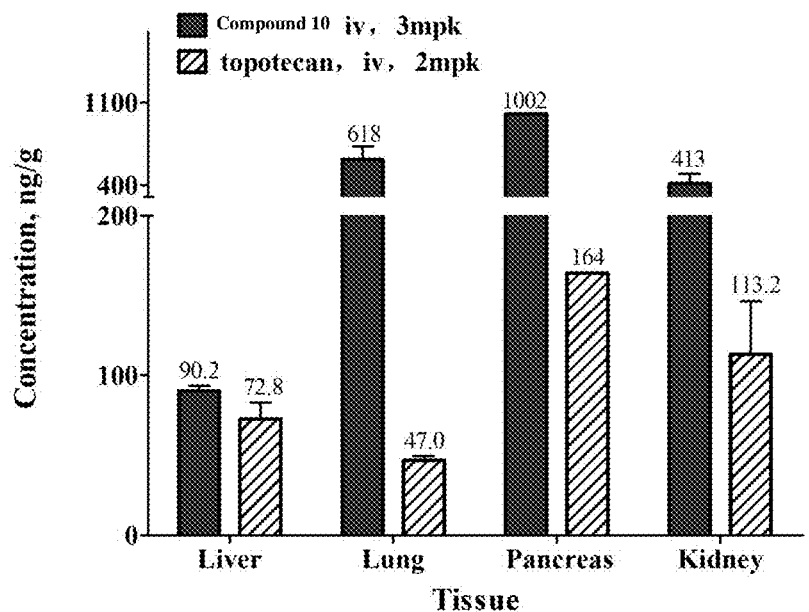
FIG. 10. Tissue distribution of compound 10 vs Topotecan following administration of compound 10 and Topotecan.
Figure 11:
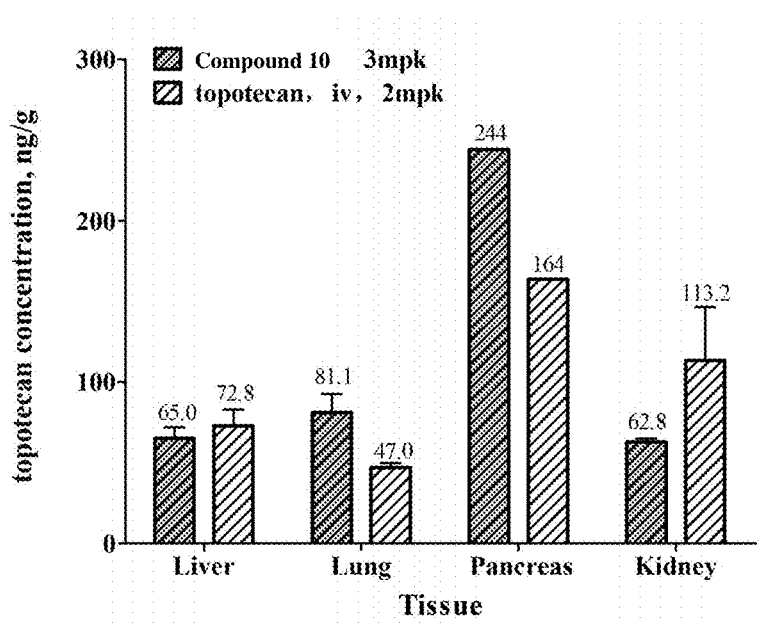
FIG. 11. Tissue distribution of metabolite Topotecan following administration of compound 10 and Topotecan.

Liver drug exposure of dFdC and dFdU were measured at 2 h following i.v. (equivalent dose to 15 mg/kg of gemcitabine) or PO administration (80 mg/kg) of Compound 4, in comparison with i.v. administration of Gemcitabine (15 mg/kg). Strikingly, as can be seen from FIG. 2, there were no detectable dFdC levels in the liver whereas significant levels of dFdU were detected in the liver following i.v. administration of Gemcitabine. In contrast, i.v. and PO administration of Compound 4 resulted in significant levels of dFdC in the liver. Thus, over 1331-fold higher concentration of dFdC was generated following i.v. administration of Compound 4 compared to the same dose Gemcitabine i.v. administration group. Similarly, significantly higher concentration of dFdC was also generated from PO dosing of Compound 4. Conversely, dFdU levels generated from Compound 4 administration (either i.v. or PO) were much less than that in Gemcitabine i.v. administration group. The overall safety improvement (therapeutic index improvement) of Compound 4 over Gemcitabine was greater than 3500-fold and 2035-fold, for iv and PO dosing of compound 4 respectively (Table 2, showing improvement in Therapeutic Index by Compound 4 over Gemcitabine).

TABLE 2

Improvement of therapeutic index (TI) of prodrugs over Gemcitabine in the liver

| Compounds | [dFdC], fold higher than gemcitabine iv | [dFdU], fold less than gemcitabine iv | TI improvement |
|---|---|---|---|
| Compound 4 IV | >1331 | 2.63 | >3500 |
| Compound 4 PQ | >534 | 3.81 | >2035 |

TI = [dFdC]-fold improvement × [dFdU]-fold improvement

Mouse Pharmacokinetic Study 2

According to the procedures of above mouse pharmacokinetic study 1, the PK parameters of compound 27, compound 28, compound 29 and compound 10 were tested, wherein the tissue distribution of above compounds in various tissues such as liver, lung, pancreas and kidney was also determined. The experimental results were shown in FIGS. 3 to 11, respectively.

Similar to the Compound 4, either i.v. or PO administration of each of above prodrug compounds led to significant exposure of the prodrug in the systemic circulation, and detection of corresponding active drug (e.g., dFdC) in the circulation further proved that the prodrug approach is viable: the corresponding active drug (e.g., dFdC) was released from the prodrug in vivo.

Further, above prodrug compounds could enhance the exposure of corresponding active drug (e.g., dFdC) either by i.v. or oral administration of the prodrug, and demonstrated a half-life extension as compared to the corresponding active drug.

Moreover, i.v. and PO administration of above prodrugs resulted in significant levels of corresponding active drug (e.g., dFdC) in the liver, and showed an overall safety improvement (therapeutic index improvement) over the corresponding active drug, respectively.

Pharmacology Study

Human clinical studies of gemcitabine showed potential as part of combination therapies for the treatment of hepatocellular carcinoma, bile duct cancers and pancreatic cancers. In a phase II study, gemcitabine combined with oxaliplatin and erlotinib as a first line therapy to treat hepatocellular carcinoma showed progression free survivals in 41% of patients at 26 weeks (Cancer Medicine, 2017, 6, 2042-2051). In another phase II study of Chinese patients with metastatic adenocarcinoma of the pancreas, gemcitabine plus nab-paclitaxel treatment showed overall response rate of 35%, which met the preset primary end-point.

14-Day Mouse Safety Study

A 14-day mouse safety study is conducted to evaluate if a compound of formula (I)/formula (A) (e.g. Compound 4) has adverse effects in mice following 14 days of oral gavage dosing and to determine the repeated PK profiles of the prodrug (e.g. Compound 4) and its metabolites dFdC as well as dFdU.

Male (M) and female (F) CD-1 mice (18-22 g of body weight) provided by Beijing Vital River Laboratory Animal Technology Co., Ltd., are randomized into four groups, 5 animals each gender. Animals are dosed with compound 4 by oral gavage. A range of doses is selected in order to determine maximum tolerance dose and dose liming toxicity. A dosing volume of 5 mL/kg is used and administered daily.

| Groups | N, Gender | Treatment | Doses (mg/kg) | Dosing Volume (mL/kg) |
|---|---|---|---|---|
| 1 | 5F + 5M | Vehicle | — | 5 |
| 2 | 5F + 5M | Compound 4, low dose | 0.1 | 5 |
| 3 | 5F + 5M | Compound 4, med dose | 1 | 5 |
| 4 | 5F + 5M | Compound 4, high dose | 10 | 5 |

Endpoints including clinical signs, body weight, food consumption, hematology, clinical chemistry, plasma concentrations of Compound 4 and its metabolites (dFdC, dFdU), gross pathology, organ weights are evaluated.

What is claimed is:

1. A compound having formula (I):

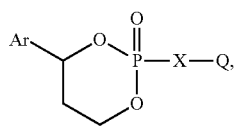

its stereoisomer, salt, hydrate, solvate, or crystalline form thereof;
wherein,
Ar is independently selected from the group consisting of optionally substituted aryl and heteroaryl;
X is —NR'—;
R' is independently selected from the group consisting of hydrogen, optionally substituted alkyl, optionally substituted aryl, and optionally substituted heteroaryl; and
Q is a group that H-X-Q together represents a pharmaceutically active agent or prodrug thereof, and the pharmaceutically active agent is a chemical compound having at least one free aromatic amine or amide group,
wherein H—X-Q together represents one selected from the group consisting of gemcitabine, tenofovir disoproxil, pamiparib, talazoparib, olaprib, veliparib, HY-14478, pioglitazone, lenvatinib, HY-103039, OS-9620, HY-103665, HY-123943, grapiprant, HY-10413, HY-50901, HY-10797, HY-103088, and apatinib.

2. The compound according to claim 1 wherein Ar is optionally substituted phenyl or optionally substituted pyridyl.

3. The compound according to claim 1 wherein X is —NR'—, and R' is hydrogen, optionally substituted alkyl, or optionally substituted aryl.

4. The compound according to claim 1, wherein the compound having formula (I) is a compound selected from the group consisting of:
1-((2R,4R,5R)-3,3-difluoro-4-hydroxy-5-(hydroxymethyl)tetrahydrofuran-2-yl)-4-((2-oxido-4-(pyridin-4-yl)-1,3,2-dioxaphosphinan-2-yl)amino)pyrimidin-2 (1H)-one;
1-((2R,4R,5R)-3,3-difluoro-4-hydroxy-5-(hydroxymethyl)tetrahydrofuran-2-yl)-4-((2-oxido-4-(pyridin-3-yl)-1,3,2-dioxaphosphinan-2-yl)amino)pyrimidin-2 (1H)-one;
4-((4-(3-chlorophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2 (1H)-one;
4-((4-(3-bromophenyl)-2-oxido-1,3,2-dioxaphosphinan-2-yl)amino)-1-((2R,4R,5R)-3,3-difluoro-4-hydroxy-5-(hydroxymethyl)tetrahydrofuran-2-yl)pyrimidin-2 (1H)-one;
1-((2R,4R,5R)-3,3-difluoro-4-hydroxy-5-(hydroxymethyl)tetrahydrofuran-2-yl)-4-((4-(3-fluorophenyl)-2-oxido-1,3,2-dioxaphosphinan-2-yl)amino)pyrimidin-2 (1H)-one;
1-((2R,4R,5R)-3,3-difluoro-4-hydroxy-5-(hydroxymethyl)tetrahydrofuran-2-yl)-4-((4-(4-methoxyphenyl)-2-oxido-1,3,2-dioxaphosphinan-2-yl)amino)pyrimidin-2 (1H)-one;
((2R,3R,5R)-5-(4-((4-(3-chloro-4-methoxyphenyl)-2-oxido-1,3,2-dioxaphosphinan-2-yl)amino)-2-oxopyrimidin-1 (2H)-yl)-4,4-difluoro-3-hydroxytetrahydrofuran-2-yl)methyl pivalate;

(2R,3R,5R)-5-(4-((4-(3-chlorophenyl)-2-oxido-1,3,2-dioxaphosphinan-2-yl)amino)-2-oxopyrimidin-1 (2H)-yl)-4,4-difluoro-2-((isobutyryloxy)methyl)tetrahydrofuran-3-yl isobutyrate;
((2R,3R,5R)-3-acetoxy-5-(4-((4-(3-chlorophenyl)-2-oxido-1,3,2-dioxaphosphinan-2-yl)amino)-2-oxopyrimidin-1 (2H)-yl)-4,4-difluorotetrahydrofuran-2-yl) methyl acetate;
(2R,3R,5R)-5-(4-((4-(3-chlorophenyl)-2-oxido-1,3,2-dioxaphosphinan-2-yl)amino)-2-oxopyrimidin-1 (2H)-yl)-4,4-difluoro-2-((propionyloxy)methyl)tetrahydrofuran-3-yl propionate;
(2R,3R,5R)-5-(4-((4-(3-chlorophenyl)-2-oxido-1,3,2-dioxaphosphinan-2-yl)amino)-2-oxopyrimidin-1 (2H)-yl)-4,4-difluoro-2-((2-methoxyacetoxy)methyl)tetrahydrofuran-3-yl 2-methoxyacetate;
(2R,3R,5R)-5-(4-((4-(3-chlorophenyl)-2-oxido-1,3,2-dioxaphosphinan-2-yl)amino)-2-oxopyrimidin-1 (2H)-yl)-4,4-difluoro-2-((pivaloyloxy)methyl)tetrahydrofuran-3-yl pivalate; and
(2R,3R,5R)-5-(4-((4-(3-chlorophenyl)-2-oxido-1,3,2-dioxaphosphinan-2-yl)amino)-2-oxopyrimidin-1 (2H)-yl)-4,4-difluoro-2-((isopropyloxycarbonyloxy)methyl)tetrahydrofuran-3-yl isopropyl carbonate, or
a compound selected from the group consisting of the following:

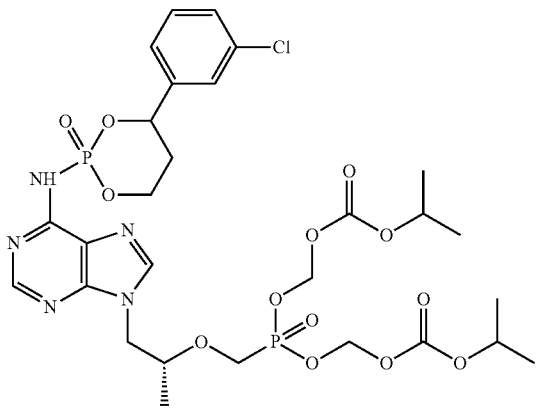

15

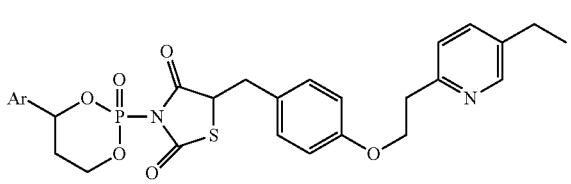

17

79
-continued
20
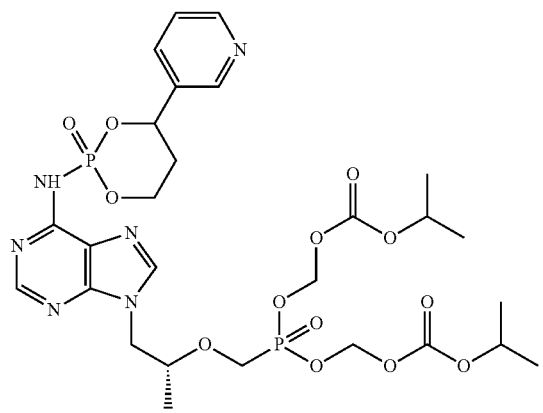
21
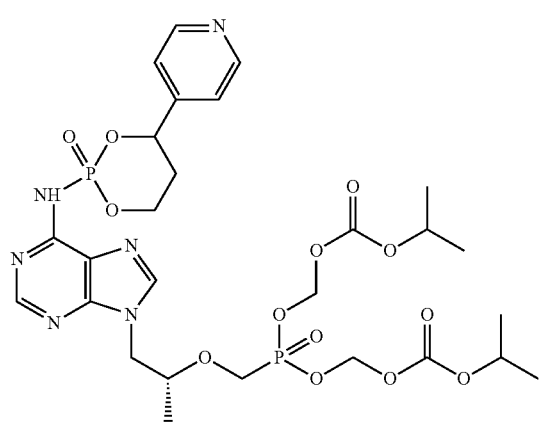
25
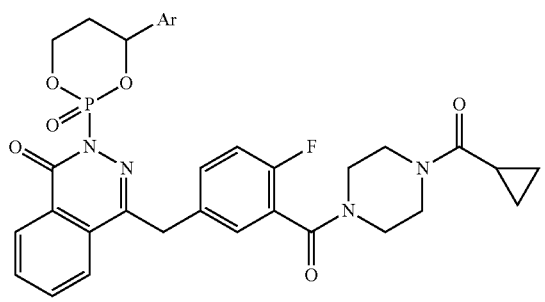
27
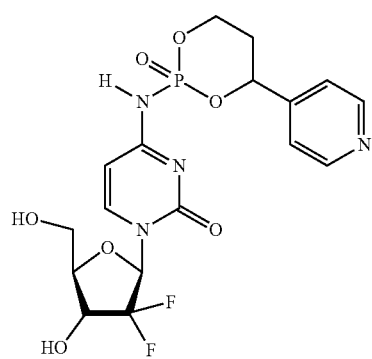
80
-continued
28
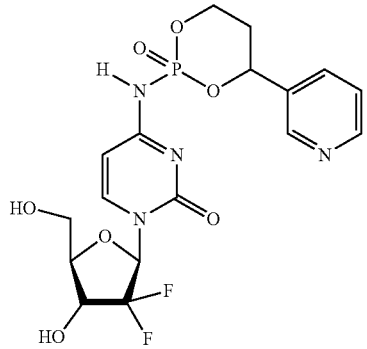
29
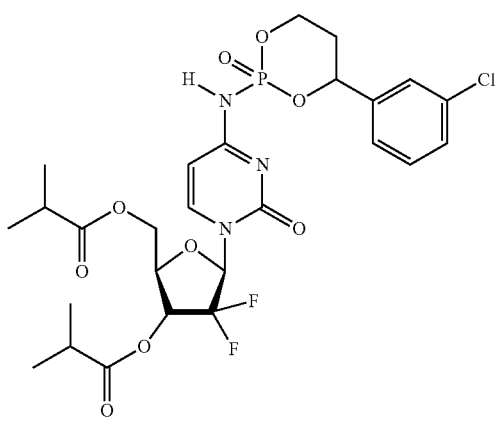
52
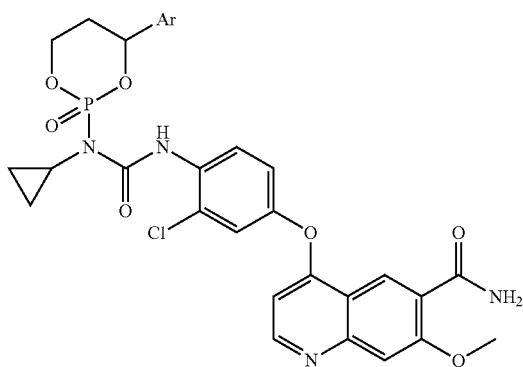
55

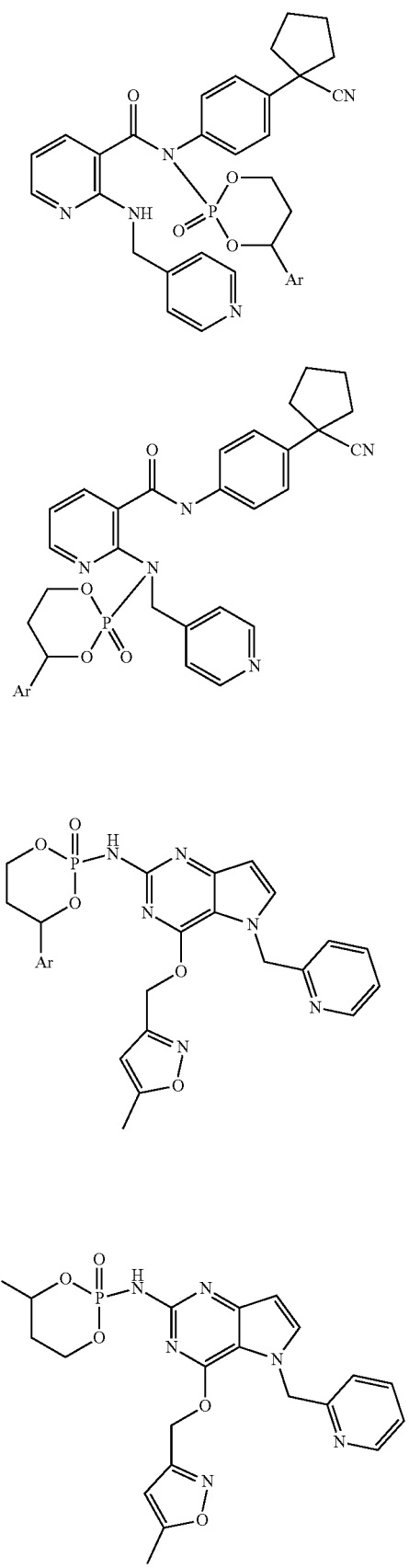
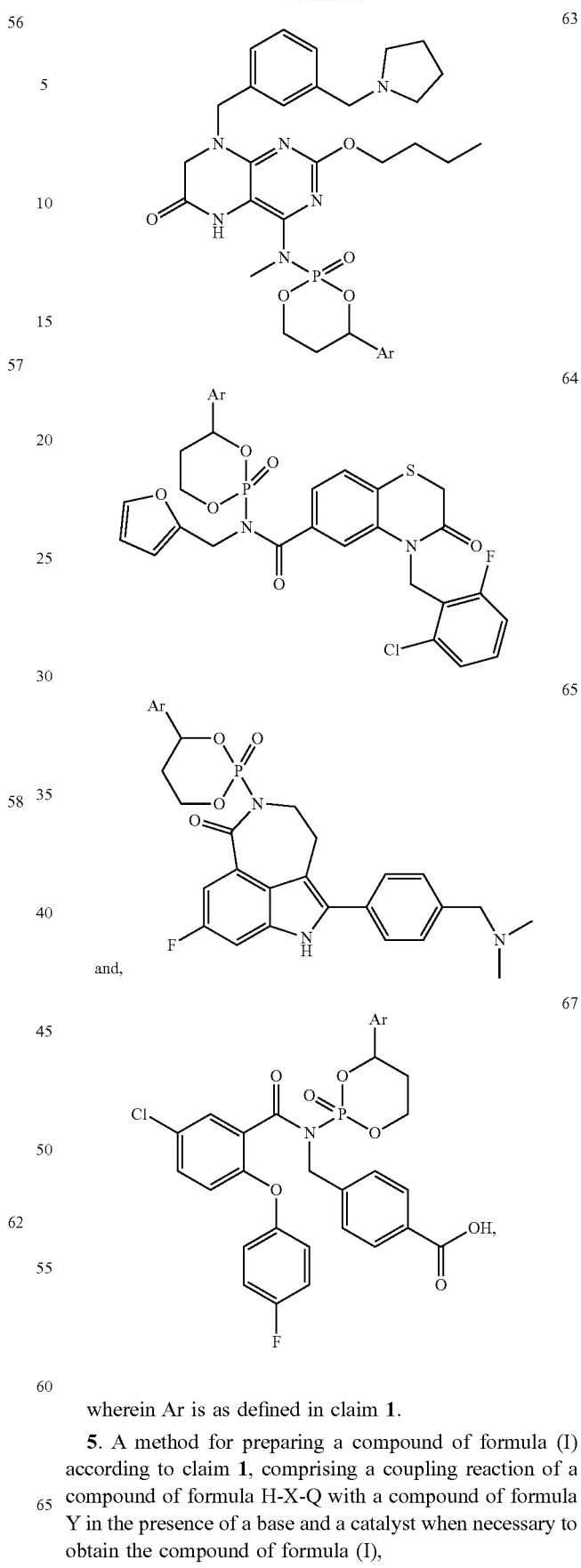
wherein Ar is as defined in claim 1.
5. A method for preparing a compound of formula (I) according to claim 1, comprising a coupling reaction of a compound of formula H-X-Q with a compound of formula Y in the presence of a base and a catalyst when necessary to obtain the compound of formula (I),

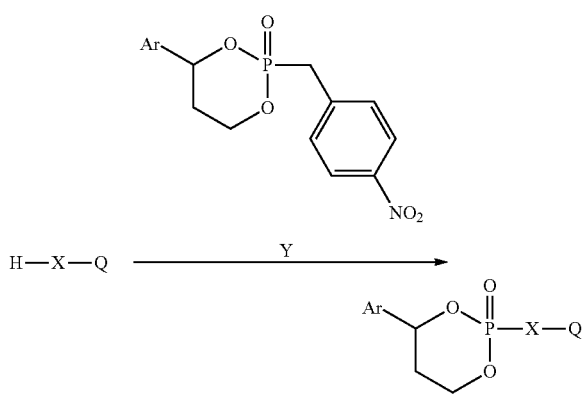

wherein Ar, X and Q are as defined in claim 1.

6. A method for preparing a compound of formula (I) according to claim 1, comprising the reaction of a compound of formula H-X-Q with phosphoryl trichloride in the presence of a base and a catalyst when necessary, followed by addition of a 1,3-propanediol derivative of formula Z to react to obtain the compound of formula (I),

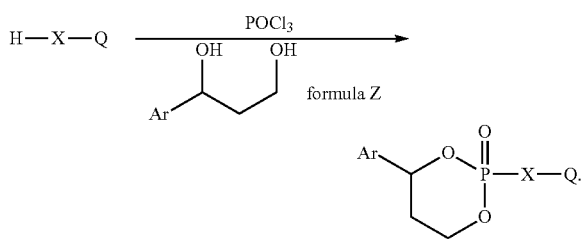

7. A method for diagnosing, preventing and/or treating a disease in a mammal comprising administering to the mammal in need thereof an effective amount of a compound according to claim 1.

8. The method of claim 7, wherein the disease is selected from the group consisting of cancers, metabolic diseases, viral infections, immunological diseases, neurologic diseases, and blood diseases.

9. The method of claim 7 wherein the compound is administered orally or intravenously.

10. A pharmaceutical composition comprising a compound according to claim 1 in combination with a pharmaceutically acceptable carrier, diluent or excipient.

11. A method of delivering a pharmaceutically active agent into the liver of a mammal, wherein the pharmaceutically active agent is a chemical compound having at least one free aromatic amine, amide or phenol group; and the method comprises the following steps: preparing a compound according to claim 1, and administering the compound according to claim 1 to the mammal in need thereof.

12. The method of claim 11 wherein the compound is administered orally or intravenously.

13. The method of claim 11 wherein the pharmaceutically active agent is one selected from the group consisting of gemcitabine, tenofovir disoproxil, pioglitazone, lenvatinib, HY-103039, and apatinib.

14. The method according to claim 11, wherein the pharmaceutically active agent is suitable for the treatment of a liver disease.

15. A method for diagnosing, preventing and/or treating a disease in a mammal comprising administering to the mammal in need thereof an effective amount of a compound according to claim 1 combined with other therapeutic agents.

16. The method of claim 15, wherein the disease is selected from the group consisting of cancers, metabolic diseases, viral infections, immunological diseases, neurologic diseases, and blood diseases.

17. The compound according to claim 1, wherein Ar is 3-chlorophenyl, or optionally substituted 3-pyridyl or 4-pyridyl.

18. The method of claim 7, wherein the mammal is selected from the group consisting of human, mouse, rat, rabbit, hamster, guinea pig, monkey, dog, cat, pig, sheep, goat, cow, and horse.

19. The method of claim 11, wherein the mammal is selected from the group consisting of human, mouse, rat, rabbit, hamster, guinea pig, monkey, dog, cat, pig, sheep, goat, cow, and horse.

20. The method of claim 15, wherein the other therapeutic agents are selected from immune checkpoint inhibitors, microtubule inhibitors, PARP inhibitors, BTK inhibitors, EGFR TK inhibitors, and cytotoxic platin agents.

* * * * *